United States Patent [19]
Hoshino et al.

[11] Patent Number: 5,668,514
[45] Date of Patent: Sep. 16, 1997

[54] SIGNAL TRANSMISSION DEVICE

[75] Inventors: Masaru Hoshino, Tokyo-to; Toyokazu Sano; Takeo Oe, both of Ishikari-gun, all of Japan

[73] Assignee: Dai Nippon Printing Co., Ltd., Japan

[21] Appl. No.: 321,990

[22] Filed: Oct. 12, 1994

[51] Int. Cl.$^6$ ............................................. H01P 1/06
[52] U.S. Cl. ................................. 333/261; 333/24 C
[58] Field of Search .............................. 333/261, 24 C; 343/763

[56] References Cited

U.S. PATENT DOCUMENTS

| | | | |
|---|---|---|---|
| 4,327,334 | 4/1982 | Becavin et al. | 333/1 |
| 4,518,958 | 5/1985 | Cook et al. | 340/679 |
| 4,988,963 | 1/1991 | Shirosaka et al. | 333/261 |
| 5,506,555 | 4/1996 | Hoshiro | 333/261 |

FOREIGN PATENT DOCUMENTS

| | | | |
|---|---|---|---|
| 1183226 | 2/1985 | Canada | 333/261 |
| 0481048 | 4/1992 | European Pat. Off. | H01Q 9/27 |
| 56-032803 | 8/1979 | Japan | H01Q 3/26 |
| 2234859 | 2/1991 | United Kingdom | H01Q 1/36 |
| 8302352 | 7/1983 | WIPO | G08C 19/10 |

OTHER PUBLICATIONS

"Microwave Slip Ring for Internal Communications in Turreted Vehicles" Askew, RCA Review, vol. 47, No. 4,Dec. 1986. pp. 644–654.

*Primary Examiner*—Paul Gensler
*Attorney, Agent, or Firm*—Ladas & Parry

[57] ABSTRACT

A signal transmission device includes a first body made of electromagnetic shielding material and fixed to a rotary shaft which passes through the first body. The first body revolves together with the rotary shaft around an axis of the rotary shaft. A second body made of electromagnetic shielding material is stationarily disposed around the rotary shaft. A first conductive element is spirally formed on a first substrate in a manner that peak magnitude points of traveling wave component of transmission signal generated on the element are positioned out of alignment with each other between the neighboring turns of the spiral element in radial direction of the spirally formed element. The first conductive element is disposed in the first body. A second conductive element is formed on a second substrate and has a first width enough to cover the first conductive element in the radial direction and a second width in a direction perpendicular to the radial direction. The second conductive element is disposed in the second body. Third and fourth ring-shaped conductive elements are respectively disposed on the first and second bodies and are opposite to each other when the first and second bodies are coupled together.

16 Claims, 52 Drawing Sheets

FIG.14

|  | P0 | P1 | P2 | P3 | P4 | P5 | P6 | P7 | P8 | P9 | P10 | P11 |
|---|---|---|---|---|---|---|---|---|---|---|---|---|
| 1st TURN | 0 | 3 | 5 | 6 | 6.5 | 7 | 6.5 | 6 | 5 | 3 | 0 | 3 |
| 2nd TURN | 5 | 6 | 6.5 | 7 | 6.5 | 6 | 5 | 3 | 0 | 3 | 5 | 6 |
| 3rd TURN | 6.5 | 7 | 6.5 | 6 | 5 | 3 | 0 | 3 | 5 | 6 | 6.5 | 7 |
| 4th TURN | 6.5 | 6 | 5 | 3 | 0 | 3 | 5 | 6 | 6.5 | 7 | 6.5 | 6 |
| 5th TURN | 5 | 3 | 0 | 3 | 5 | 6 | 6.5 | 7 | 6.5 | 6 | 5 | 3 |
| MAGNITUDE | 6.5 | 7 | 6.5 | 7 | 6.5 | 7 | 6.5 | 7 | 6.5 | 7 | 6.5 | 7 |

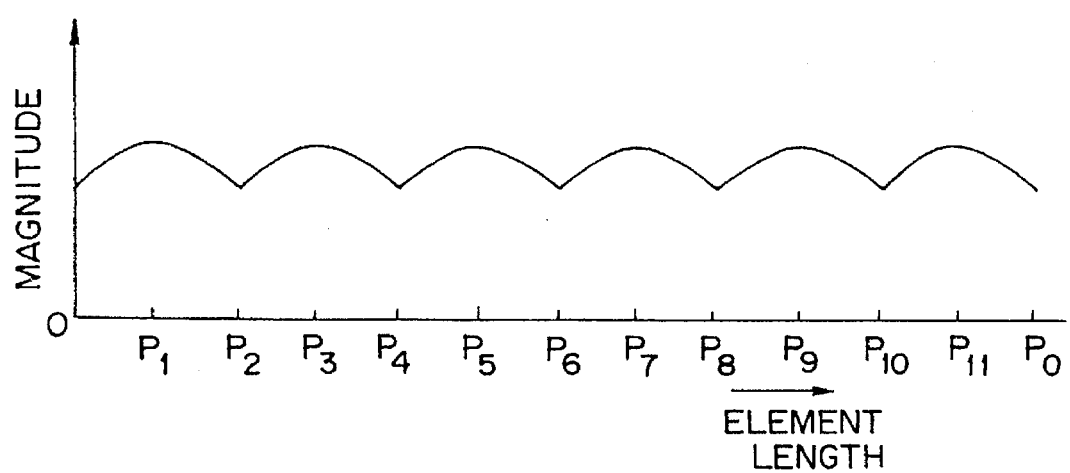
F I G. 15

F I G. 31
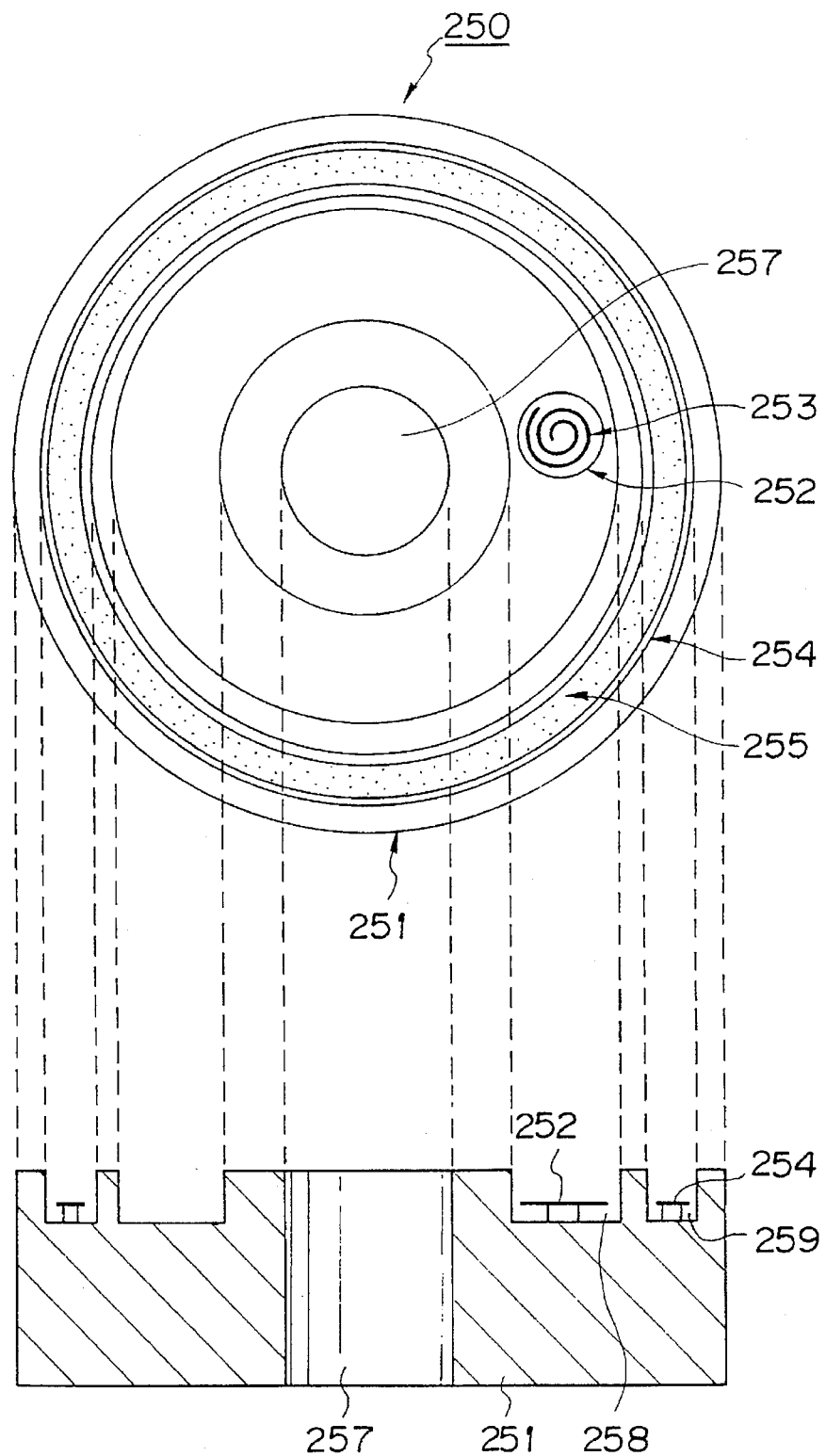

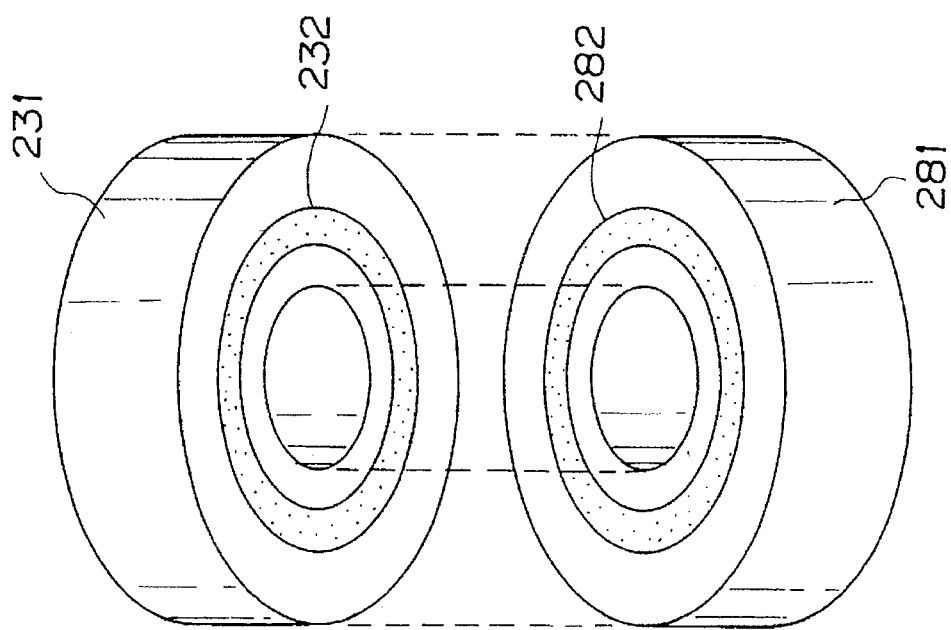
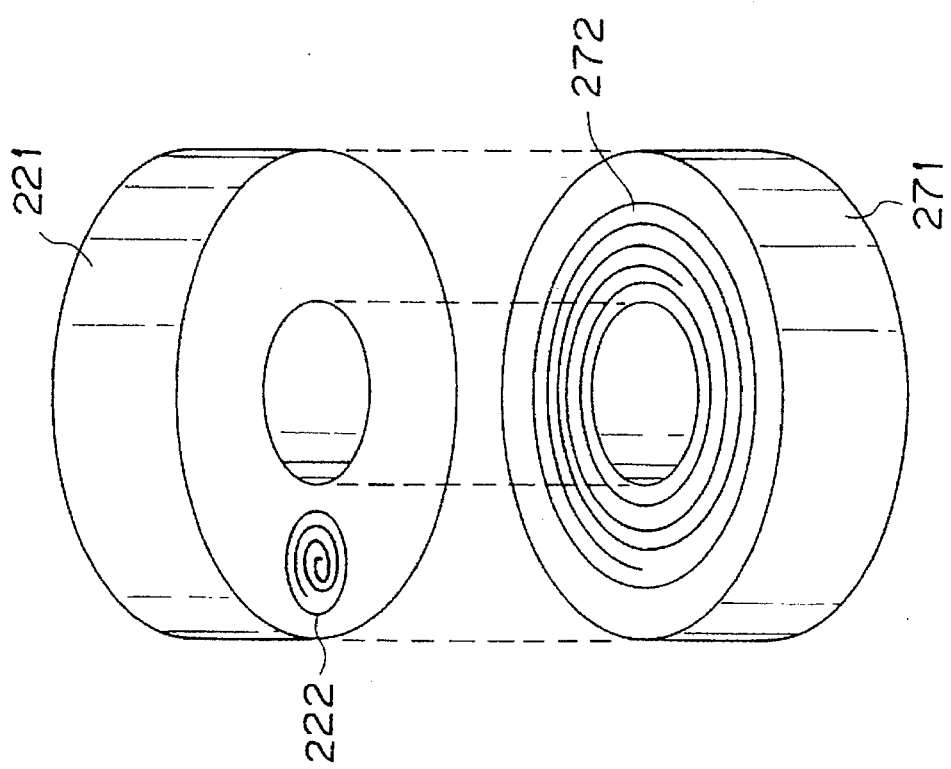
FIG.36A
FIG.36B

F I G. 43
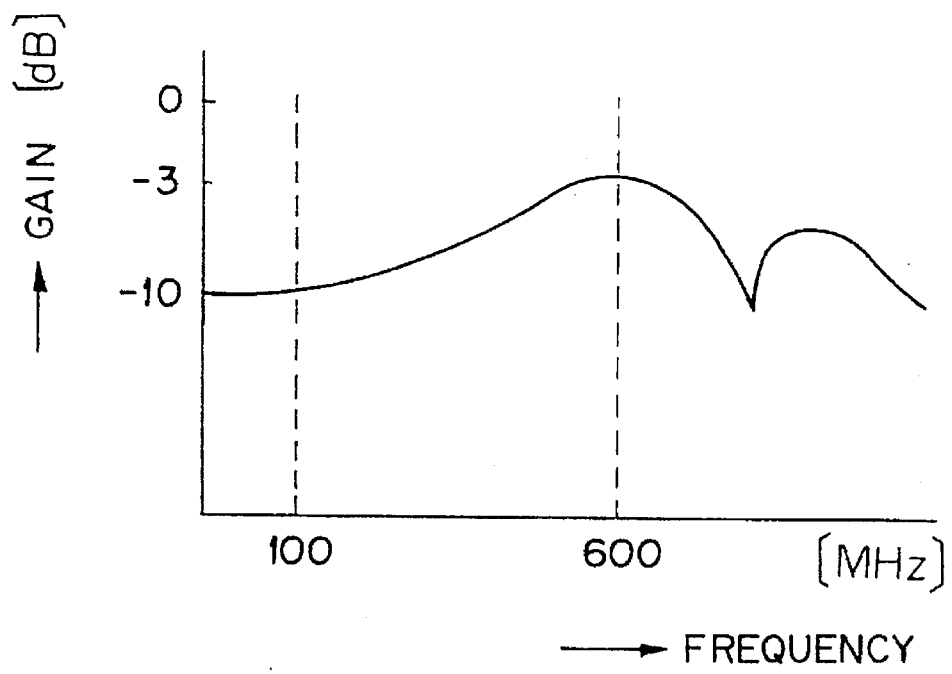

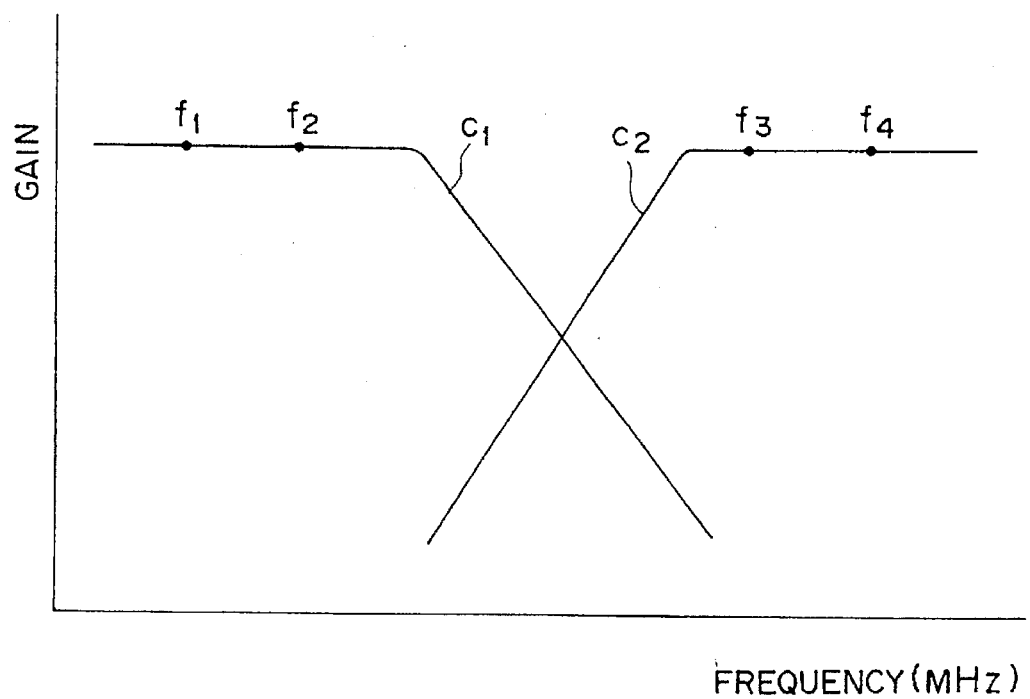
F I G. 50

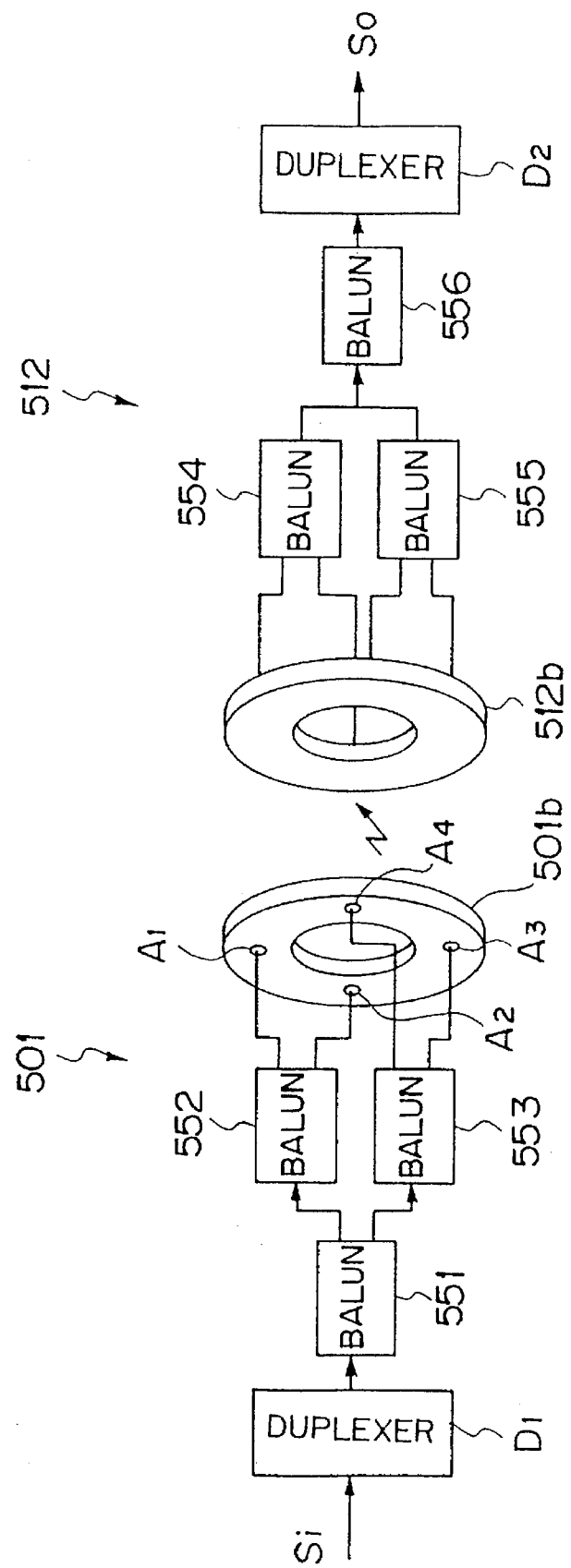

under the page number 5,668,514

SIGNAL TRANSMISSION DEVICE

BACKGROUND OF THE INVENTION

1. Field of the Invention

This invention relates to a signal transmission device, and more particularly to a signal transmission device for transmitting signal between a transmitting unit and a receiving unit which are rotated relatively to each other in a non-contacting manner.

2. Description of the Prior Art

Hitherto, between a transmitting unit and a receiving unit which are separately constructed and rotated in a non-contacting manner, a signal is transmitted by wireless transmission system utilizing transmitting and receiving antennas. However, in a wireless transmission system, intermixture of external noise is unavoidable, and therefore such a system is unreliable in accurate signal transmission. In this view, inventors of the present invention have proposed a signal transmission system for transmitting signal between a transmitting unit and a receiving unit which are rotated relatively to each other in a non-contacting manner. Such a signal transmission system is disclosed in Japanese Patent Applications Nos. 04-070640 and 04-291181. According to the signal transmission system mentioned above, signal is transmitted between transmitting unit and receiving unit in a non-contacting manner, and accordingly desired signal is reliably transmitted between units which are rotated relatively to each other.

However, in such a signal transmission system, there exist the following problems. Firstly, in the above system, signal is mainly transmitted by travelling wave component thereof which has wavelength corresponding to the frequency of signal to be transmitted. If magnitude level of the travelling wave component received by the receiving unit is not large enough, signal cannot be appropriately transmitted.

Secondly, there is such a problem that the gain of transmitted signal is not flat within the transmission frequency band thereof. Namely, the gains of the signal are different frequency to frequency, and peak points and bottom points of the transmission gain are repeatedly appears along a frequency axis. Accordingly, when a plurality of signals are modulated into different carriers within the transmission frequency band and then transmitted, a number of signals to be transmitted are limited by the transmission characteristics because the carrier frequencies have to be selected from the peak point frequencies where the transmission gain is sufficient. In addition, at frequencies slightly deviated from the peak point frequencies, the transmission gain is suddenly decreased and therefore transmission accuracy is deteriorated even if the peak point frequency is used as a carrier.

Thirdly, in such a signal transmission system, it is desired to perform bi-directional transmission. For example, in an inspection system in which objects are photographed by inspection cameras and quality of the objects are judged based on the image signals, inspection image signal is required to be transmitted from a detection unit to a signal processing unit while synchronizing signal for controlling the inspection cameras is required to be transmitted from the signal processing unit to the detection unit. In such a case, two signal transmission systems are prepared for the image signal transmission and the synchronizing signal transmission. However, in some kind of systems, it is difficult to provide a plurality of signal transmission systems. In addition, if bi-directional transmission is realized by a unique transmission device, the construction of the whole system and control of the system are simplified.

SUMMARY OF THE INVENTION

It is an object of the present invention to provide a signal transmission device capable of reliably and effectively transmitting travelling wave component of signal with high transmission gain.

It is another object of the present invention to provide a signal transmission device capable of efficiently transmitting signals according to kinds of the signals to be transmitted.

It is still another object of the present invention to provide a signal transmission device capable of stabilizing variation of transmission gains within transmission frequency band and performing accurate and reliable signal transmission.

It is still another object of the present invention to provide a signal transmission device capable of transmitting signals in bi-direction.

According to one aspect of the present invention, there is provided a signal transmission device including: a first body made of electromagnetic shielding material and fixed to a rotary shaft which passes through the first body, said first body revolving together with the rotary shaft around an axis of the rotary shaft; a second body made of electromagnetic shielding material and stationarily disposed around the rotary shaft; a first conductive element spirally formed on a first substrate in a manner that peak magnitude points of travelling wave component of transmission signal generated on the element are positioned out of alignment with each other between at least neighboring turns of the spiral element in radial direction of the spirally formed element, said first element being disposed in the first body; and a second conductive element formed on a second substrate and having a first width long enough to cover the spirally formed first element in the radial direction and a second width in a direction perpendicular to the radial direction, said second element being disposed in the second body.

According to the signal transmission device described above, the first conductive element is formed spirally so that the travelling wave of high magnitude level is radiated from the transmitting element. Therefore, the signal transmission can be reliably performed.

According to another aspect of the present invention, there is provided a signal transmission device including: a first body made of electromagnetic shielding material and fixed to a rotary shaft which passes through the first body, said first body revolving together with the rotary shaft around an axis of the rotary shaft; a second body made of electromagnetic shielding material and stationarily disposed around the rotary shaft; first conductive elements substantially concentrically formed on a first substrate in a manner that peak magnitude points of travelling wave component of transmission signal generated on the elements are positioned out of alignment with each other between at least neighboring elements in radial direction of the concentrically formed elements, said first element being disposed in the first body; and a second conductive element formed on a second substrate and having a first width long enough to cover the concentrically formed first elements in the radial direction and a second width in a direction perpendicular to the radial direction, said second element being disposed in the second body.

According to the signal transmission device described above, image signal for which high transmission accuracy is required is transmitted by the spiral elements and synchronizing signal for which noise allowable range is relatively broad is transmitted by the ring-shaped elements. Therefore, the inspection system can be improved in views of both reliability and manufacturing cost.

According to still another aspect of the present invention, there is provided a signal transmission device including: a first body made of electromagnetic shielding material and fixed to a rotary shaft which passes through the first body, said first body revolving together with the rotary shaft around an axis of the rotary shaft; a second body made of electromagnetic shielding material and stationarily disposed around the rotary shaft; a first conductive element disposed in the first body; a second conductive element disposed in the second body; a first balun unit for converting impedance of a signal to be transmitted and supplying the converted signal to multiple signal-input points of one of the first and second conductive element; and a second balun unit for receiving signal from multiple signal-output points of the second element, converting impedance of the received signal to produce a signal.

According to the signal transmission device described above, signal to be transmitted is equally supplied to multiple signal input points on the first conductive element via baluns. Therefore, signal reflection is absorbed. Further, signal transmission intensity between the elements is averaged, and therefore signal is stably transmitted with less variation of transmission gain within the signal transmission band. Still further, signal deterioration due to disturbance from external or variation of physical shapes of the elements may be avoided.

According to still another aspect of the present invention, there is provided a signal transmission device including: a first body made of electromagnetic shielding material and fixed to a rotary shaft which passes through the first body, said first body revolving together with the rotary shaft around an axis of the rotary shaft; a second body made of electromagnetic shielding material and stationarily disposed around the rotary shaft; a first conductive element disposed in the first body; a second conductive element disposed in the second body; a first duplexer for passing signal within a first predetermined frequency band and supplying the passed signal to the first conductive element; and a second duplexer for receiving signal from the second element and passing signal within a second frequency band.

According to the signal transmission device described above, bi-directional transmission is realized in a rotary system in which portion of the system revolves.

BRIEF DESCRIPTION OF THE DRAWINGS

FIG. 14 is a diagram indicating variation of travelling wave components on the transmitting element;

FIG. 15 is a diagram illustrating the travelling wave component existing on the whole transmitting element;

FIG. 31 is a view showing feature of receiving unit shown in FIG. 29;

FIGS. 36A and 36B are signal transmission device according to another modification of the second embodiment;

FIG. 43 is a diagram illustrating transmission characteristic according to the device of the third embodiment;

FIG. 50 is a diagram illustrating transmission characteristics of duplexers;

FIG. 52 is a diagram illustrating a modification of the fourth embodiment.

DESCRIPTION OF THE PREFERRED EMBODIMENTS

Preferred embodiments of the present invention will be described below with reference to the accompanying drawings.

Rotary Tube Inspection system:

Prior to describing preferred embodiments of signal transmission device according to the invention, a rotary tube inspection system to which the signal transmission device is applied will be described below.

Figure 1:
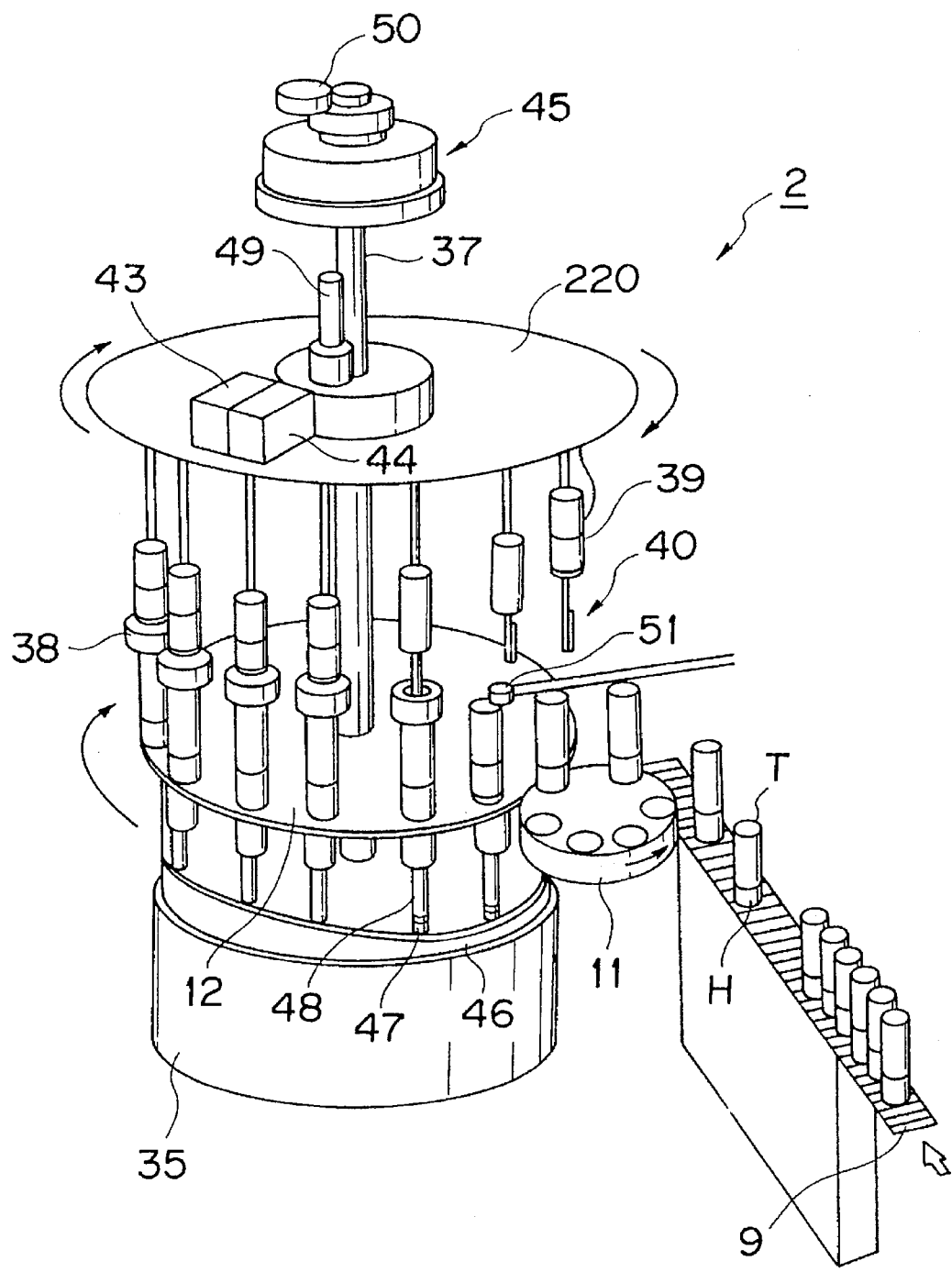
FIG. 1 is a perspective view of a rotary tube inspection system according to the present invention.
Figure 2:
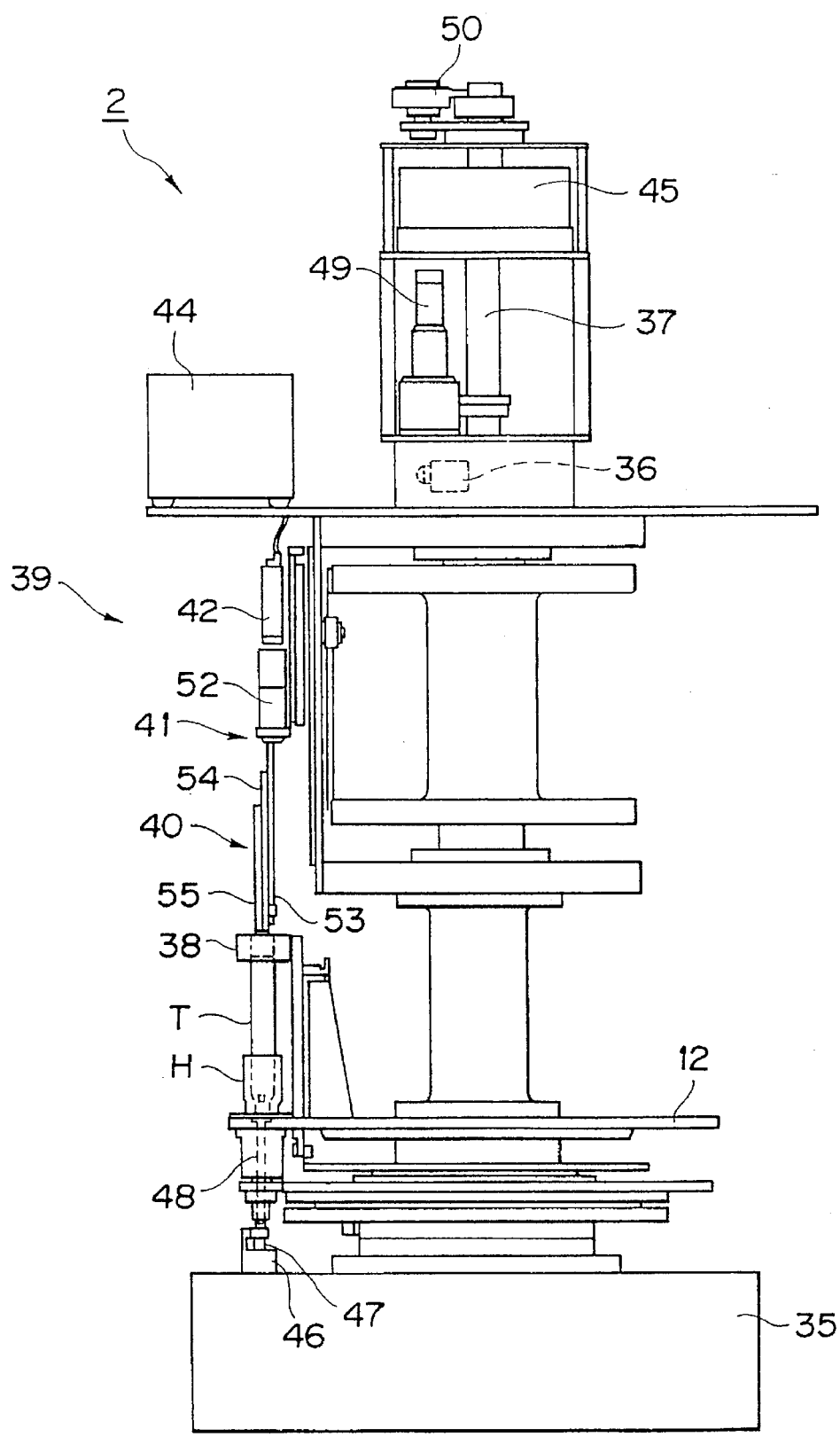
FIG. 2 is a side view of the rotary tube inspection system shown in FIG. 1.

FIGS. 1 and 2 illustrate a construction of a rotary tube inspection system to which a signal transmission device of the present invention is applied. As illustrated, the rotary tube inspection system 2 includes a base 35, a motor 36, a rotary shaft 37, a rotary inspection table 12, a cam 46, a cam follower 47, centering shafts 48, centering jigs 38, inspection devices 39, a camera selector 43, a mixer 44, a signal transmission device 45 to which signal transmission device is applied, a rotary resolver 49, a fixed resolver 50, a light quantity checker 51. The rotary tube inspection system 2 inspects laminate tubes T and produces inspection image signal. The inspection image signal is transmitted to a signal processing unit via the signal transmission device 45, the details of which will be described later.

At the center of the base 35, a fixed shaft (not shown) is provided, and the rotary shaft 37 has a shaft center common to that of the fixed shaft so that the rotary shaft 37 covers the fixed shaft. The rotary shaft 37 is rotationally driven by the motor 36. The rotary resolver 49 and the fixed resolver 50 are provided to measure angular position of the fixed shaft and the rotary shaft 37. The rotary inspection table 12 is coupled to the rotary shaft 37 and revolves in association with the rotary shaft. On the rotary inspection table 12, the holder H for holding the tube T can be mounted. The holder H is moved up and down and rotated by the centering shaft 48. Upward and downward movement of the holder H is carried out by the cam 46 and the cam follower 47 provided at the lower end of the centering shaft 48. Into the holder H, the squeezing exit side of the laminate tube T may be inserted. The centering jig 38 for circularly holding the rear side of the tube T is supported at the upper portion of the holder H. The inspection device 39 for inspecting inside of the laminate tube T includes an insertion portion 40, a bore scope 41 and a CCD camera 42. The bore scope 41 includes a bore scope body 52 and a bore scope insertion portion 53. The insertion portion 40 includes the bore scope insertion portion 53, a light emitting diode section 54 and a photo sensor 55. The bore scope insertion portion 53 mainly inspects the internal bottom surface side, i.e., the squeezing opening side, in the figure of the laminate tube T, and the photo sensor 55 mainly inspects the internal side surface of the laminate tube T.

Figure 3:
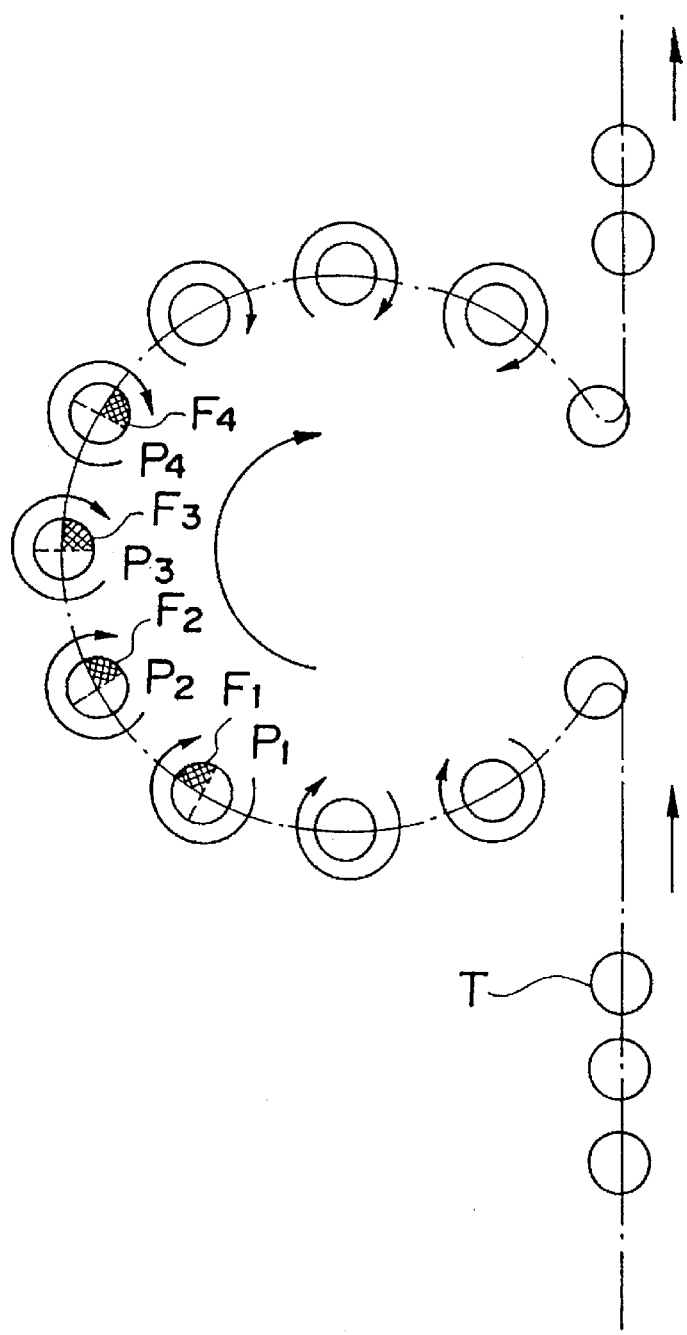
FIG. 3 is a diagram illustrating movement of laminate tube in the system shown in FIGS. 1 and 2.

Next, an operation of the rotary tube inspection system will be described with reference to FIGS. 1 to 3. As shown in FIG. 1, a laminate tube T is held by the holder H and transferred to the star wheel 15 by the carrying conveyer 9. The star wheel 11 takes out the laminate tube T with the holder H and disposes it on the rotary inspection table 12 of the inspection system 2. After being disposed on the rotary inspection table 12, the holder H moves upwardly and downwardly according to the movement of the centering shaft 48 which follows the curve of the cam 48, and revolves intermittently around the centering shaft 48. Namely, as shown in FIG. 3, the laminate tube T revolves on its axis while revolving around the rotation shaft 37 in the rotating direction of the rotary inspection table 12. In the revolution, the laminate tube T pauses the revolution at the positions $P_1$ to $P_4$ for a predetermined time. When the holder H moves upwardly, the laminate tube T also moves upwardly, and the insertion portion 40 of the tube inspection device 39 is inserted into the laminate tube T circularly held by the centering jig 38. In this way, the laminate tube T intermittently revolves on its axis at the positions $P_1$ to $P_4$ with the insertion portion 40 being inserted, and the tube inspection device 39 inspects bottom and internal wall of the tube at the periods from $P_1$ to $P_4$. The light quantity of the insertion portion 40 is checked by the light quantity checker 51 before the insertion thereof, and the result is used in data processing. If the light quantity is less than a reference value, an alarm is issued and the light emitting element is exchanged, if necessary.

Figures 4A, 4B, 4C, 4D:
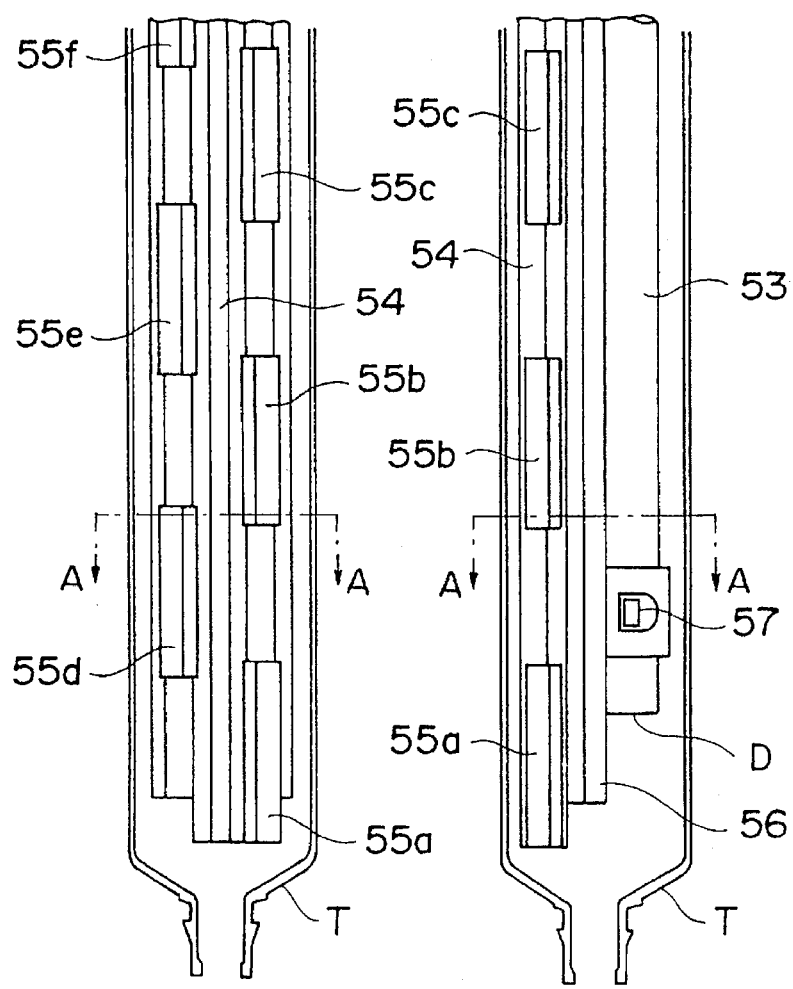
FIGS. 4A-4D are cross sectional views of an insertion portion of the rotary tube inspection system.
Figures 5A, 5B:
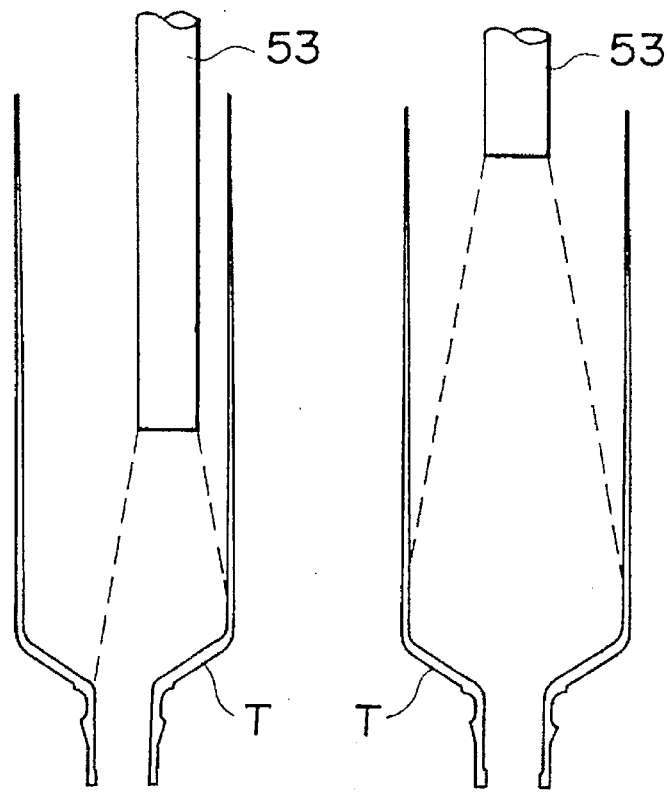
FIGS. 5A-5D are diagrams illustrating inspection manner of the laminate tube according to the rotary tube inspection system.
Figures 5C, 5D:
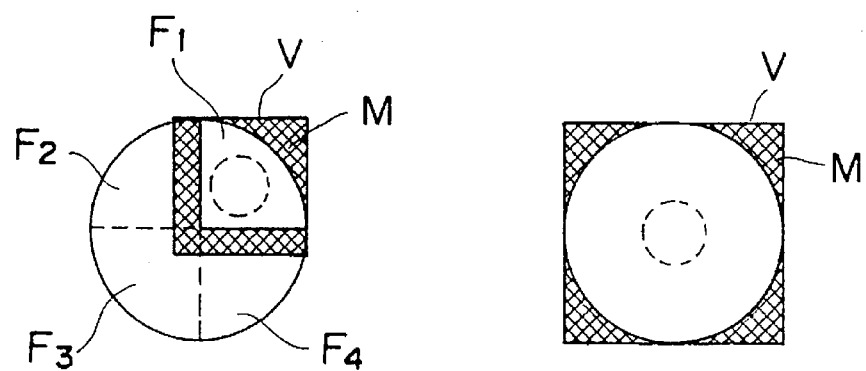

Next, construction and operation of the insertion portion 40 will be described in more detail with reference to FIGS. 4A–4D and FIGS. 5A–5D. FIG. 4A is a cross sectional view of the insertion portion 40 with the bore scope being inserted, and FIG. 4B is a cross sectional view of the bore scope insertion portion 53. FIGS. 4C and 4D are cross sectional views of the insertion portion 40 sliced along the B—B line and the C—C line shown in FIG. 4A. The insertion portion 40 includes a light emitting diode section 54 and photo-sensors 55a, 55b, 55c, 55d, 55e and 55f which are fixed to the bore scope insertion portion 53 by a metal fitting 56 and a bolt 57. As shown in FIG. 4B, at the bore scope insertion section 53, a lens section 60 for picking up an image is provided inside of a stainless tube 58, and a light source bore fiber section 59 including a fine grass fiber is provided around the lens portion 60. In FIG. 4B, while the end surface D of the bore scope insertion section 53 is perpendicular to the axis of the bore scope insertion section 53, it may take a form obliquely cut at certain angle with respect to the axis. In this case, visual field is expanded not only in a vertical downward direction but also in an oblique direction. The bore scope insertion section 53 is inserted into the laminate tube T in the state eccentric with respect to the axis thereof. This is illustrated in FIGS. 5A to 5C. Namely, the inspecting region $F_1$ of the bore scope insertion portion 53 becomes a portion of quadrant obtained by eliminating a mask portion (hatched portion M) from a square camera visual range V. The laminate tube T intermittently performs, as shown in FIG. 3, revolution on its axis and temporarily pauses the revolution at the inspection positions $P_1$, $P_2$, $P_3$ and $P_4$. For this reason, the region $F_1$ can be inspected during the stopping period at the position $P_1$. Similarly, the region $F_2$ is inspected during the stopping period at the position $P_2$. In the same manner, the regions $F_3$ and $F_4$ are inspected during the stopping period at the positions $P_3$ and $P_4$, respectively. In this way, the bottom area of the laminate tube T divided into the inspection regions as shown in FIG. 4A and 4C, and image pickup is carried out in the state where the bore scope insertion portion 53 is positioned close to the bottom of the laminate tube T, thereby making it possible to further improve the resolution as compared with the method of locating the bore scope insertion portion 53 on the axis of the laminate tube T to carry out inspection as a single inspection region as shown in FIGS. 4B and 4D. Thus, this method can detect a defect of a more fine mixture or flaw, etc. It is to be noted that the number of division of the bottom area is not limited to four, but may be other values.

The light emitting diode section 54 has a length long enough to cover the internal wall surface from the bottom to the upper opening of the laminate tube T, so that it can light the inside wall surface from the upper end to the lower end. Respective pairs of photo-sensors 55a–55c and 55d–55f are attached on the light emitting diode section 54 along the both side lines thereof. As shown in FIG. 4C, these photo-sensors are provided so that inspection regions overlap with each other. By such a construction, photo-sensors 55a to 55f can inspect the inside wall surface of the laminate tube T while it is revolving on its axis. In this case, photo-sensors 55a to 55f may be provided in a single alignment, and photoelectric conversion elements, e.g., CCD element, other than the photo-sensor may be alternatively employed.

Figure 6:
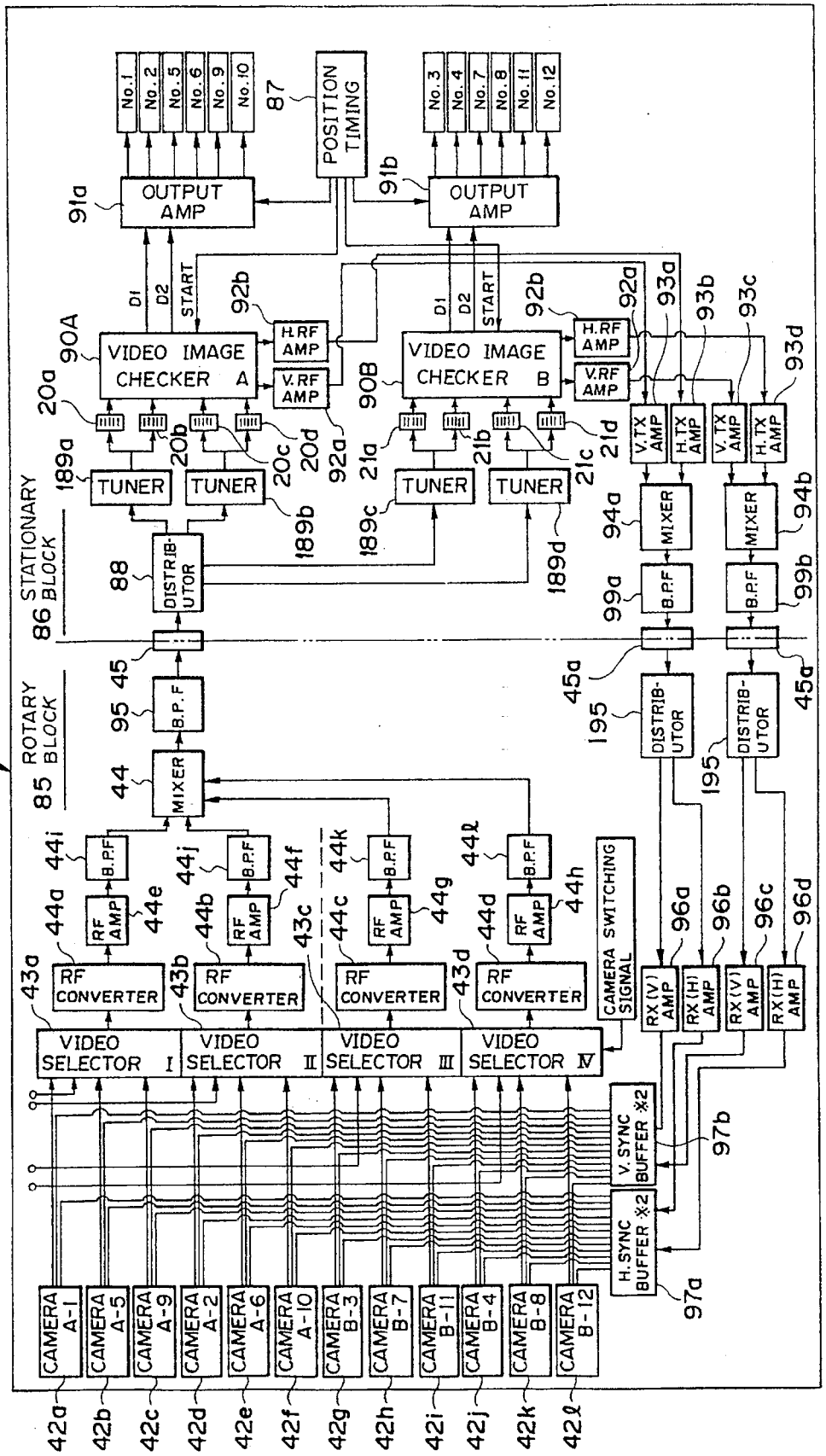
FIG. 6 is a block diagram illustrating a signal processing according to the rotary tube inspection system.

Next, processing of the inspection image signal picked up by the inspection device 39 will be described. The following description is only directed to the processing of inspection image signals taken by the CCD cameras 42, for the sake of simplicity. FIG. 6 is a block diagram illustrating signal processing unit. The signal processing unit is roughly divided into two units, a rotary block 85 and a stationary block 86. The rotary block 85 corresponds to the side of the tube inspection system 2 for picking up inspection image signals using the CCD cameras 42. The stationary block 86 is an unit for judging the quality of the laminate tube T based on the inspection image signals picked up by the CCD cameras 42 in the rotary block 85. The inspection image signals are supplied to the signal transmission device 45 which transmits the inspection image signals to the stationary block 86 while one side of the signal transmission device being revolving. The details of the signal transmission device will be described later. As shown in FIG. 6, the rotary block 85 includes twelve CCD cameras 42a to 42l, and VIDEO selectors 43a, 43b, 43c and 43d to sort twelve CCD cameras into four groups each having three cameras to select one of three cameras to obtain the inspection image. Inspection image selected by the VIDEO selectors 43a, 43b, 43c and 43d are converted by an RF converter. These signals thus obtained are amplified by RF amplifiers 44e, 44f, 44g and 44h. The signals amplified by the RF amplifiers 44e, 44f, 44g and 44h are passed through band pass filters (BPF) 44i, 44j, 44k and 44l. Thereafter, these signals are sent to a mixer 44 for mixing signals selected by the four VIDEO selectors 43a, 43b, 43c and 43d. A signal output from the mixer 44 is sent to the signal transmission device through the BPF 95. The signal transmission device 45 transmits the signal from the rotary block 85 to the stationary block 86 in non-contacting manner while rotary block side of the signal transmission device being revolving. Details of the signal transmission device according to the present invention will be described later.

The image signal is delivered to the distributer 88 from the signal transmission device 45. The stationary block 86 includes a distributor 88 for distributing the received image signal into four tuners, 88a, 88b, 88c and 88d corresponding to frequencies converted by the previously described four RF converters 44a, 44b, 44c an 44d, and memory sections 20a, 20b, 20c, 20d, 21a, 21b, 21c and 21d for recording images reproduced by the above mentioned four tuners 89a, 89b, 89c and 89d. Then, image data stored in the memory sections 20a, 20b, 20c and 20d are delivered to the video image checkers 90A and 90B for processing the image data. Data processed by the video image checkers 90A and 90B are output as judgement outputs through output amplifiers 91a and 91b. On the other hand, horizontal and vertical synchronizing signals are output from the video image checkers 90A and 90B, and are amplified by signal amplifiers 92a and 92b, respectively. Then, synchronizing signals from the signal amplifiers 92a and 92b are transmitted to respective amplifiers 93a, 93b, 93c and 93d, and amplified by them. Thereafter, synchronizing signals from the amplifiers 93a, 93b, 93c and 93d are mixed by mixers 94a and 94b. The mixed signals thus obtained are sent to the rotary block 85 through the BPFs 99a and 99b and the signal transmission device 45. A signal received by the signal transmission device of the rotary block 85 side is distributed into two sets of amplifiers on the receiving side by the distributors 195. Signals output from the amplifiers 96a, 96b, 96c and 96d are sent to the CCD cameras 42a to 42l through buffers 97a and 97b. At this time, the synchronizing signals are distributed so that the respective video checkers correspond to the respective cameras taken in charge of the respective video checks. These synchronizing signals are transmitted together with image signals from the CCD cameras, and those image signals are discriminated in the stationary block 86 in accordance with the synchronizing signals. By the video image checkers 90A and 90B, image signals to be processed are binarized. As a result, if any foreign material, such as defect or contaminant, is not found, an OK signal is output to the amplifiers 91a and 91b, while if any foreign material is found, no good signal is output thereto. The amplified signals are output as judgement output indicating the quality of the laminate tube T from those amplifiers.

Signal Transmission Device:

Next, preferred embodiments of signal transmission device according to the present invention will be described below.

Figure 7:
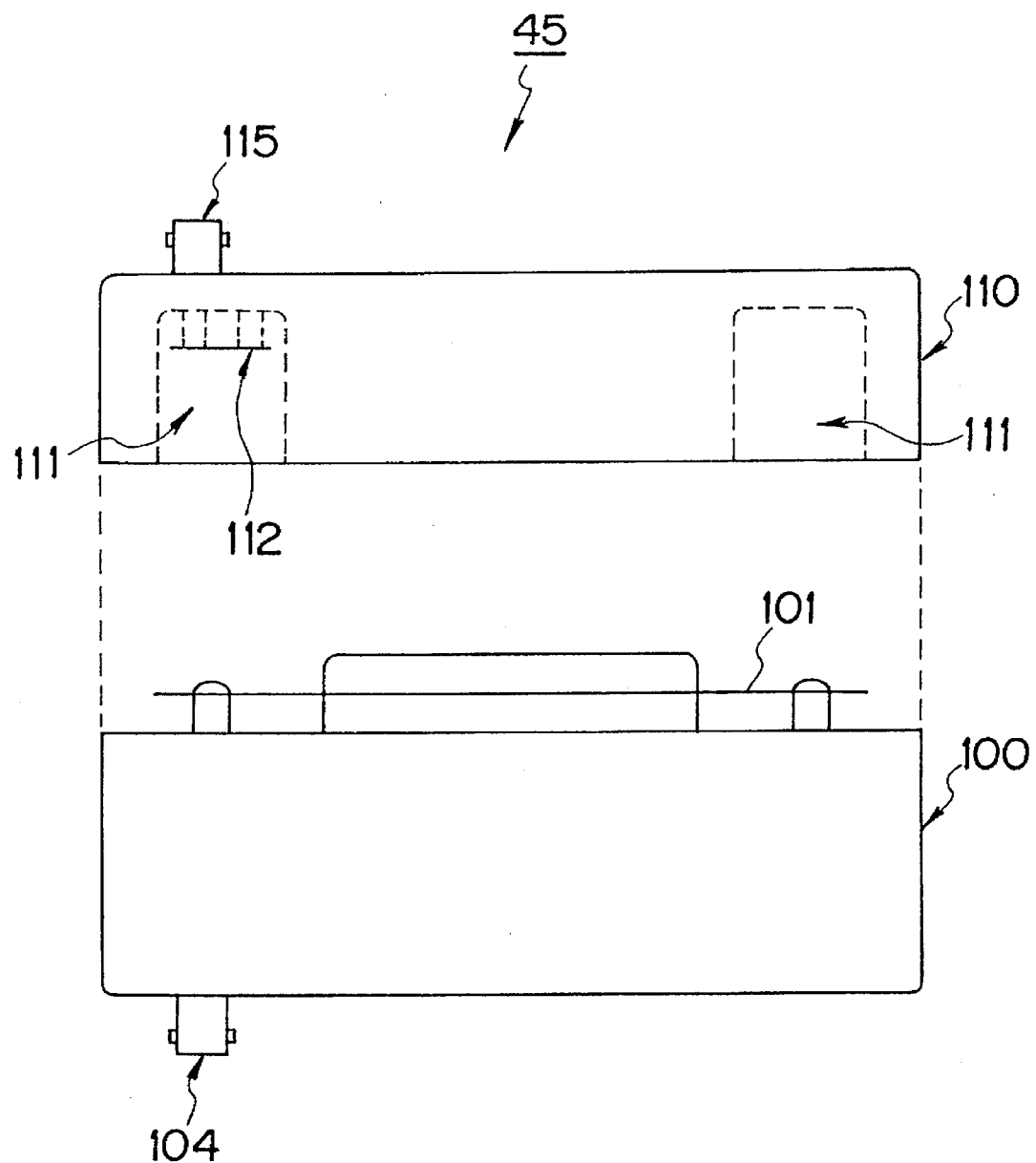
FIG. 7 is a side view of a signal transmission device according to the first embodiment of the invention.
Figure 8:
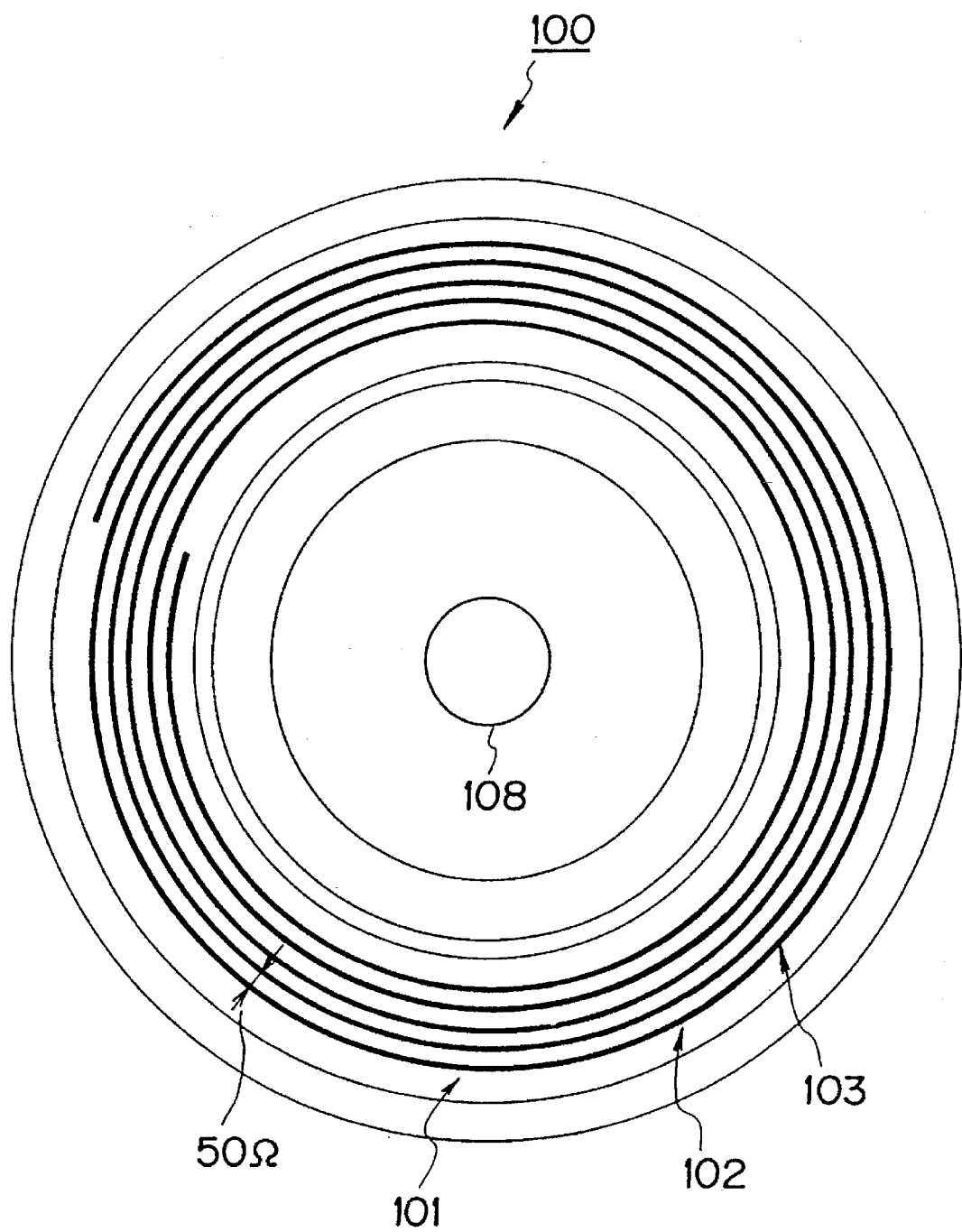
FIG. 8 is a plan view showing inside of transmitting unit of the device shown in FIG. 7.
Figure 9:
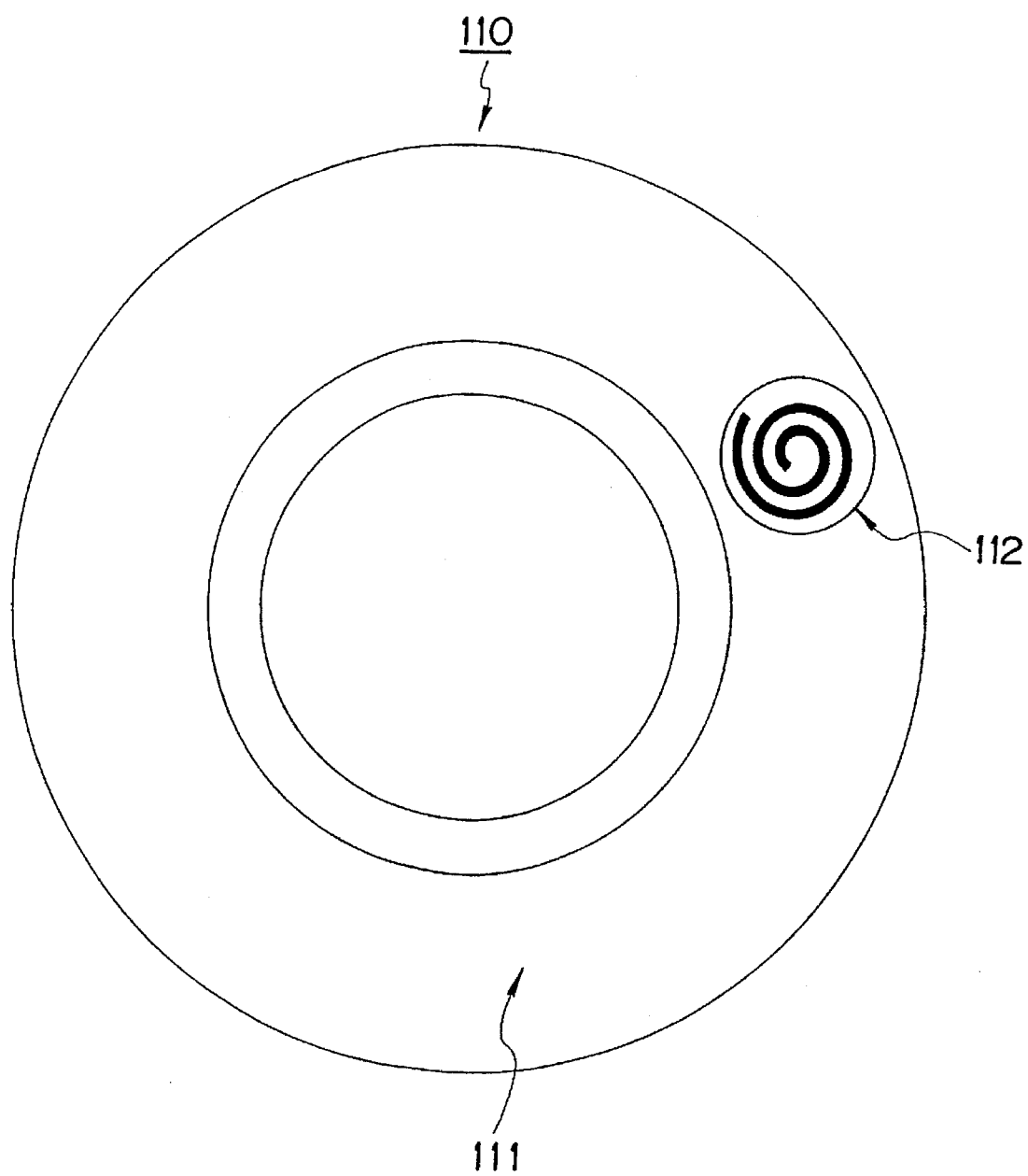
FIG. 9 is a plan view showing inside of receiving unit of the device shown in FIG. 7.
Figure 10A:
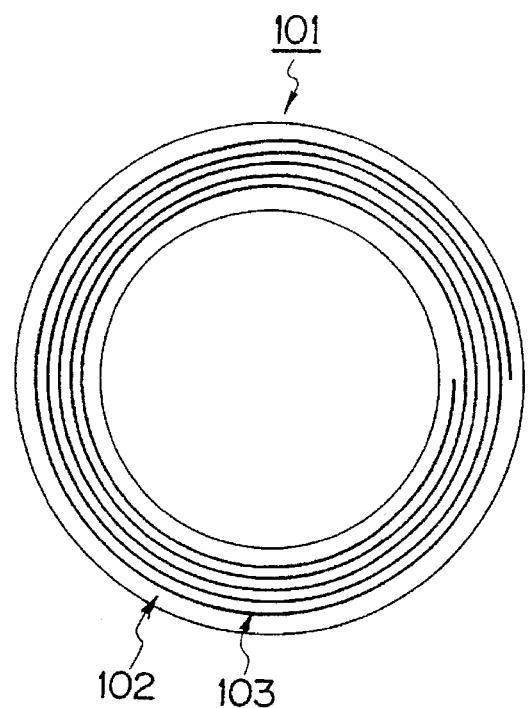
FIGS. 10A and 10B are plan views showing transmitting element and receiving element used in the device shown in FIG. 7.
Figure 10B:
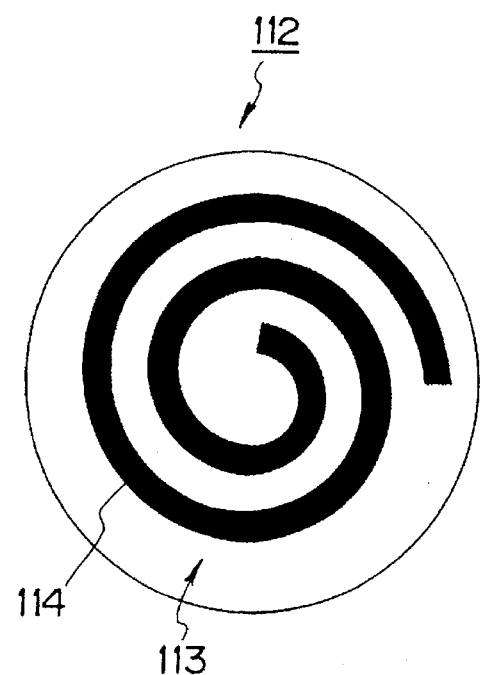

(1) 1st embodiment:

FIGS. 7 to 9 illustrate a construction of a signal transmission device of the first embodiment. FIG. 7 is a side view of the signal transmission device 45. As illustrated in FIG. 7, the signal transmission device 45 includes a transmitting unit 100 and a receiving unit 110. FIG. 8 is a plan view showing inside of the transmitting unit 100, and FIG. 9 is a plan view showing inside of the receiving unit 110. The transmitting unit 100 and the receiving unit 110 are coupled with each other in the vertical direction, as shown in FIG. 7, and inside of the signal transmission device thus coupled is electromagnetically shielded from external. The transmitting unit 100 and the receiving unit 110 are constantly opposite to each other while one of them is revolving, and therefore signal is reliably transmitted during the revolution. In addition, since the device is thus shielded, signal transmission is not disturbed by external noise and the transmission signal does not leak out to the external. In consideration of the shielding property, the transmitting unit 100 and the receiving unit 110 are made of A1 aluminum, for example. The transmitting unit 100 is provided with an opening 108 for holding the rotary shaft 37 which passes through the opening 108, and the transmitting unit 100 revolves around the rotary shaft 37 according to the revolution of the rotary shaft 37. In the transmitting unit 100, mixer 44 and BPF 95 (not shown in FIG. 7) are installed. Signal from the BPF 95 is supplied to a transmitting element substrate 101 horizontally held in the transmitting unit 100. FIG. 10A illustrates transmitting element surface of the transmitting element substrate 101. The transmitting element substrate 101 is comprised of a glass epoxy resin substrate 102 on which a transmitting element 103 made of copper is spirally formed. Signal from the mixer 44 is radiated from the transmitting element 103. On the other hand, the receiving unit 110 is provided with a ring-shaped groove 111 in which a receiving element substrate 112 is horizontally held, as shown in FIG. 7. FIG. 10B illustrates the shape of the receiving element substrate 112. The receiving element substrate 112 is comprised of a glass epoxy resin substrate 113 on which a receiving element 114 made of copper whose length is ¼ of transmitting signal wavelength is spirally formed. In signal transmission, the transmitting unit 100 revolves according to the revolution of the rotary shaft 37 while the receiving element 110 is fixed. The transmitting element 101 and the receiving element 112 confront with each other with a spacing of approximately 5 mm therebetween. Therefore, according to the revolution of the rotary shaft 37, transmitting unit 100 revolves. This is equivalent to moving the receiving element 112, with the spacing to the transmitting element, along the transmitting element 101. Thereby signal is transmitted. The transmitting unit 100 and the receiving unit 110 are provided with BNC connecters 104 and 115 and lead wires (not shown) for inputting and outputting signals, respectively. It is noted that the transmitting element 101 and the receiving element 112 are required to revolve relatively, and either one of them may be revolved.

Next, principle of the signal transmission will be described. In the present invention, signal transmission between the transmitting element and the receiving element is performed by capacitive coupling of travelling wave produced on the transmitting element, that is, current component of the transmitted signal. Accordingly, it is required to effectively radiate travelling wave at high level from the transmitting element. In view of this, in the present invention, the transmitting element is wound spirally so that the travelling wave of high magnitude level is radiated from the transmitting element.

Figure 11:
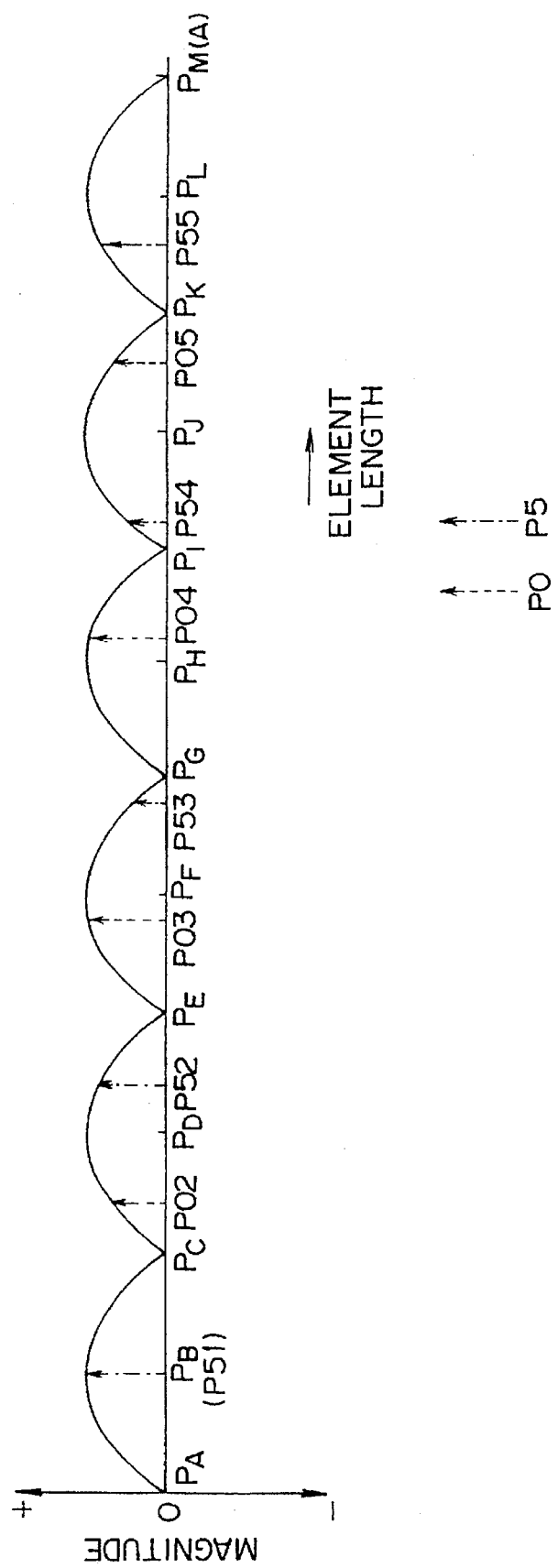
FIG. 11 is a diagram illustrating a travelling wave generated on the transmitting element.
Figure 12A:
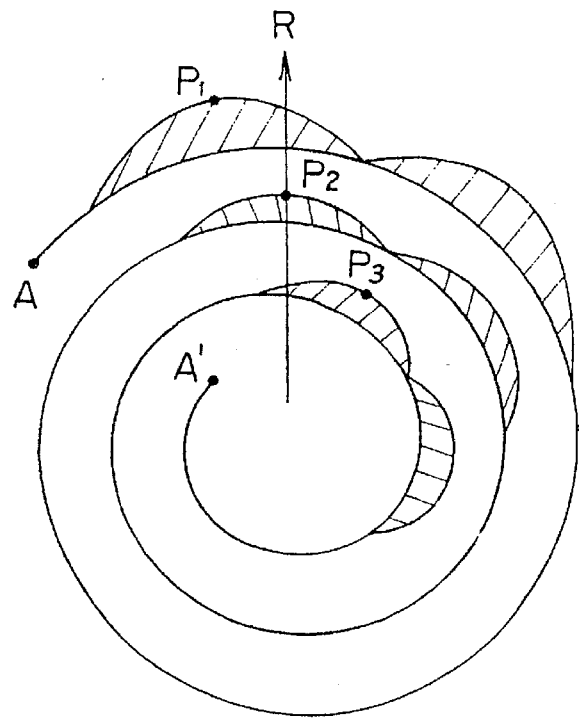
FIGS. 12A and 12B are diagrams illustrating travelling wave on each turns of the transmitting element.
Figure 12B:
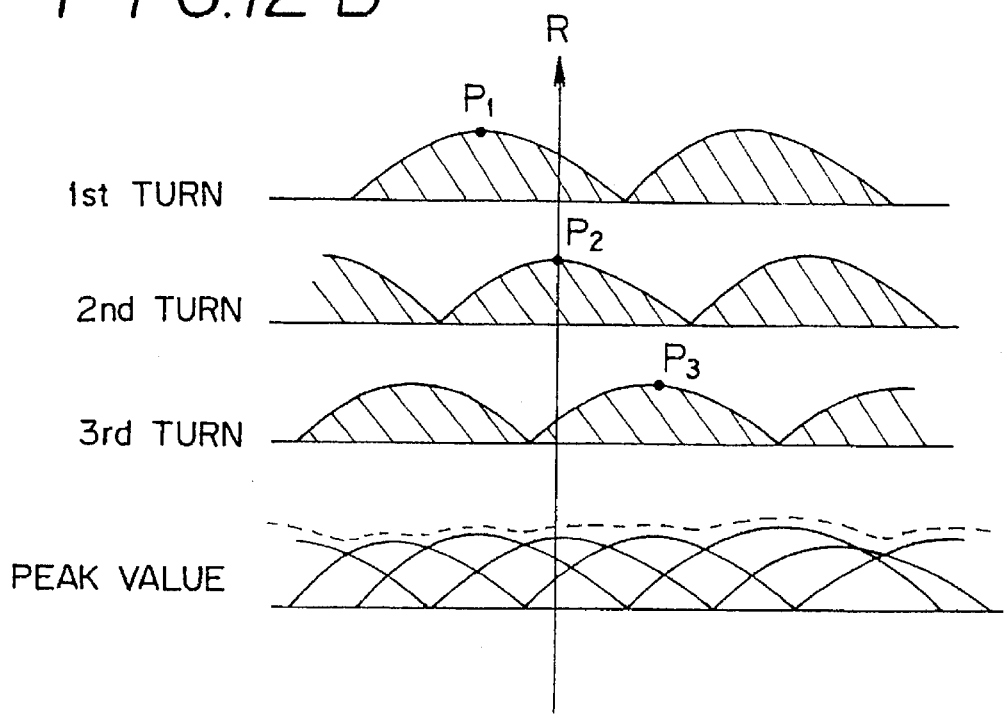

Next, method of forming transmitting element will be described. Assuming that the transmission signal frequency is 500 MHz, a travelling wave of 60 cm for one wavelength is generated, and signal is transmitted by the travelling wave. As illustrated in FIG. 11, the travelling wave has a certain magnitude level, and the magnitude level differs between peak portions and bottom portions. Therefore, if the travelling wave is transmitted in this state, signal transmission is effectively performed at high magnitude level portions but is not efficiently performed at low magnitude level portions. For this reason, in the present invention, the transmitting element is wound spirally for a plurality of times so that low magnitude level portions are compensated for by the high magnitude level portions of the transmitting element thus wound, thereby maintaining magnitude level of the transmitting element as a whole to be constantly at high magnitude level. FIG. 12 schematically illustrates this concept. On a linear transmitting element, travelling wave depending on the transmission signal frequency is generated, as shown in FIG. 11. This linear transmitting element is wound spirally to form a spiral coil. Now, paying attention to one radial direction of the spirally wound element, if the element is wound in such a manner that a peak portion of the level in a first turn and a bottom portion of the level in a second turn are coincident with each other in the radial direction, the magnitude level of the travelling wave in this region becomes close to the peak value (magnitude level of the peak portion). In this way, by compensating for the low magnitude level portions by the high magnitude level portions in the radial direction, magnitude level of the travelling wave as a whole element becomes close to its peak value. FIG. 12A illustrates an example in which a linear element is wound three times, and FIG. 12B illustrates a case in which the three turns of the element is supposed to be nearly parallel. As illustrated, in the radial direction R, travelling wave components of each turns are mixed with each other, and the magnitude level of the travelling wave component becomes close to the peak level indicated by the dotted line in FIG. 12B. As described above, by mixing the magnitude levels of each turns, magnitude level of the travelling wave radiated by a whole transmitting element becomes high level.

Figure 13:
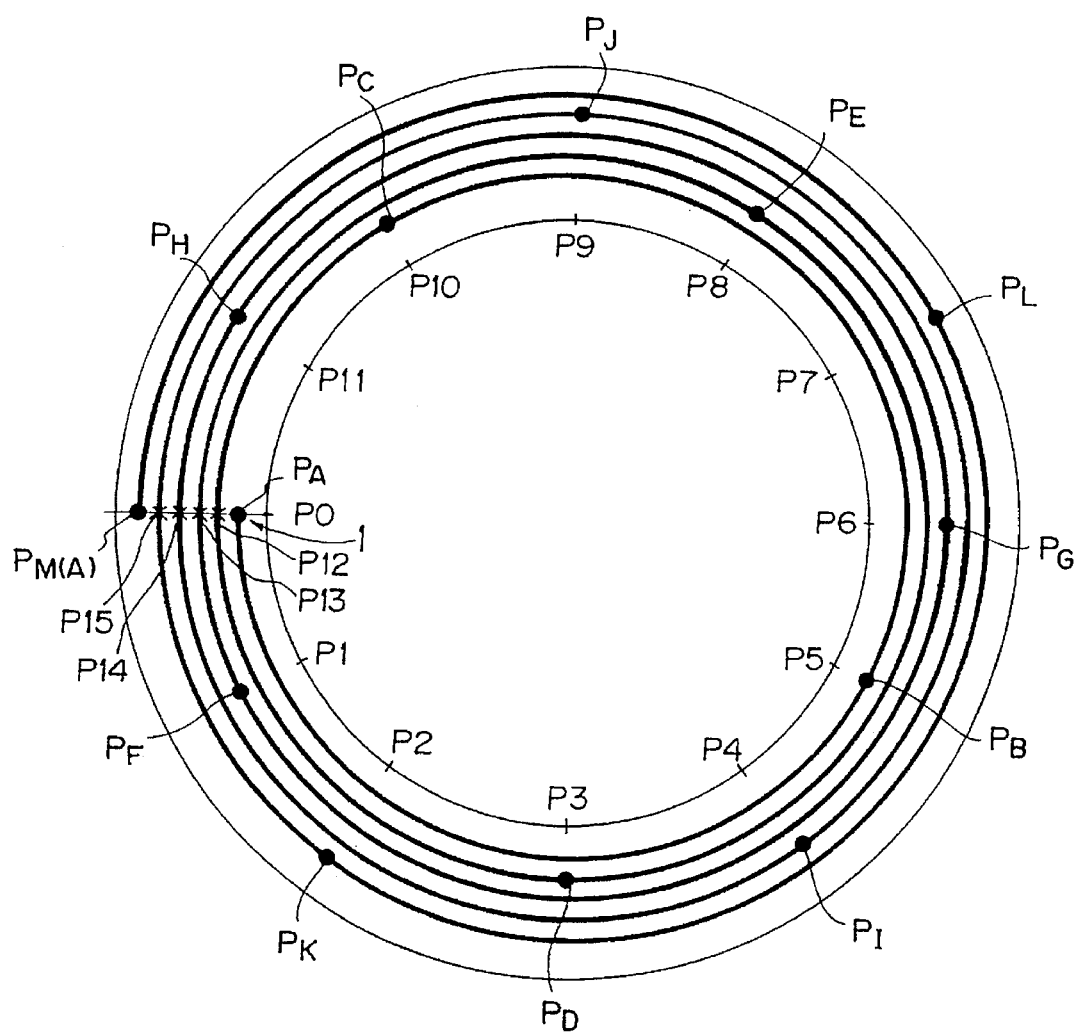
FIG. 13 is a plan view showing surface of the transmitting element.

Next, an example of the transmitting element thus formed will be described with reference to FIGS. 11 and 13. FIG. 11 illustrates a linear conductive wire serving as transmitting element whose length corresponds to three wavelengths of the travelling wave theoretically generated. Since the length of the element is decided to be three wavelengths of the travelling wave, the travelling wave is allocated on the element in a manner Shown in FIG. 11. Each point of the element is applied references $P_A$–$P_M$, as shown in FIG. 13. This element is spirally wound to outer direction as shown in FIG. 13. Here, radial direction of the spiral element is divided into 12 regions and 12 radial directions P0–P12 are defined. The points $P_A$–$P_M$ in FIG. 11 are indicated in FIG. 13 as black points. Now, attention is paid to the point P0 and points on the element in the radial direction P0 are defined as P01–P05, the magnitude levels of the travelling wave in this radial direction are as indicated in FIG. 11 by the dotted arrows. In the same manner, magnitude levels of points in the radial direction P5 are indicated by arrows in FIG. 11. FIG. 14 shows amplitude levels of travelling wave in each radial directions P0–P11. From this result, magnitude level of the travelling wave as a whole element becomes close to the peak level, as indicated in FIG. 15. In FIG. 13, the edge points $P_A$ and $P_M$ are on an identical radial direction, however, it is unnecessary that the both edge points of the element are located on the identical radial direction.

Figure 16:
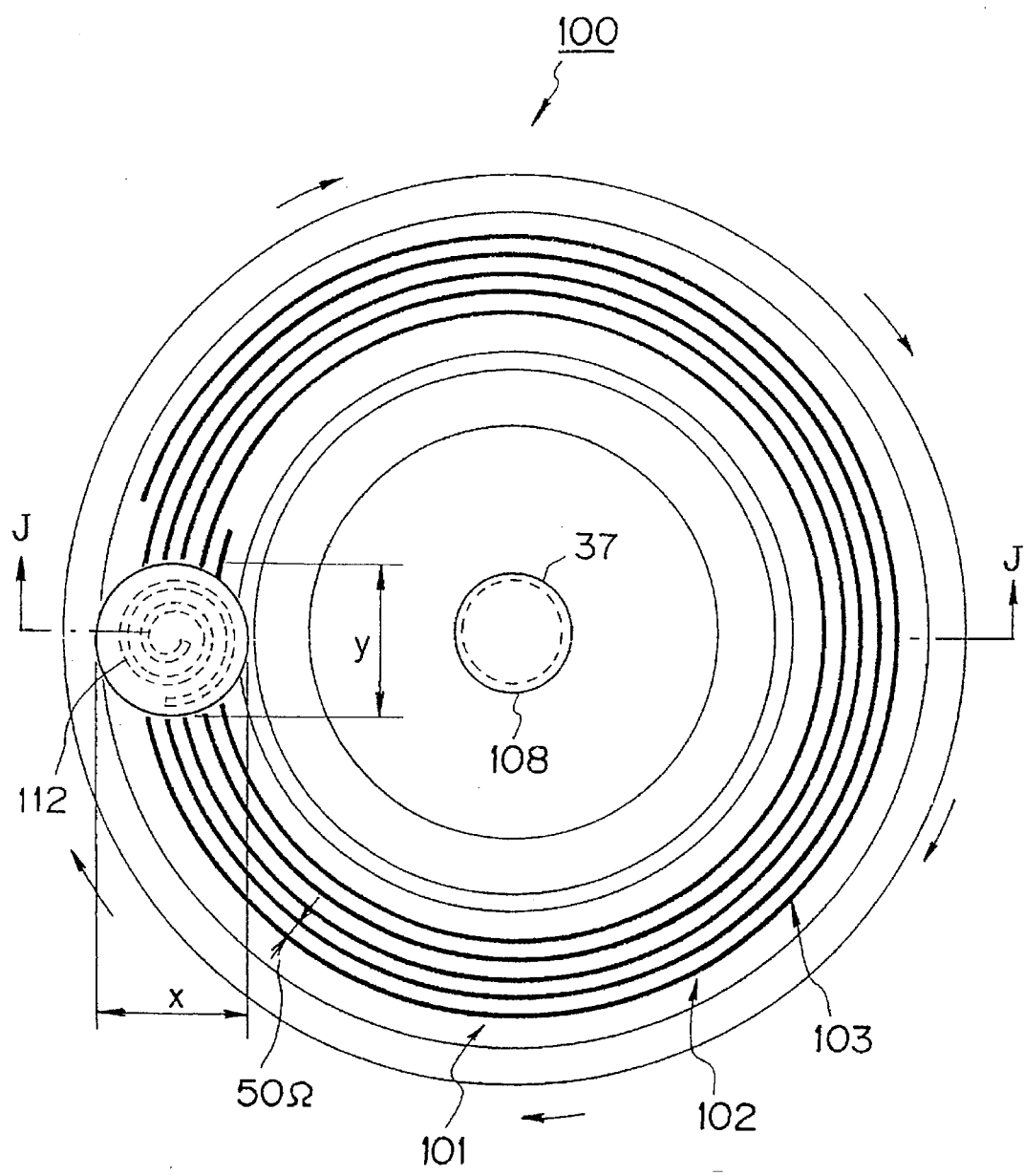
FIG. 16 is a diagram illustrating relative positional relation of the transmitting element and the receiving element.
Figure 17:
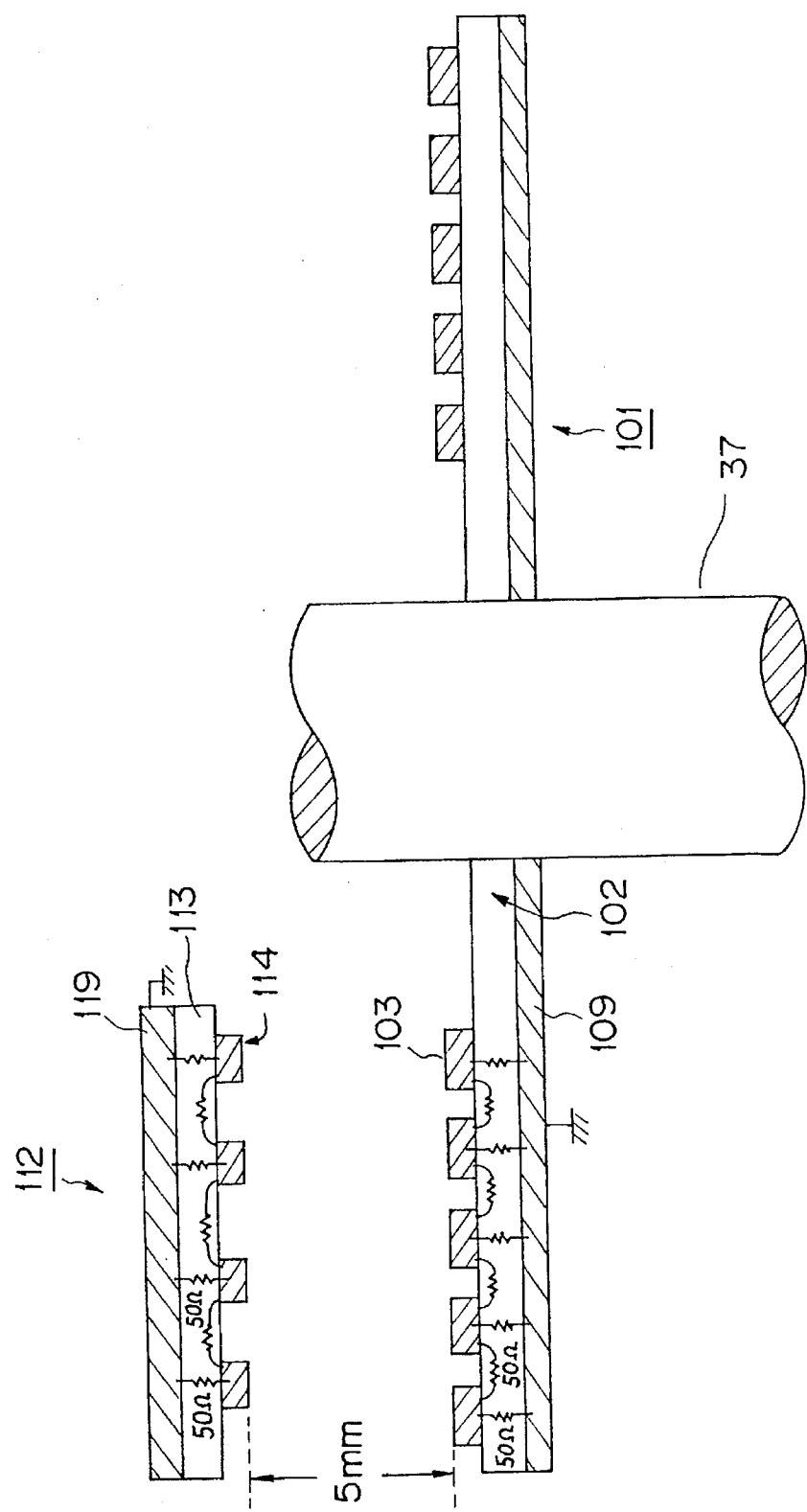
FIG. 17 is a cross sectional view illustrating the construction of the transmitting element and the receiving element.

Next, specific structure of the transmitting element and the receiving element will be described. FIG. 16 illustrates relative positional relation between the transmitting element and the receiving element, and FIG. 17 illustrates a sectional view of J—J line in FIG. 16. The transmitting element 103 is formed spirally on one surface of the glass epoxy resin substrate 102, and a GND surface 109 is formed on the other surface of the glass epoxy resin substrate 102. Every portion of the transmitting element 103 has impedance 50Ω with respect to the GND surface 109. In addition, each turn of the spirally wound transmitting element 103 has impedance of 50Ω with respect to the neighboring turns. It is noted that the resistors shown in FIG. 17 indicates resistance between the portions, and they do not mean that the resistors are actually provided. By forming the element in this manner, magnitude levels of the element at portions are compensated for by each other and the magnitude level as a whole element is maintained at high level. On the other hand, the receiving element 114 is spirally formed on a glass epoxy resin substrate 113 and has impedance of 50Ω with respect to a GND surface 119. Thus, impedance is matched between the transmitting element and the receiving element. The receiving element 114 is not necessarily formed spiral as shown in FIG. 10B. However, the receiving element 114 is required to have a given width x wide enough to cover the spirally formed transmitting element 103 in the radial direction thereof and a given width y in a tangential direction of the transmitting element. The width x is required for sufficiently utilizing the advantage of the spirally formed transmitting element. In addition, by deciding the width y appropriately, the magnitude level of the travelling wave is equalized in the tangential direction, and therefore signal transmission is further stabilized.

Figure 18A:
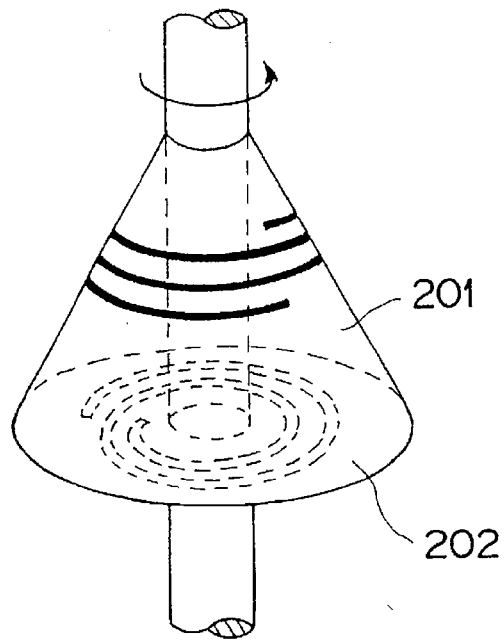
FIGS. 18A and 18B are views showing examples of forming transmitting element.
Figure 18B:
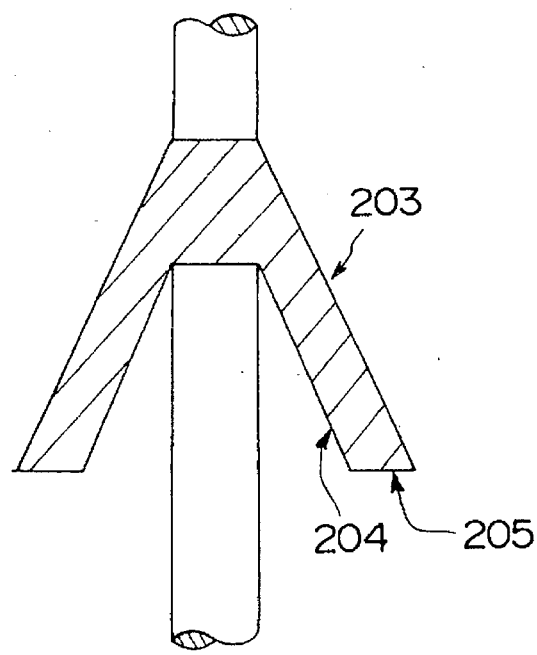
Figure 19A:
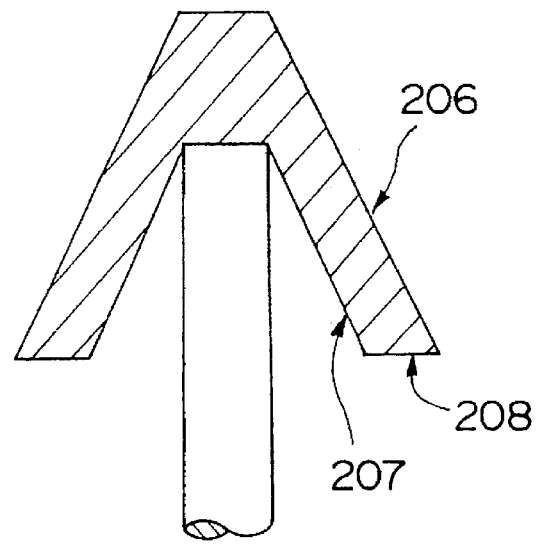
FIGS. 19A and 19B are views showing other examples of forming transmitting element.
Figure 19B:
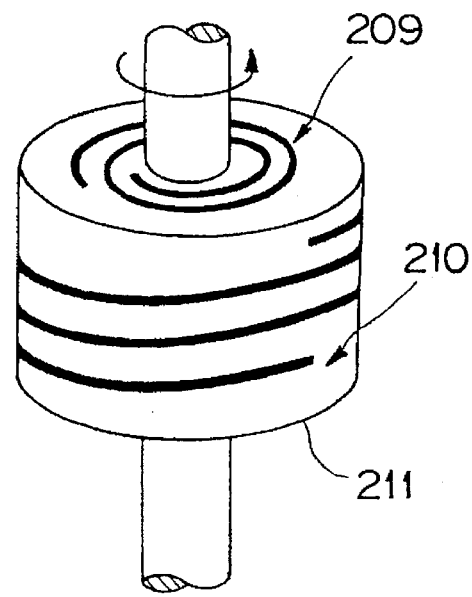
Figure 20:
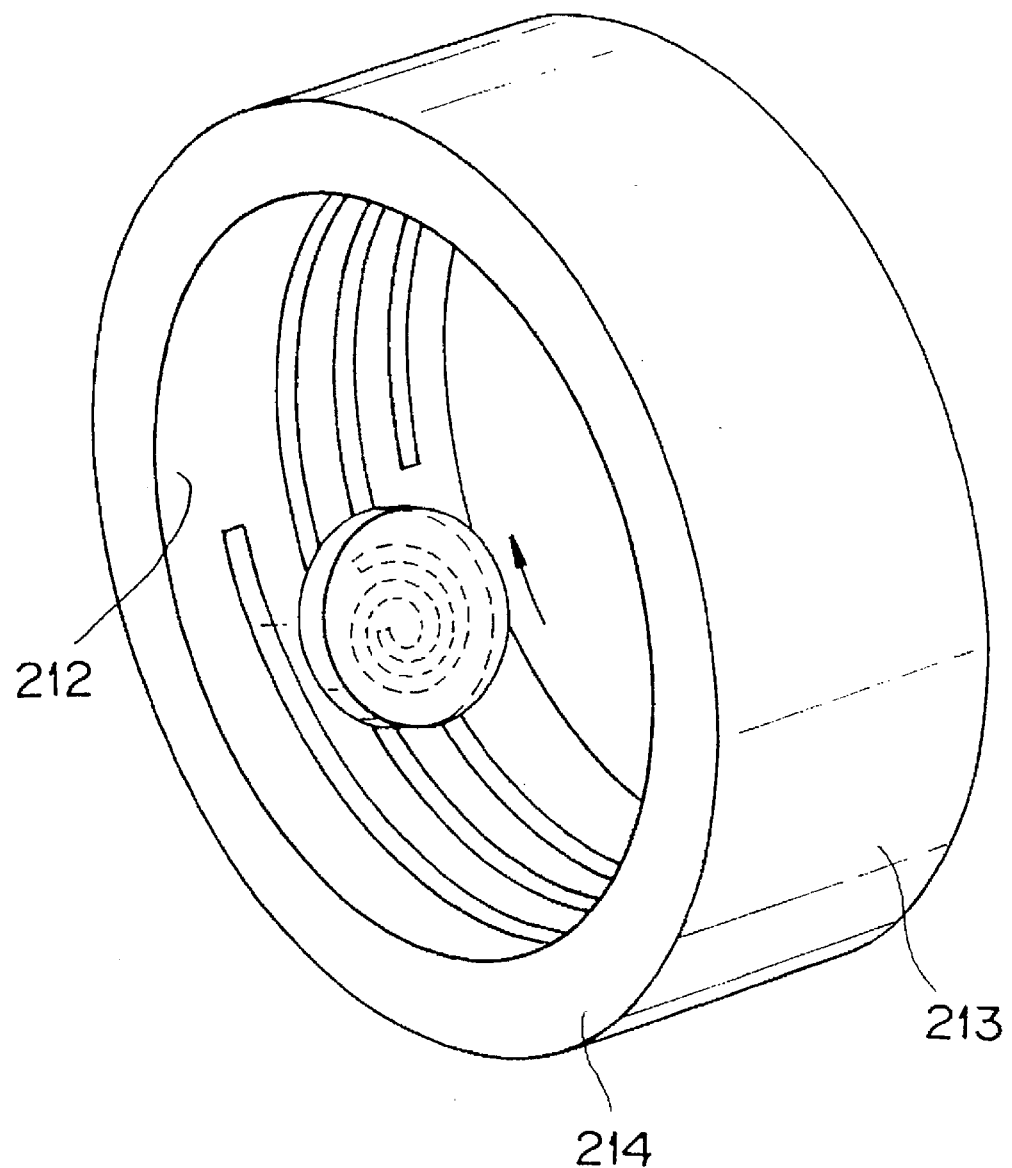
FIG. 20 is a view showing still another example of forming transmitting element.
Figure 21A:
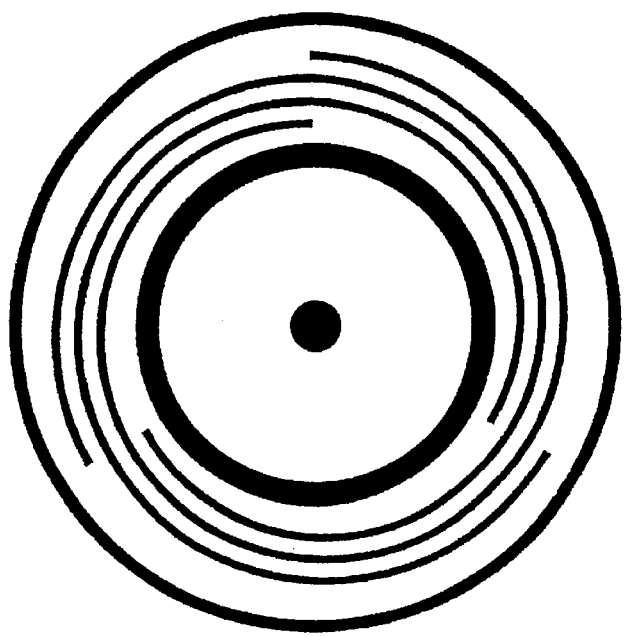
FIGS. 21A and 21B are plan views showing examples of the transmitting elements.
Figure 21B:
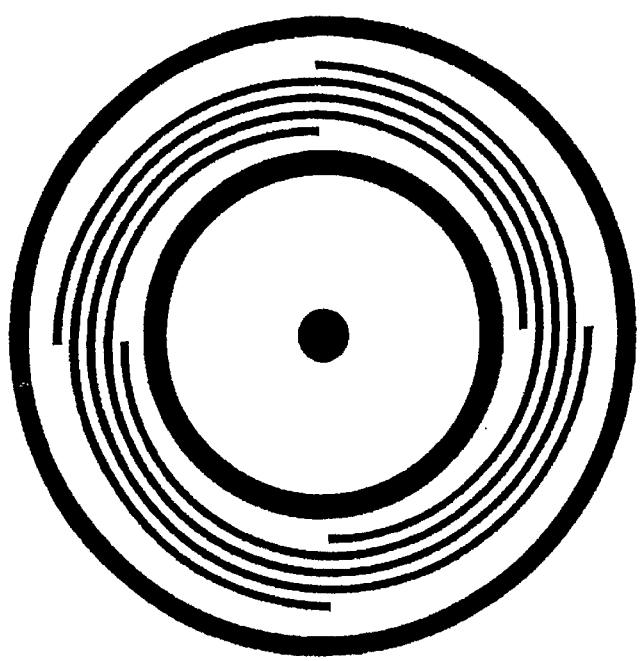
Figure 22A:
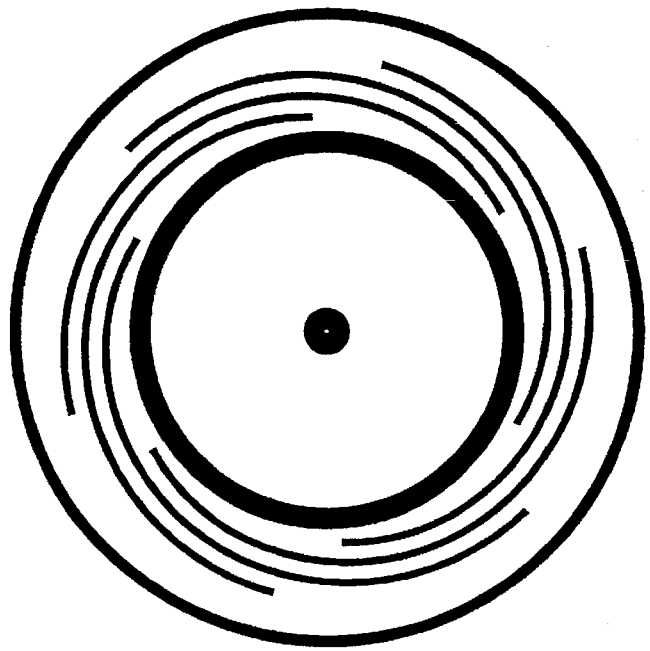
FIGS. 22A and 22B are plan views showing other examples of the transmitting elements.
Figure 22B:
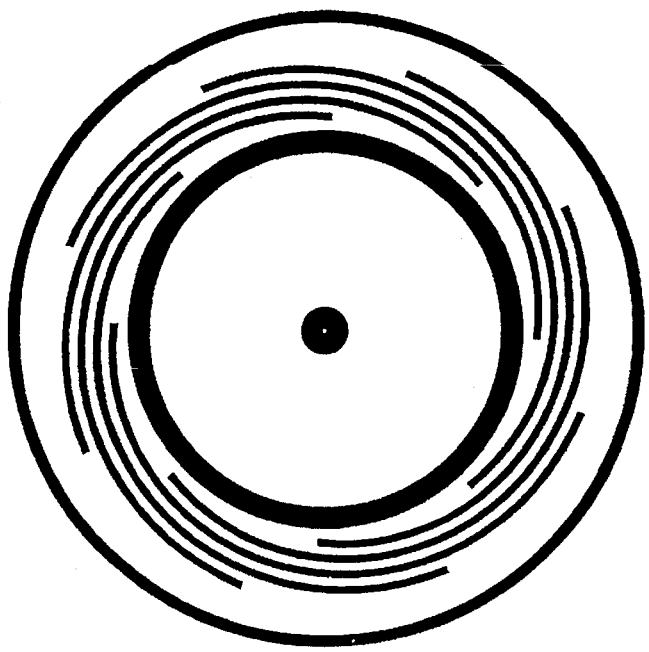
Figure 23A:
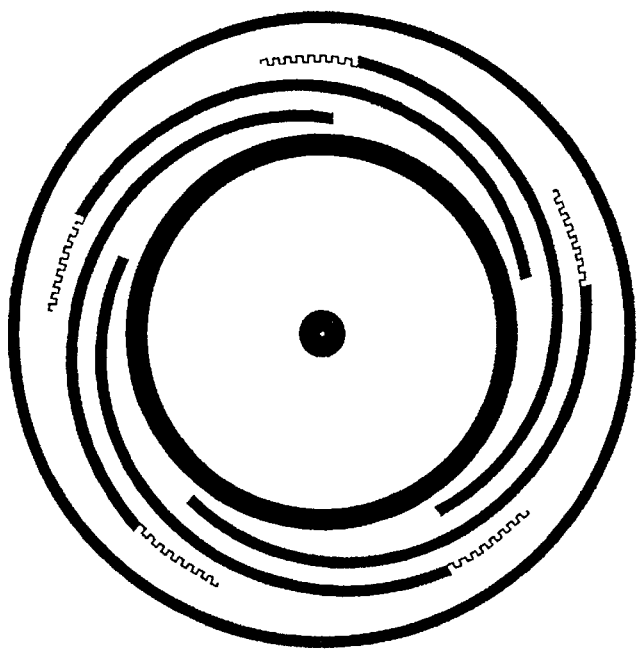
FIGS. 23A and 23B are plan views showing other examples of the transmitting elements.
Figure 23B:
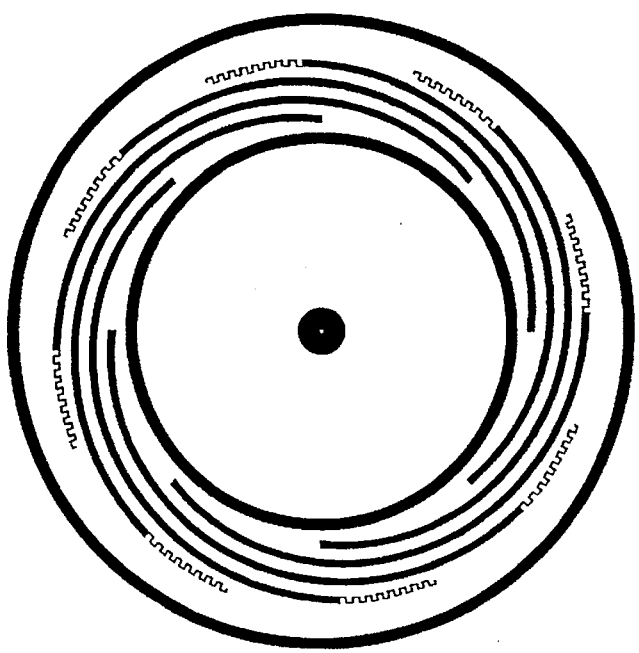
Figure 24A:
FIGS. 24A-24C are views showing examples of portions of the transmitting element.
Figure 24B:
Figure 24C:
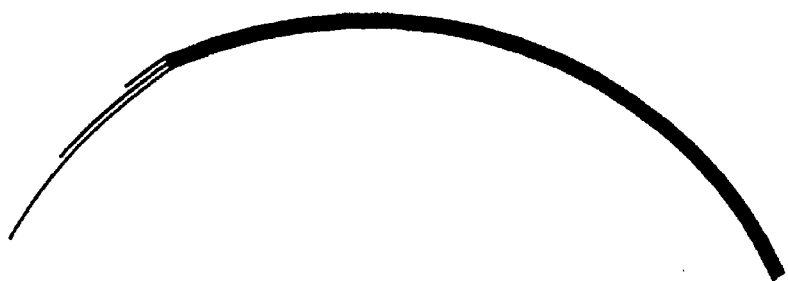
Figure 25A:
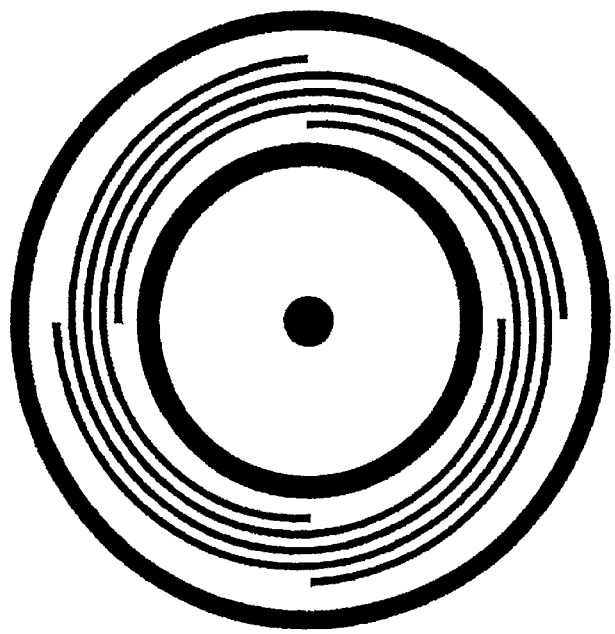
FIGS. 25A and 25B are plan views showing other examples of the transmitting elements.
Figure 25B:
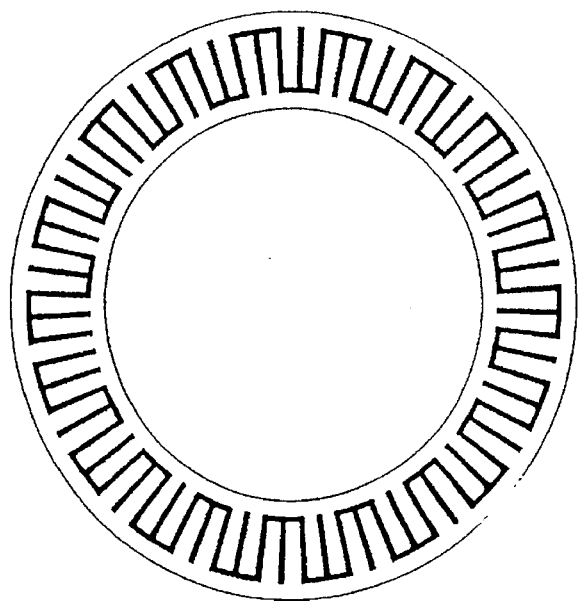

In the above description, the transmitting element is formed on a flat substrate, however, it may be formed on a surface of a three-dimensional body. Such applications will be described below. FIG. 18A illustrates an example in which the transmitting element is formed on an outer wall surface 201 of a conical body which is coaxially provided on a rotary shaft. In this case, the transmitting element may be further formed on the bottom surface 202 of the conical body. FIG. 18B is a cross sectional view of a hollow conical body provided on a rotary shaft. In this case, the transmitting element may be formed on the outer wall surface 203, the bottom surface 205 and inner wall surface 204. FIG. 19A illustrates another hollow conical body similar to that shown in FIG. 18B. This is advantageous in manufacturing because the rotary shaft does not have to pass the conical body. FIG. 19B illustrates an example in which the transmitting element is formed on outer wall surface 210, top surface 209 and bottom surface 211 of the cylindrical body coaxially provided on the rotary shaft. Further, as shown in FIG. 20, the transmitting element may be formed on an inner surface 212 of a hollow cylindrical body, an outer surface 213 or a side surface 214 of the hollow cylindrical body. In these cases, it is preferable that the substrate of the receiving element is appropriately bent according to the curvature of the surface of the three-dimensional bodies so that the spacing between the transmitting element and the receiving element becomes constant at every portions thereof. These elements are advantageous in multi-channel transmission, compared with the flat type element, because plural sets of the transmitting and receiving elements can be formed on various surfaces.

Other examples of the transmitting elements to be formed on a flat surface are shown in FIGS. 21 to 25. The element shown in FIG. 21A is formed in such a manner that three elements having length of half of the signal wavelength are wound. Similarly, FIG. 21B shows a transmitting element comprised of four elements, FIG. 22A shows a transmitting element comprised of six elements, and FIG. 22B shows a transmitting element comprised of eight elements. These examples differ from the example of spirally formed element in that signal to be transmitted is supplied to the plurality of elements, respectively. However, in these examples, levels of the travelling wave are compensated for by each other in the radial direction, and therefore the compensation effect is further improved by adjusting the positions of each elements. FIGS. 23A and 23B illustrate other examples of the transmitting elements. In these examples, a plurality of elements are formed in the circumferential direction like the examples shown in FIGS. 21A, 21B, 22A and 22B, however, edge portions of the elements are formed as coil shape so as to save the space on the substrate for forming the elements. The effective length of the elements are identical to that of the elements shown in FIGS. 21A, 21B, 22A and 22B. In FIG. 23A, five elements are used, and in FIG. 23B eight elements are used. Although the edge portions of the elements are formed as square-shaped coil in FIGS. 23A and 23B, rectangular-shape, saw-shape or shape of a plurality of branches may be employed, as illustrated in FIGS. 24A–24C. In addition, these elements may be formed in reversed manner, like the relation between FIG. 21A and FIG. 25A. FIG. 25B is another example of the transmitting element in which an element having length of 6 wavelengths of the travelling wave is used. In this example, travelling wave component are compensated for by each other in the tangential direction, and difference in the radial direction is absorbed.

Figure 26A:
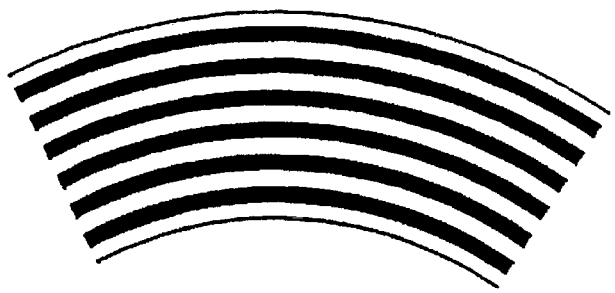
FIGS. 26A-26D are plan views showing other examples of the receiving elements.
Figure 26B:
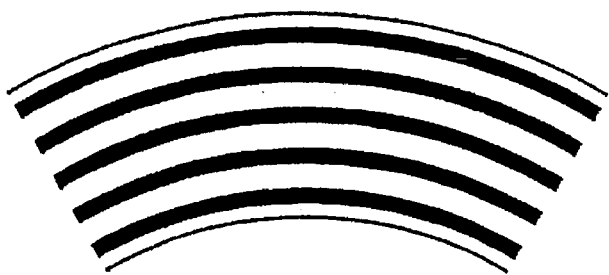
Figure 26C:
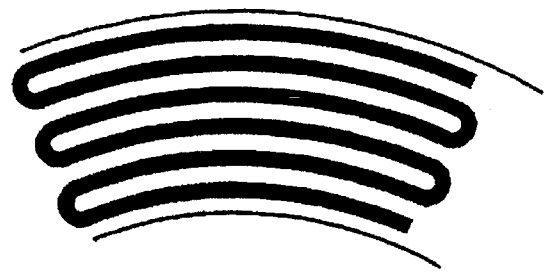
Figure 26D:
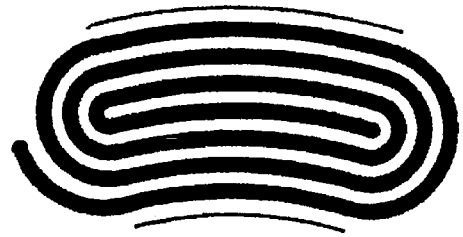
Figure 27A:
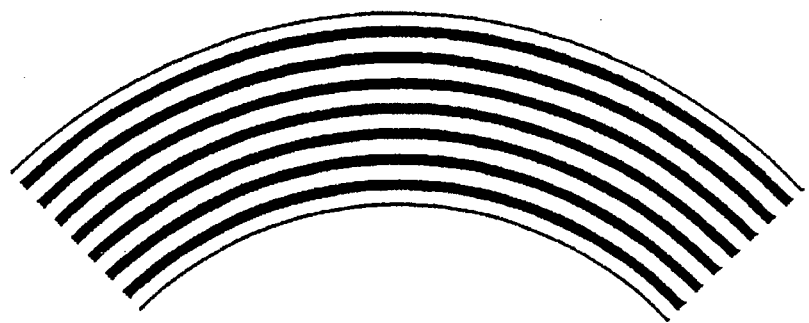
FIGS. 27A-27C are plan views showing other examples of the receiving elements.
Figure 27B:
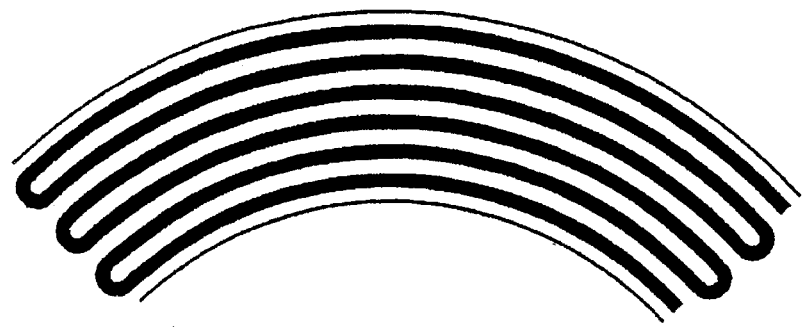
Figure 27C:
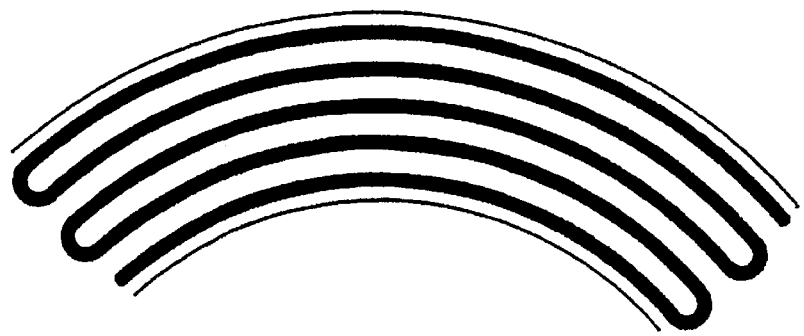
Figure 28A:
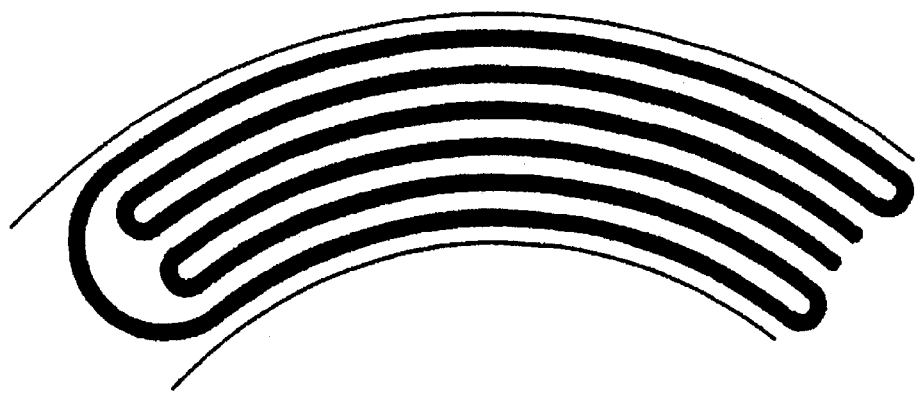
FIGS. 28A and 28B are plan views showing other examples of the receiving elements.
Figure 28B:
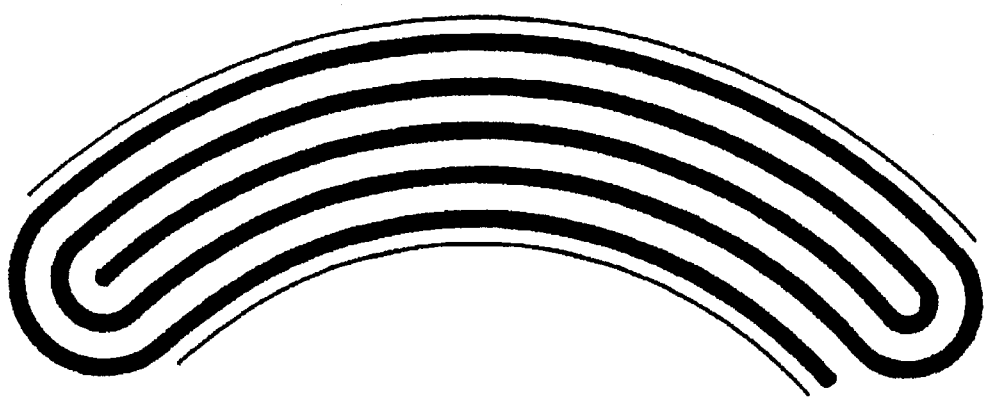

Next, other examples of the receiving elements are described with reference to FIGS. 26 to 28. In FIGS. 26A and 26B a plurality of elements are positioned in parallel with a predetermined intervals, and in FIGS. 26C and 26D, a linear element is bent repeatedly so that each bent portions are overlap with each other in a radial direction. In the case of FIGS. 26A and 26B, received signal may be obtained from each of the elements. In addition, FIGS. 27A–27C and 28A–28B illustrate other examples based on the same concept as that of the receiving element shown in FIGS. 26A–26D, however, the length of the elements in a circumferential direction is extended.

As described above, according to the first embodiment, the transmitting element is wound spirally so that the travelling wave of high magnitude level is radiated from the transmitting element. Therefore, the signal transmission can be reliably performed.

Figure 33A:
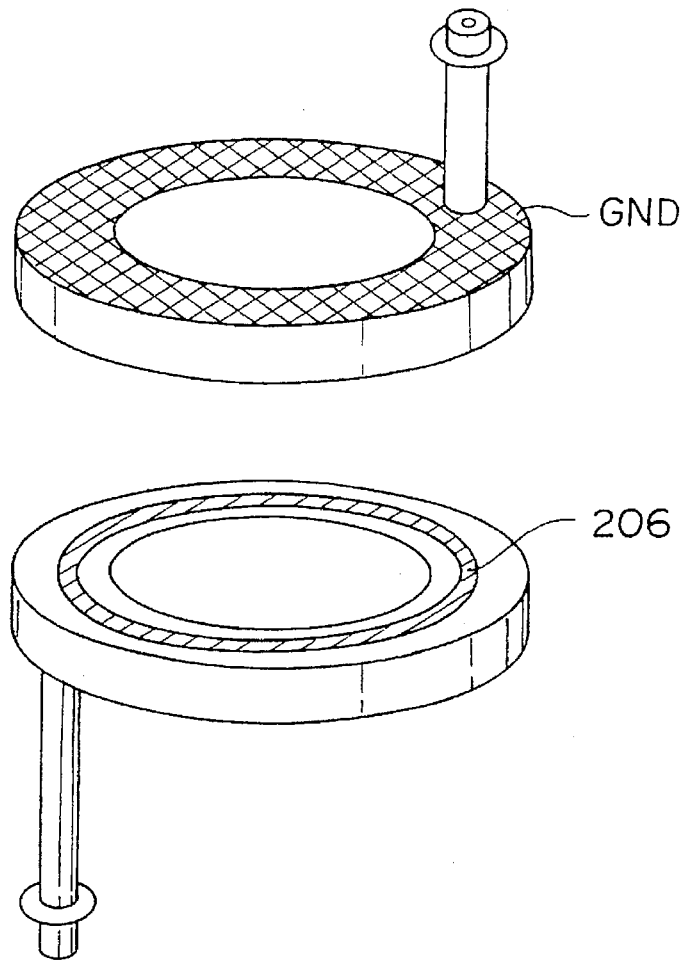
FIGS. 33A and 33B are diagrams illustrating relation of signal transmitting elements.
Figure 33B:
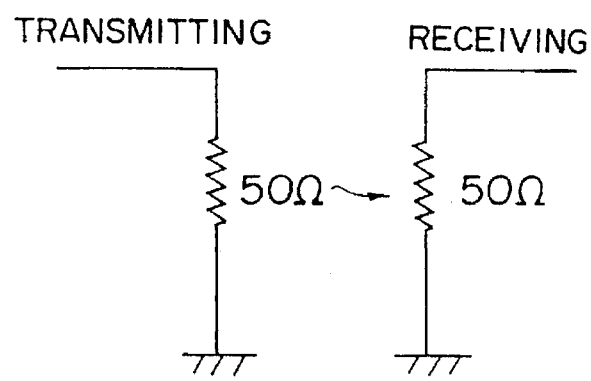

(2) 2nd Embodiment:

Next, a signal transmission device according to the second embodiment of the present invention will be described. In this second embodiment, a pair of spiral type elements shown in FIGS. 8 to 10 and a pair of simple ring-type elements are used in combination. As described above, the spirally type elements shown in FIGS. 10A and 10B are advantageous in accurate and reliable signal transmission. However, such spiral elements cost relatively high. In contrast, simple ring-shaped elements (see. FIG. 33A) are advantageous in its low manufacturing cost compared with the spiral type elements. In this view, in the second embodiment, both spiral type elements and ring-shaped elements are used in combination according to kinds of signals to be transmitted. As seen from FIG. 6, in the laminate tube inspection system, inspection image signals is transmitted from the rotary block 85 to the stationary block 86 via the signal transmission device 45 while synchronizing signals are transmitted from the stationary block 86 to the rotary block 85 via the signal transmission device 45. Here, inspection image signal is information signal indicating presence of defect or dusts on the internal surface of the laminate tube, and therefore the transmission of the inspection image signal requires high accuracy. In contrast, the synchronizing signal is a control signal for the CCD cameras, and if the synchronizing signal is slightly deteriorated within an allowable range of the cameras, there might occur no fetal operational error in the system. In view of this, in this embodiment, the inspection image signal is transmitted by the spiral type elements and the synchronizing signal is transmitted by the ring-shaped elements, so as to meet requirements of both reliability of system and reduction of manufacturing cost.

Figure 29:
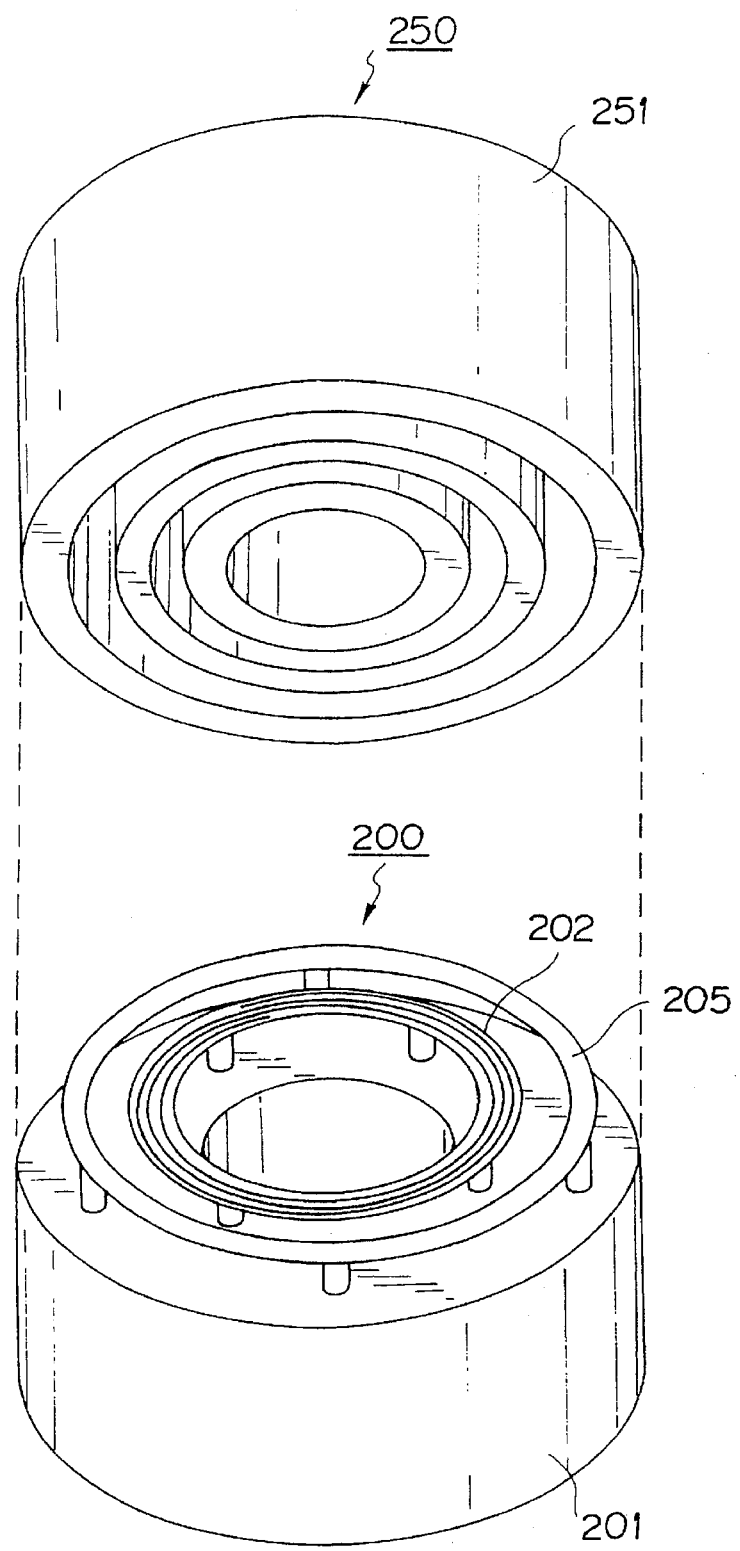
FIG. 29 is a view showing signal transmission device according to second embodiment of the present invention.
Figure 30:
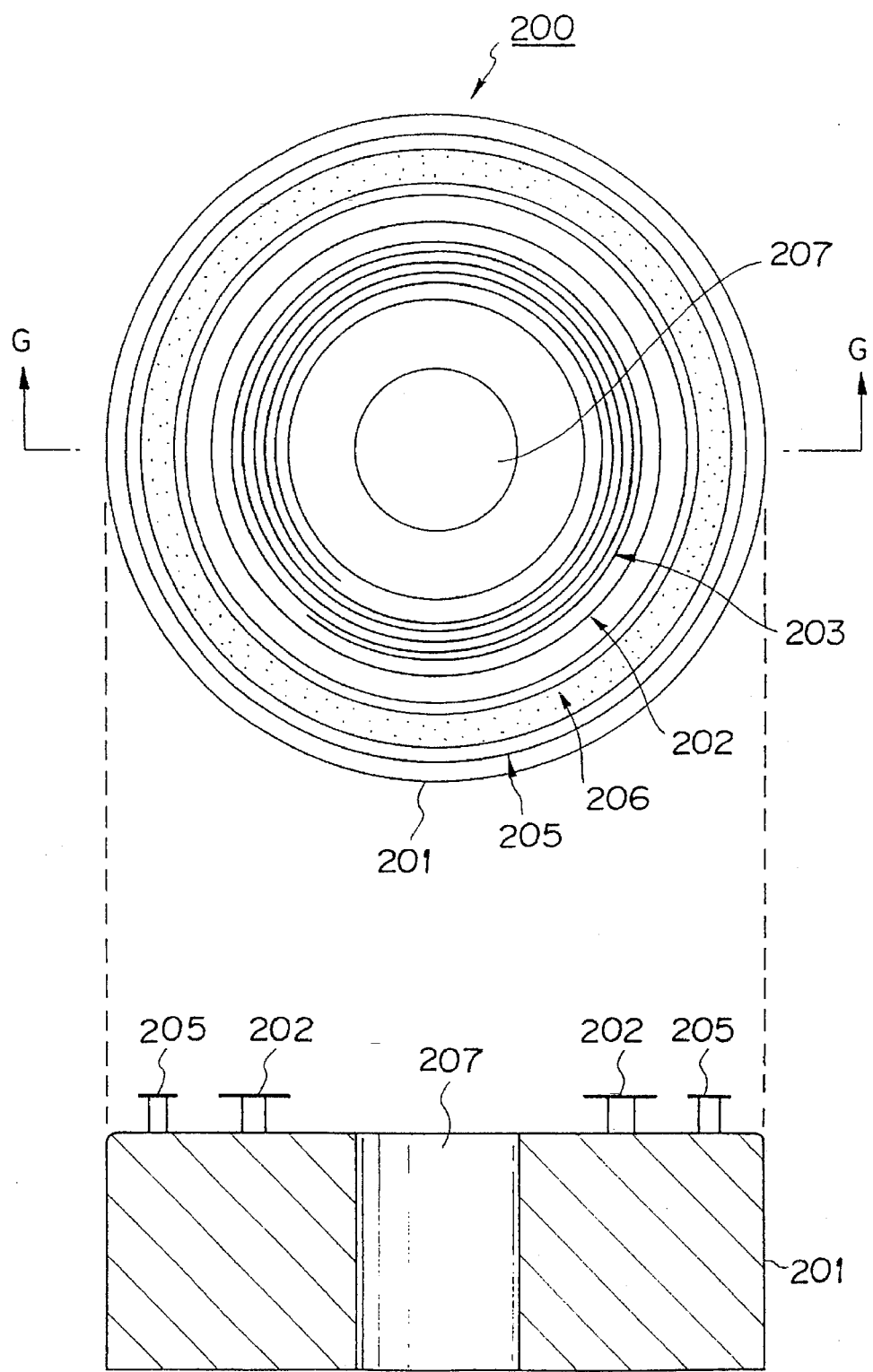
FIG. 30 is a view showing feature of transmitting unit shown in FIG. 29.
Figure 32:
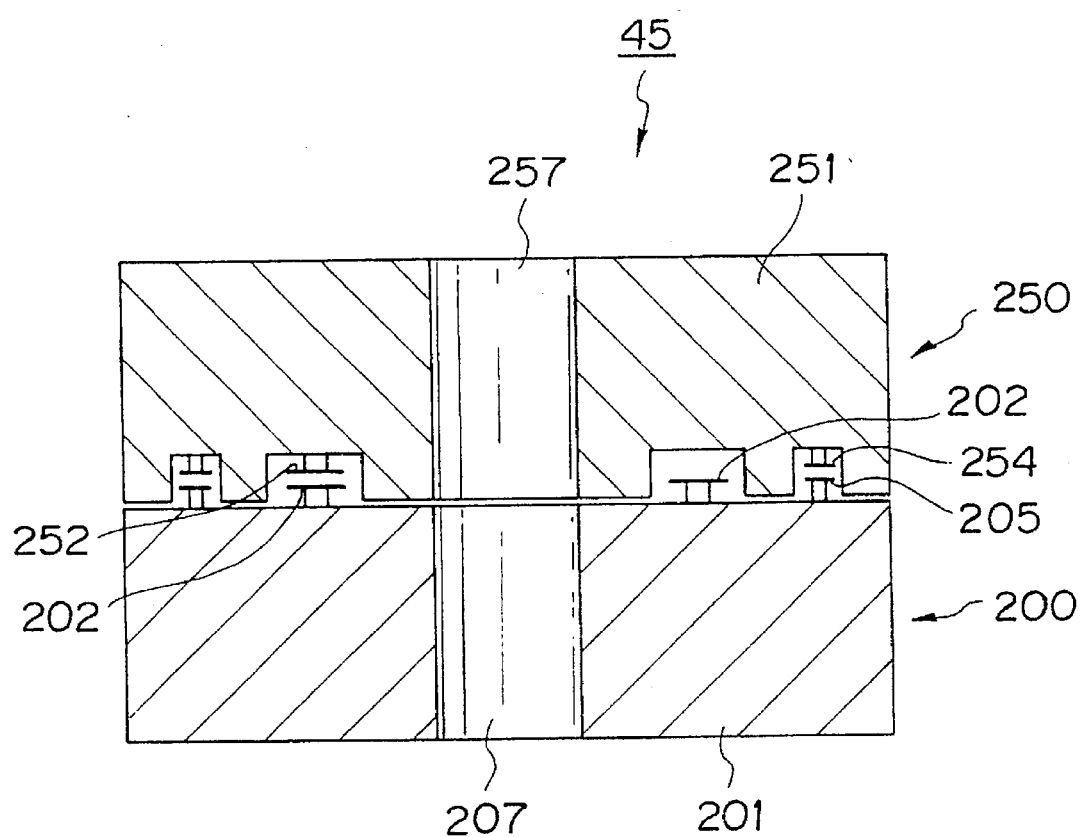
FIG. 32 is a cross sectional view showing signal transmission device according to the second embodiment.

Next, a concentric circle type antenna unit according to the second embodiment will be described with reference to FIGS. 29 to 32. FIG. 29 illustrates a transmitting unit 200 and a receiving unit 250, and FIG. 30 illustrates the transmitting unit 200. As shown in FIG. 30, the transmitting unit 200 is of cylindrical form and is provided with an opening 207 for receiving and holding the rotary shaft 37. The transmitting unit 200 revolves according to the revolution of the rotary shaft 37. On a base 201 of the transmitting unit 200 are provided a sync. receiving element substrate 205 for sync. signal transmission and an image transmitting element 202 substrate for image signal transmission. In the transmitting unit 200, the mixer 44 and the BPF 95 are installed. Image signal from the BPF 95 is supplied to the image transmitting element 203 on the image transmitting element substrate 202. The image transmitting element 203 is made of copper and is spirally formed on the substrate 202 made of glass epoxy resin. Image signal from the mixer 44 is radiated from the transmitting element 203. The sync. receiving element 206 is also made of copper and is formed as ring-shape on the substrate 205 made of glass epoxy resin. On the other hand, the receiving unit 250 shown in FIG. 31 is also of cylindrical shape and is provided with an opening 257 through which the rotary shaft 37 passes. On the surface of the receiving unit 250 to be coupled to the transmitting unit 200, grooves 258 and 259 are formed concentrically. In the grooves 258 and 259 are provided an image receiving element 253 for image signal transmission and a sync. transmitting element 254 for synchronizing signal transmission. The image receiving element 253 is a copper element having length of ¼ of signal wavelength and is formed spirally on the substrate 252 made of glass epoxy resin. The sync. transmitting element 255 is a ring-shaped copper element formed on the substrate 254 made of glass epoxy resin, similarly to the sync. receiving element 206. The transmitting unit 200 and the receiving unit 250 are coupled with each other as illustrated in FIG. 32, and signal transmission is carried out between them, in the similar manner as the first embodiment. During the signal transmission, the transmitting unit 200 revolves according to the revolution of the rotary shaft 37 while the receiving unit 250 is fixed. As illustrated in FIG. 33A, GND surfaces are formed on the back surfaces of the substrates 202, 205, 252 and 254. In addition, each element is formed to have impedance 50Ω with respect to each GND surface, and therefore impedance are matched between the transmitting element and the receiving element.

Figure 34:
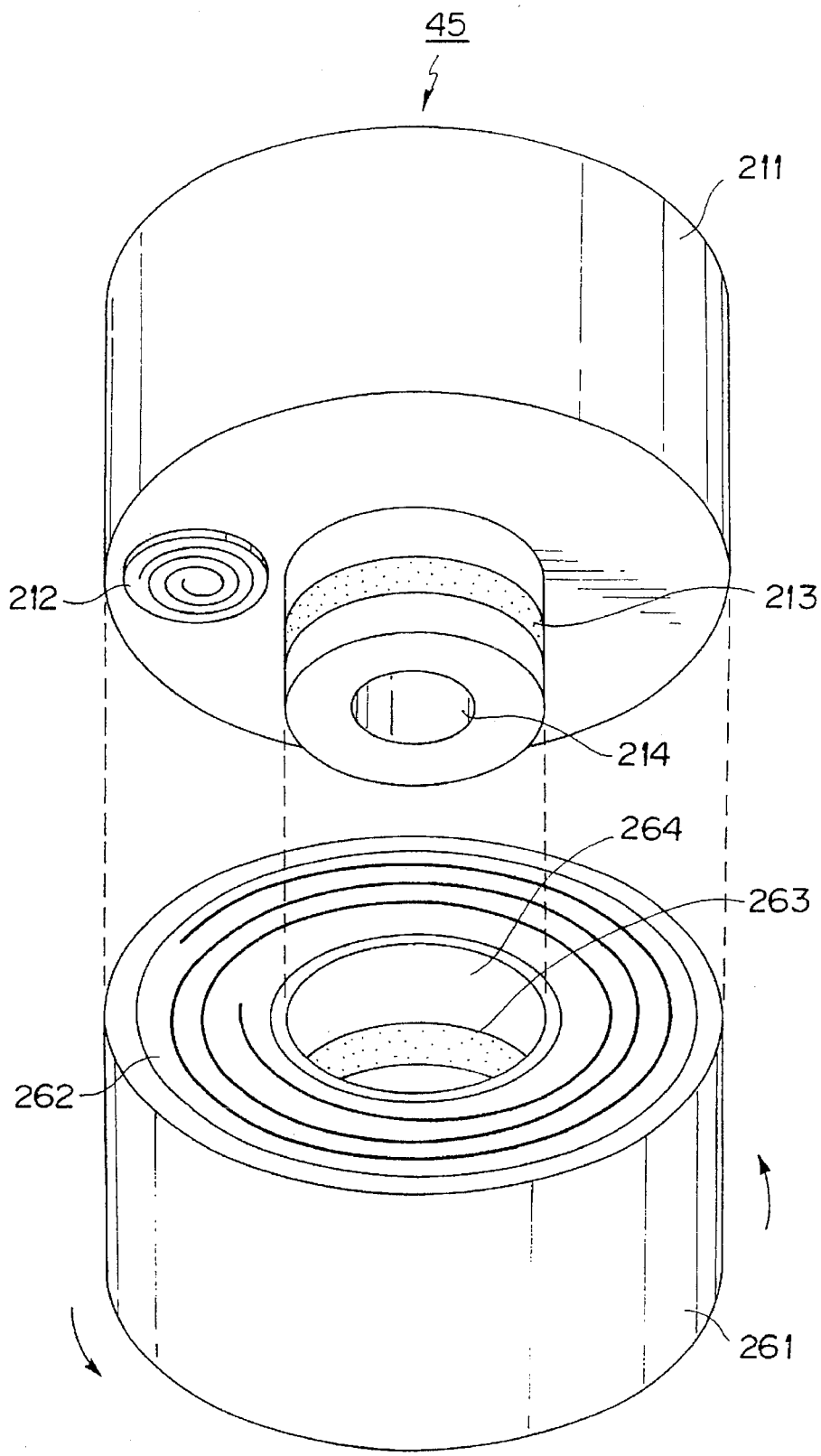
FIG. 34 is a view showing a modification of the signal transmission device according to the second embodiment.
Figure 35:
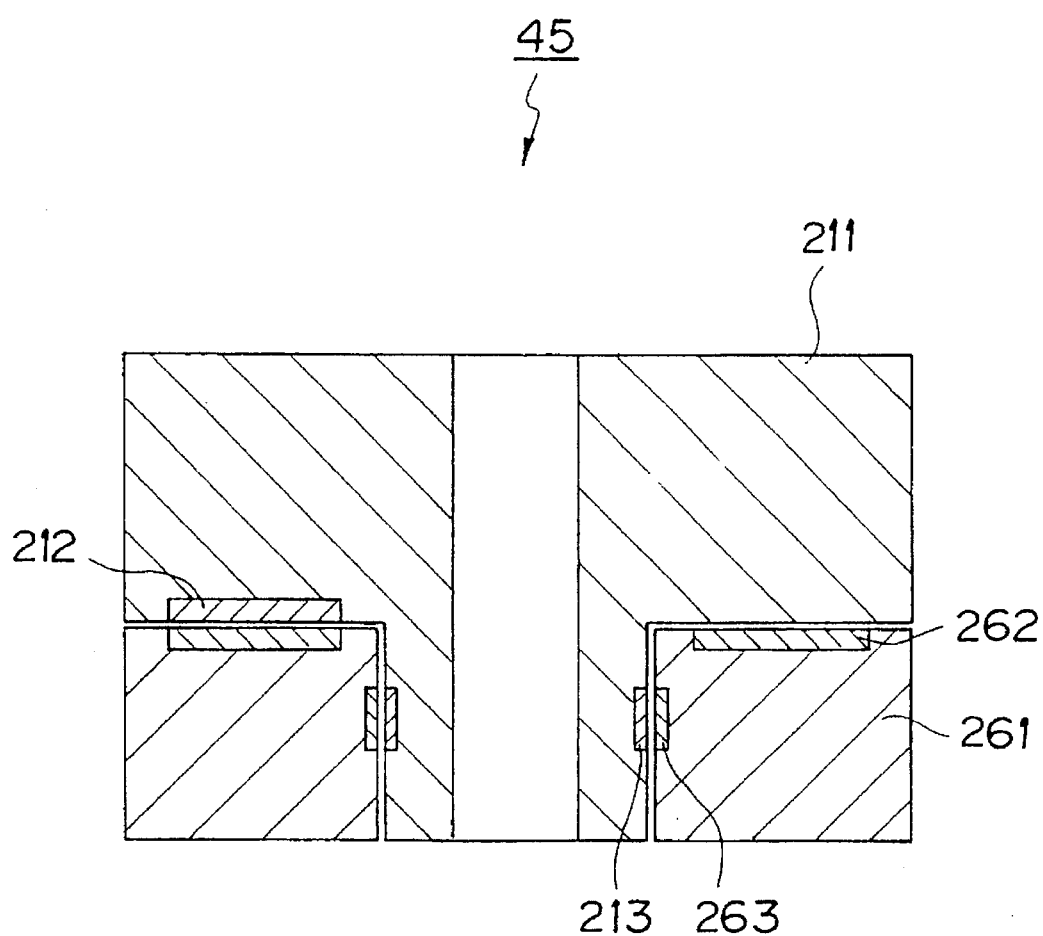
FIG. 35 is a cross sectional view of the device shown in FIG. 34.

FIGS. 34 and 35 illustrate another example of signal transmission device according to the second embodiment. As shown in FIG. 34, the receiving unit 211 is comprised of a convex cylindrical body with a small protrusive cylinder portion. The image receiving element 212 is provided on a flat surface of the cylindrical body and the sync. transmitting element 213 is provided on the circumferential wall surface of the protrusive cylinder portion. The transmitting unit 261 is comprised of a concave cylindrical body having an opening 264 for receiving the protrusive cylinder portion of the receiving unit 211. The image transmitting element 262 is provided on an upper flat surface which faces the surface of the receiving unit 211 on which image receiving element 212 is disposed, and the sync. receiving element 263 is provided on the inner wall surface of the opening 264. When the transmitting unit 261 and the receiving unit 211 are coupled with each other, the sync. transmitting element 213 and the sync. receiving element 263 confront with each other with a certain spacing and the image transmitting element 262 and the image receiving element 212 confront with each other with a certain spacing, as shown in FIG. 35. The receiving unit 211 is provided with a center opening 214 for receiving and holding the rotary shaft 37. The receiving unit 211 revolves according to the revolution of the rotary shaft 37, and the elements 212 and 262 and the elements 213 and 263 move relatively with each other, respectively. During the revolution, image signal is transmitted from the transmitting unit 261 to the receiving unit 211 and synchronizing signal is transmitted from the receiving unit 211 to the transmitting unit 261. The image transmitting element 262 and the image receiving element 212 are of the same construction as the elements 203 and 253 shown in FIG. 30 and 31. The sync. transmitting element 213 and the sync. receiving element 263 are of concentric ring-shape having different diameters, and GND surfaces are formed at both back surfaces of the elements 213 and 263.

Figure 37:
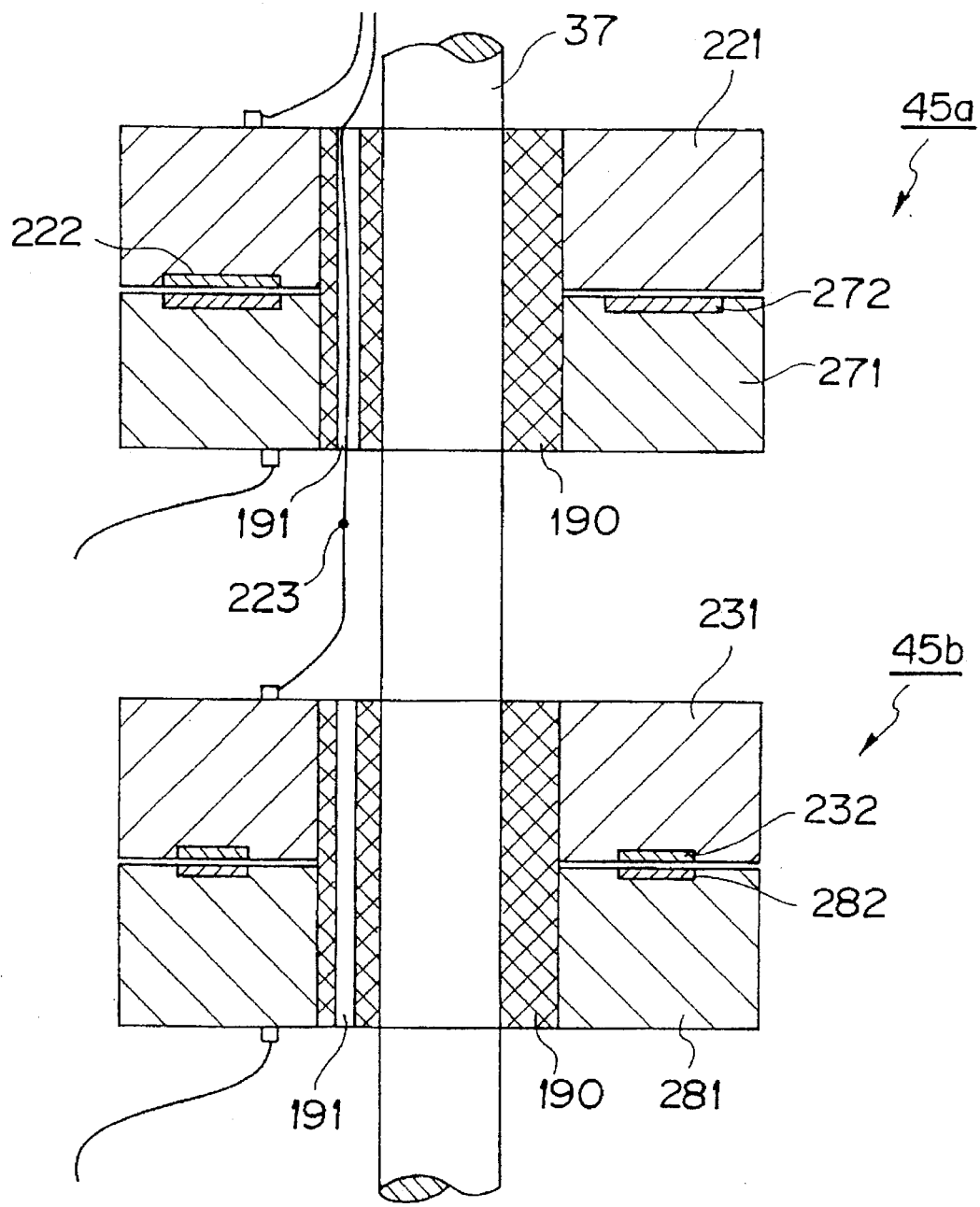
FIG. 37 is a cross sectional view of the devices shown in FIGS. 36A and 36B.

Next, still another example of the second embodiment will be described. As shown in FIG. 37, in this example, image transmitting unit and sync. transmitting unit are separately constructed and coaxially provided around the rotary shaft 37. The image receiving unit 221 is fixed while the image transmitting unit 271 is provided on the central cylinder 190. Therefore, the image transmitting unit 271 revolves with the central cylinder 190 according to the revolution of the rotary shaft 37, and image signal is transmitted from the image transmitting element 272 to the image receiving element 222. The central cylinder 190 is provide with a lead wire hole 191 in a vertical direction, and a lead wire 223 for the sync. signal passes through the lead wire hole 191 to be connected to the sync. transmitting unit. As shown in FIG. 36B, the sync. transmitting unit 231 is provided with the elements 232 and the sync. receiving unit 282 is provided with the element 282. The sync. receiving element 280 revolves during transmission of the synchronizing signal. According to this construction, in order to increase channel number of the image signal to be transmitted, additional image transmitting unit may be provided. Therefore, the system may be readily improved.

As described above, according to the second embodiment, image signal for which high transmission accuracy is required is transmitted by the spiral elements and synchronizing signal for which noise allowable range is relatively broad is transmitted by the ring-shaped elements. Therefore, the inspection system can be improved in views of both reliability and manufacturing cost.

Figure 38:
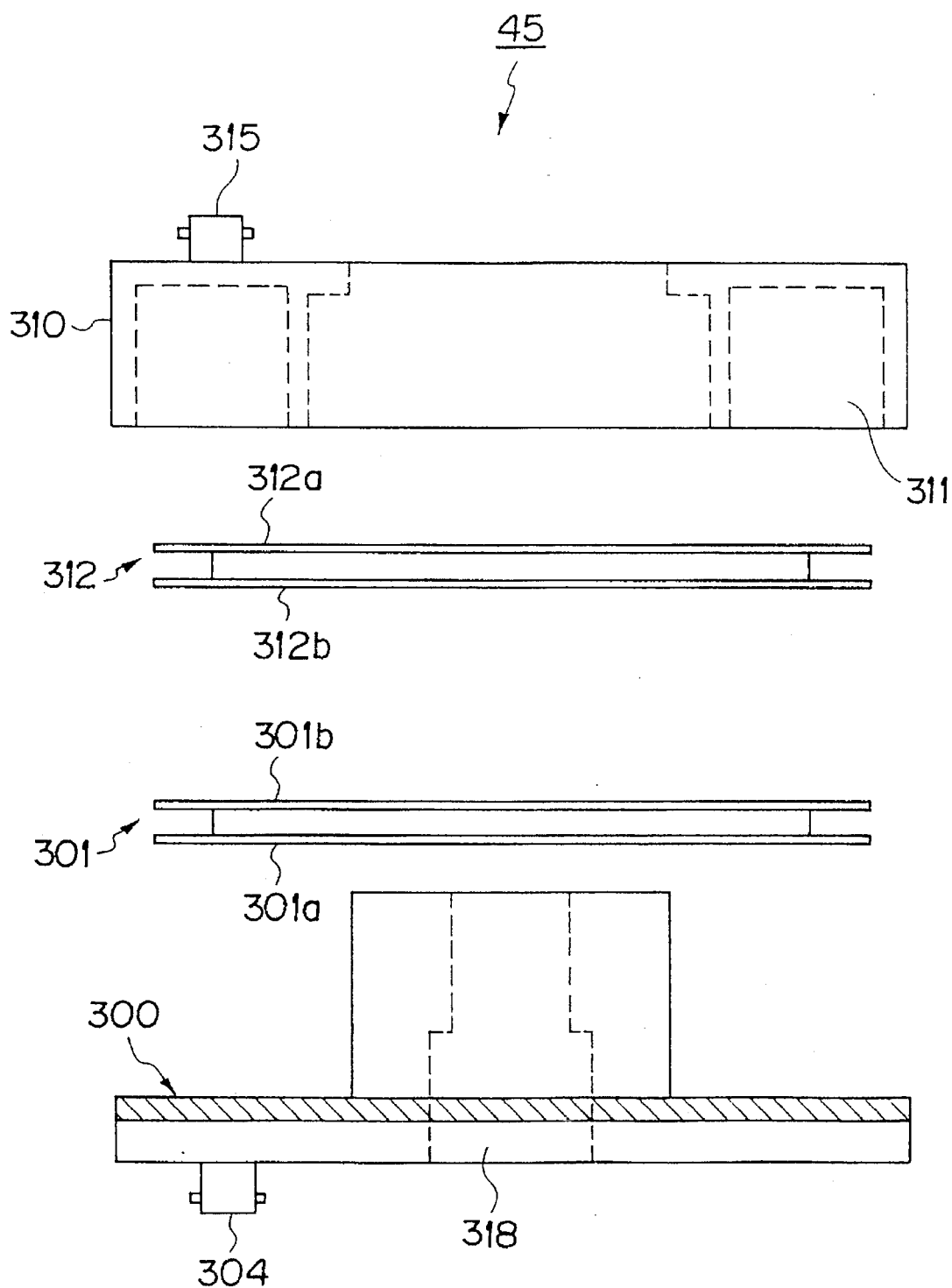
FIG. 38 is a side view showing a signal transmission device according to the third embodiment of the present invention.
Figure 39A:
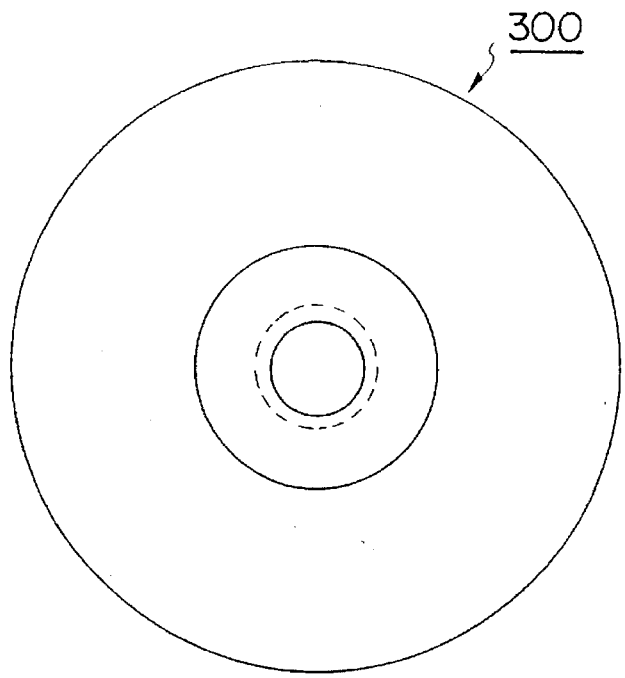
FIGS. 39A and 39B are plan views of the device shown in FIG. 38.
Figure 39B:
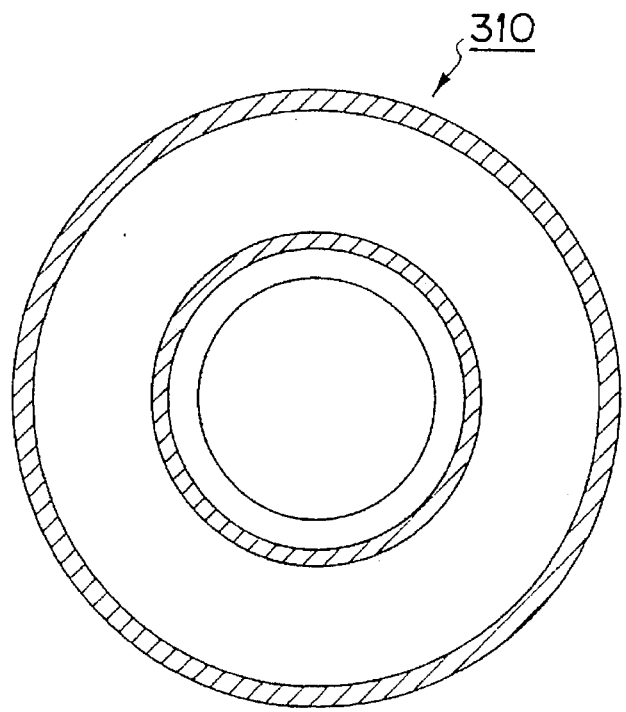
Figure 40A:
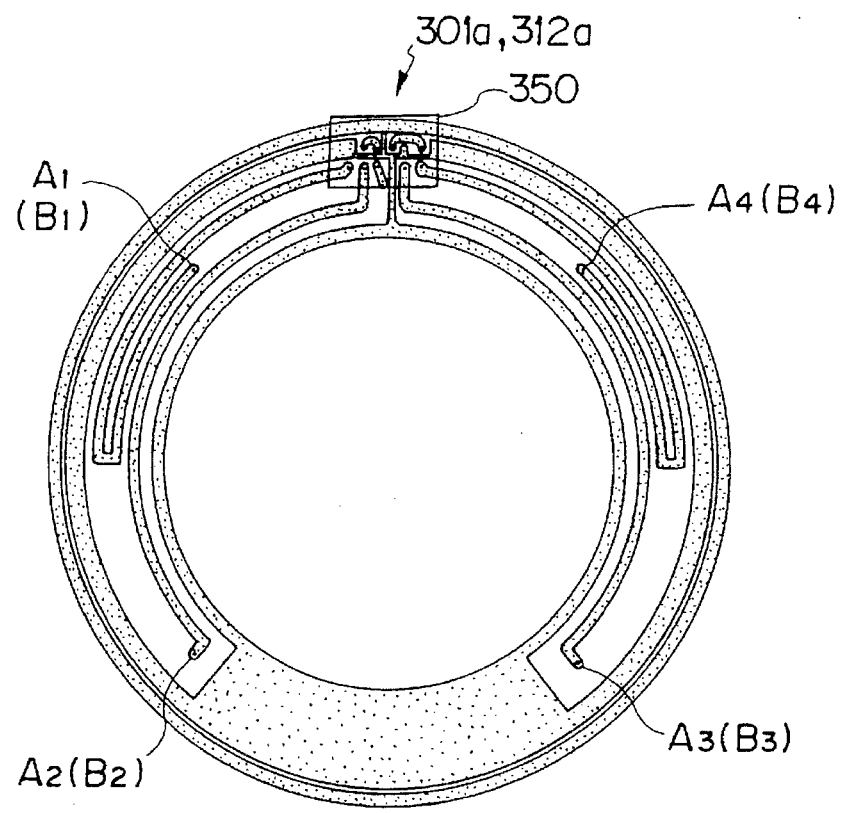
FIGS. 40A and 40B are plan views showing transmitting element and receiving element of the device shown in FIG. 38.
Figure 40B:
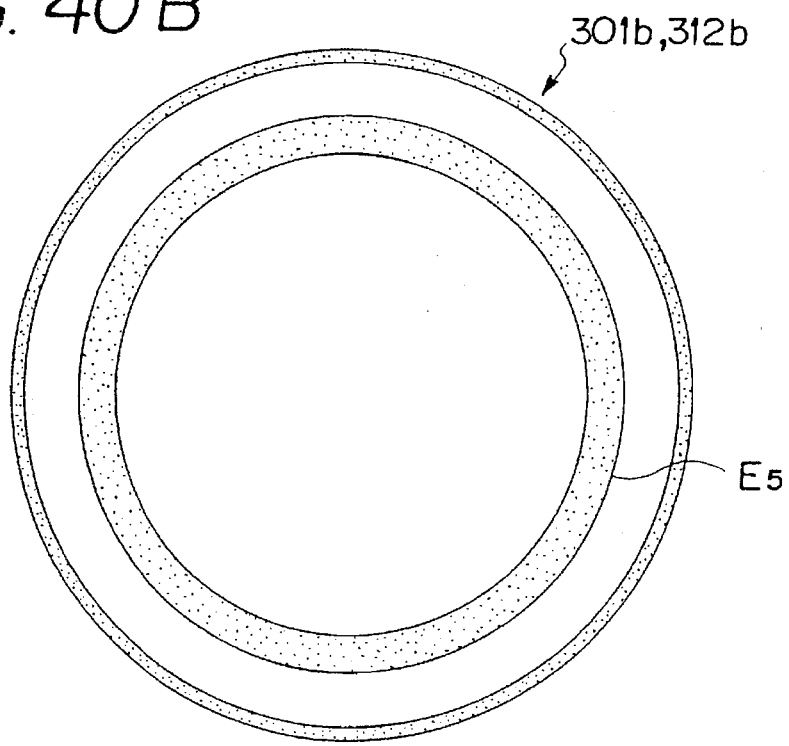

(3) 3rd Embodiment:

Next, third embodiment of the signal transmission device according to the present invention will be described. FIG. 38 is a side view showing construction of the signal transmission device 45 according to the third embodiment. As shown in FIG. 38, the signal transmission device 45 includes a transmitting unit 300 and a receiving unit 310. FIG. 39A and FIG. 39B are plan views of the transmitting unit 300 and the receiving unit 310, respectively. The transmitting unit 300 and the receiving unit 310 are coupled with each other in the vertical direction, as shown in FIG. 38, and inside of the signal transmission device 45 thus coupled is electromagnetically shielded from external. The transmitting unit 300 and the receiving unit 310 are constantly opposite to each other while one of them is revolving, and therefore signal is reliably transmitted during the revolution. In addition, since the signal transmission device 45 is thus shielded, signal transmission is not disturbed by external noise and the transmission signal does not leak out to the external. In consideration of the shielding property, the transmitting unit 300 and the receiving unit 310 are made of A1 aluminum, for example. The transmitting unit 300 is provided with an opening 318 for receiving and holding the rotary shaft 37 which passes through the opening 318, and the transmitting unit 300 revolves around the rotary shaft 37 due to the revolution of the rotary shaft 37. Signal from the BPF 95 is supplied to a transmitting element 301 horizontally held in the transmitting unit 300. The transmitting unit 301 includes substrates 301a and 301b coupled to each other in parallel with a given spacing therebetween. The surfaces of the substrates 301a and 301b are illustrated in FIG. 40A and 40B. The substrates 301a is comprised of a glass epoxy resin substrate on which copper element is formed in the shape shown in FIG. 40A, and the substrates 301b is comprised of a glass epoxy resin substrate on which copper element is formed in the shape shown in FIG. 40B. In the portion 350 on the substrate 301a, baluns are provided (described later). Transmission signal from the mixer 44 is radiated from the element 301. On the other hand, the receiving unit 310 is provided with a ring-shaped groove 311 in which a receiving element 312 having the shape and construction identical to the element 301 is horizontally disposed. By constructing the transmitting element 301 and the receiving element 312 to be identical shape and construction, frequency characteristics of both elements become identical, and level of output signal is stabilized. This is advantageous in bi-directional transmission described later. In signal transmission, the transmitting unit 300 revolves according to the revolution of the rotary shaft 37 while the receiving element 310 is fixed. The transmitting element 301 and the receiving element 312 confront with each other with a spacing of approximately 3 mm therebetween. Therefore, according to the revolution of the rotary shaft 37, the receiving element 312 revolves, with maintaining the spacing to the transmitting element, above the transmitting element 301, thereby signal is transmitted. The transmitting unit 300 and the receiving unit 310 are provided with BNC connecters 304 and 315 and lead wires (not shown) for inputting and outputting signals, respectively. It is noted that the transmitting element 301 and the receiving element 312 are required to revolve relatively, and either one of them may be driven. Preferably, the elements 301 and 312 made of conductive material may be formed loop shape so that signals are equally supplied to multiple signal input points and equally output from multiple signal output points.

Figure 41:
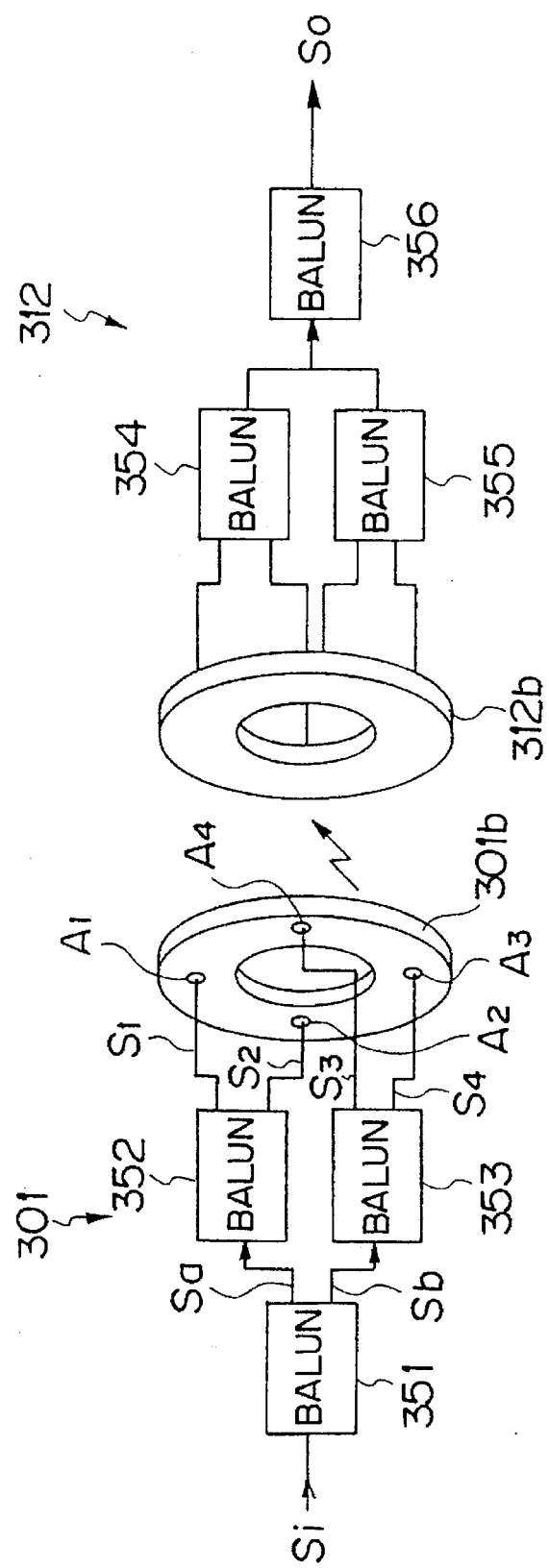
FIG. 41 is a diagram illustrating construction of the signal transmission device according to the third embodiment.
Figure 42:
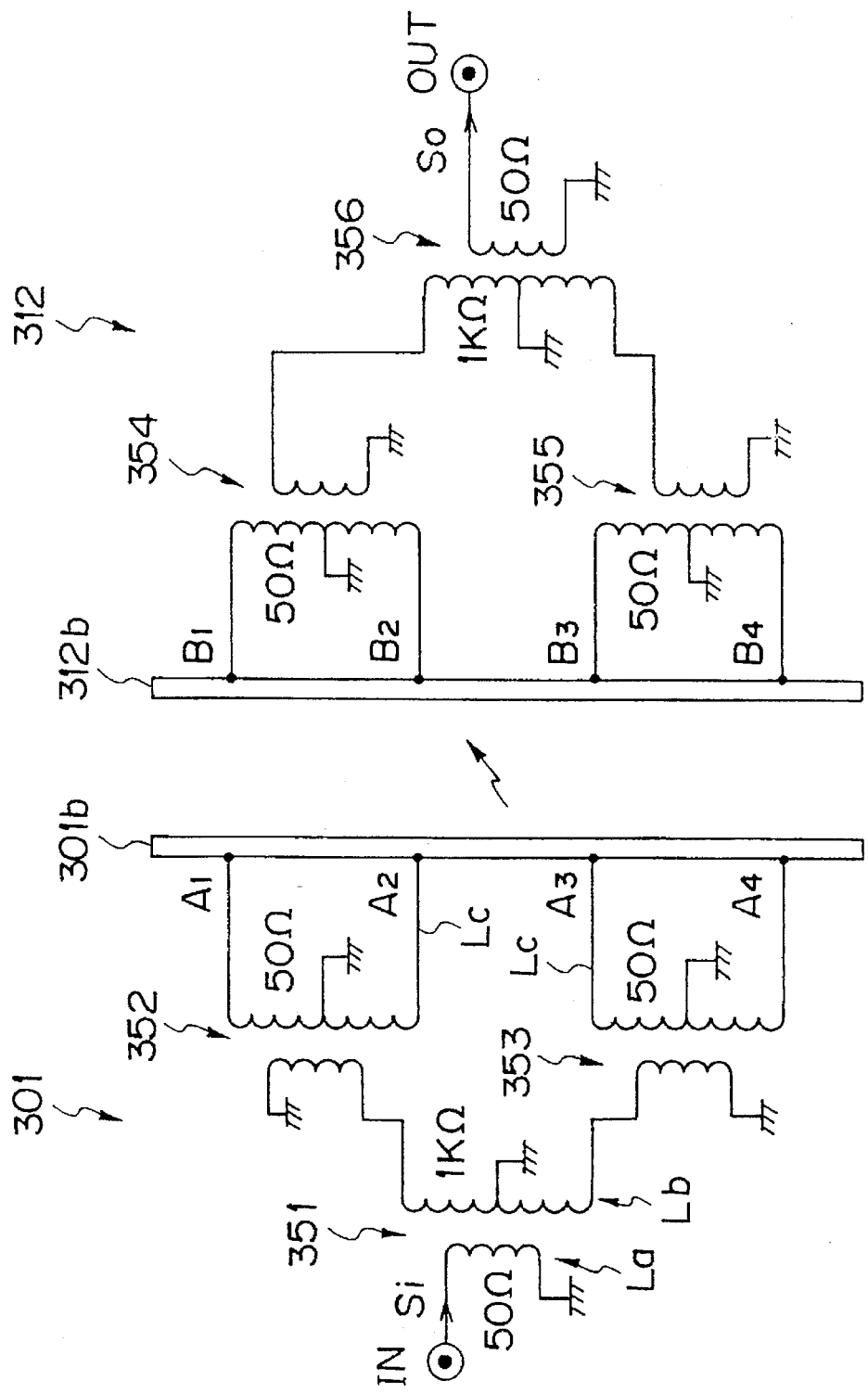
FIG. 42 is a diagram illustrating circuit configuration of the device according to the third embodiment.

Next, signal transmission manner will be described below. FIG. 41 is a block diagram illustrating constructions of the transmitting element 301 and the receiving element 312, and FIG. 42 is a diagram illustrating concrete circuit of the elements 301 and 312. The transmitting element 301 includes the substrates 301a and 301b, as shown in FIG. 39, and further includes three baluns 351–353 held in a manner sandwiched by the substrates 301a and 301b. Specifically, the baluns 351–353 are provided at the portion 350 of the substrate 301a, and signals output from the baluns 352 and 353 are supplied to the signal input points $A_1$–$A_4$ of the substrate 301a via conductive elements having same lengths. The signal input points $A_1$–$A_4$ are provided at positions having angles of 90 degrees with respective to the neighboring points, respectively, and connected to corresponding points of the confronting substrate 301b by lead wires. Signal $S_i$ supplied to the transmitting element 301 is radiated from the element $E_5$ of the substrate 301b shown in FIG. 40B. It is noted that, in FIGS. 41 and 42, the substrate 301a is omitted and only the substrate 301b is illustrated, for the sake of simplicity. The receiving element 312 has the same shape and construction as the transmitting element 301. Namely, three baluns 354–356 are provided between the substrates 312a and 312b, and four input terminals of the baluns 354 and 355 are connected to the signal output points $B_1$–$B_4$ provided every rotational angles of 90 degrees. Accordingly, the transmitting element 301 and the receiving element 312 confront with each other with the inner element surfaces shown in FIG. 40B facing with each other inside thereof, and signal is transmitted between the element surfaces 301b and 312b.

Next, operation of the signal transmission device 45 will be described. The inspection signal $S_i$ generated by the rotary block 85 is input to the balun 351. Balun is a circuit for conversion between balanced circuit and unbalanced circuit, and the balun 351 is constituted by a transformer circuit including opposing coils. In the balun 351, input-side coil La has an impedance 50Ω, and output-side coil Lb has an impedance of 1kΩ. Therefore, the inspection signal $S_i$ is subjected to an impedance conversion and is divided into two signals Sa and Sb. The signals Sa and Sb are input to the baluns 352 and 353, respectively. The baluns 352 and 353 are also constituted by a transformer circuit, however, input-side coil Lb has an impedance 1kΩ and output-side coil Lc has an impedance 50Ω. Accordingly, the signal Sa is output as signals $S_1$ and $S_2$ having impedance 50Ω, and the signal Sb is output as signals $S_3$ and $S_4$ having impedance of 50Ω. The signals $S_1$–$S_4$ thus produced are supplied to the signal input points $A_1$–$A_4$, respectively. The transmitting element 301 and the receiving element 312 function as a kind of condenser in signal transmission. The signals $S_1$–$S_4$ are radiated from the four signal input points $A_1$–$A_4$, transmitted by capacitive coupling and received by the receiving element 312. Namely, between the confronting substrates 301b and 312b, signal radiated from the element $E_5$ on the substrate 301b shown in FIG. 40B is propagated through the spacing between the elements, and received by the ring-shaped element $E_5$ on the substrate 312b. As has described above, the receiving element 312 is of the same shape and construction as the transmitting element 301, and the signals received by the receiving element $E_5$ is output from the four signal output points $B_1$–$B_4$. These signals are subjected to impedance conversions 50Ω to 1kΩ and 1kΩ to 50Ω by the series of baluns 354–356 having constructions identical to the series of baluns 351–352, and combined and output as a unique signal So to signal processing unit.

Figure 44A:
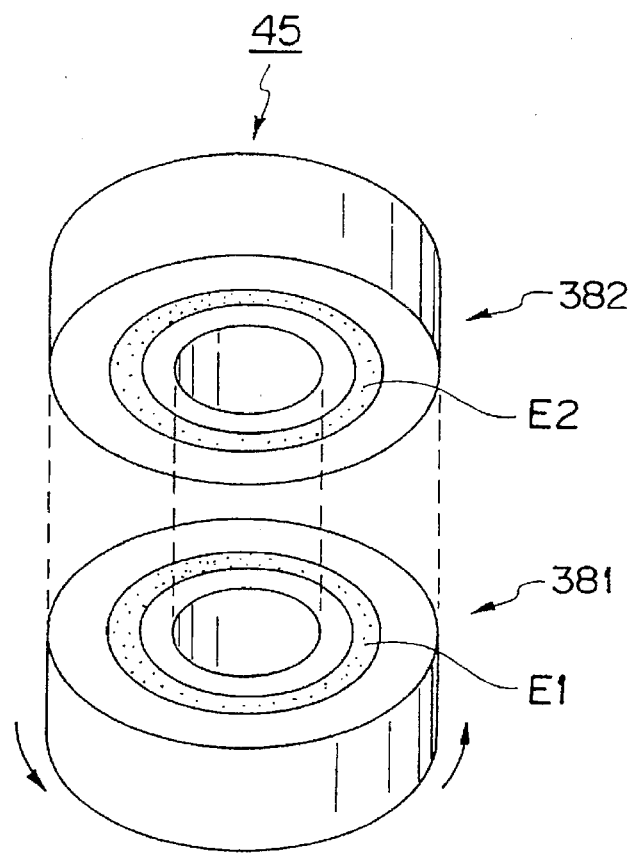
FIGS. 44A and 44B are diagrams showing ring-shaped element type signal transmission device and its transmission characteristic.
Figure 44B:
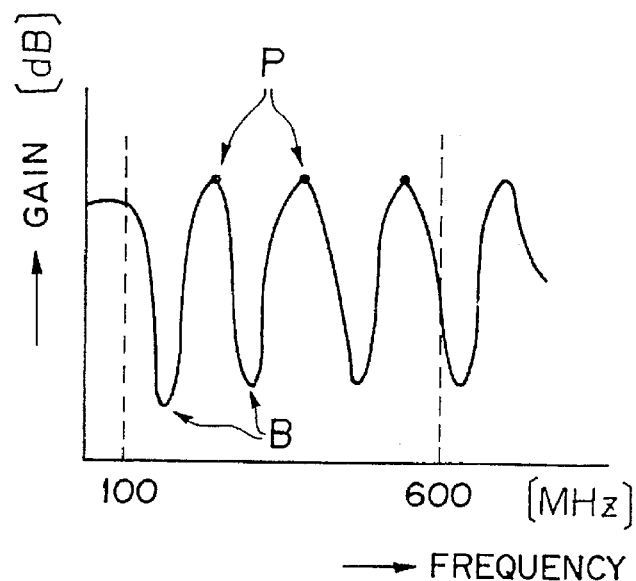
Figure 45A:
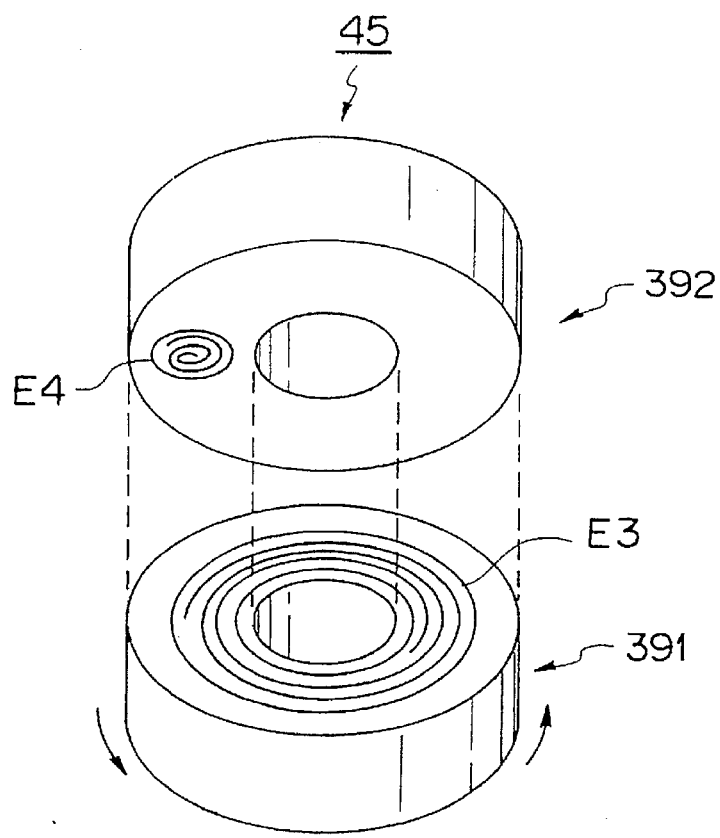
FIGS. 45A and 45B are diagrams showing spiral element type signal transmission device and its transmission characteristic.
Figure 45B:
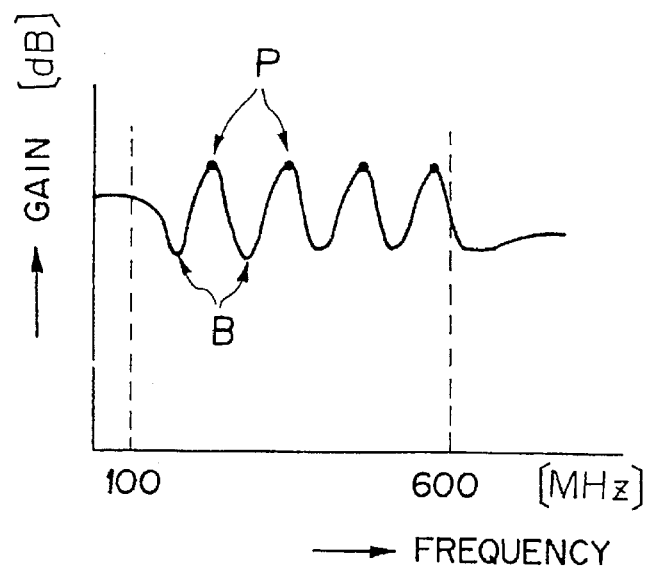

Signal transmission device according to the third embodiment thus constructed is characterized in that the baluns are interposed between the signal input/output sides and signal transmission elements, and that the signals are equally supplied to multiple points of the transmitting element and signals are equally output from multiple points of the receiving element. By interposing the baluns in that manner, impedance matching is improved among the signal input side, transmitting/receiving elements and signal output side, and signal reflection is absorbed and stabilized. Further, impedance of the signal is converted to high impedance by the baluns, affection of capacity variation of element portion due to external noise or unevenness of physical shapes of elements is stabilized. Still further, since signals are supplied to and output from multiple points on the elements, distribution of signal transmission intensity between the elements is averaged. For the reasons described above, variation of signal transmission characteristics is stabilized. Further, since the transmitting element 301 and the receiving element 312 are connected to the signal input points $A_1$–$A_4$ and signal output points $B_1$–$B_4$ via the baluns and elements of identical lengths, respectively, signals at each signal input/output points do not differ from each other in their magnitude and phase, and are radiated under the same conditions. This contributes to equalization of signal transmission intensity between the elements. FIG. 43 shows a transmission characteristic of signal transmission device according to the third embodiment, and FIGS. 44B and 45B show transmission characteristics of the signal transmission device shown in FIGS. 44A and 45A. From these figures, it is clear that the variation of transmission gain within the frequency band of transmission signal is improved.

Figure 46A:
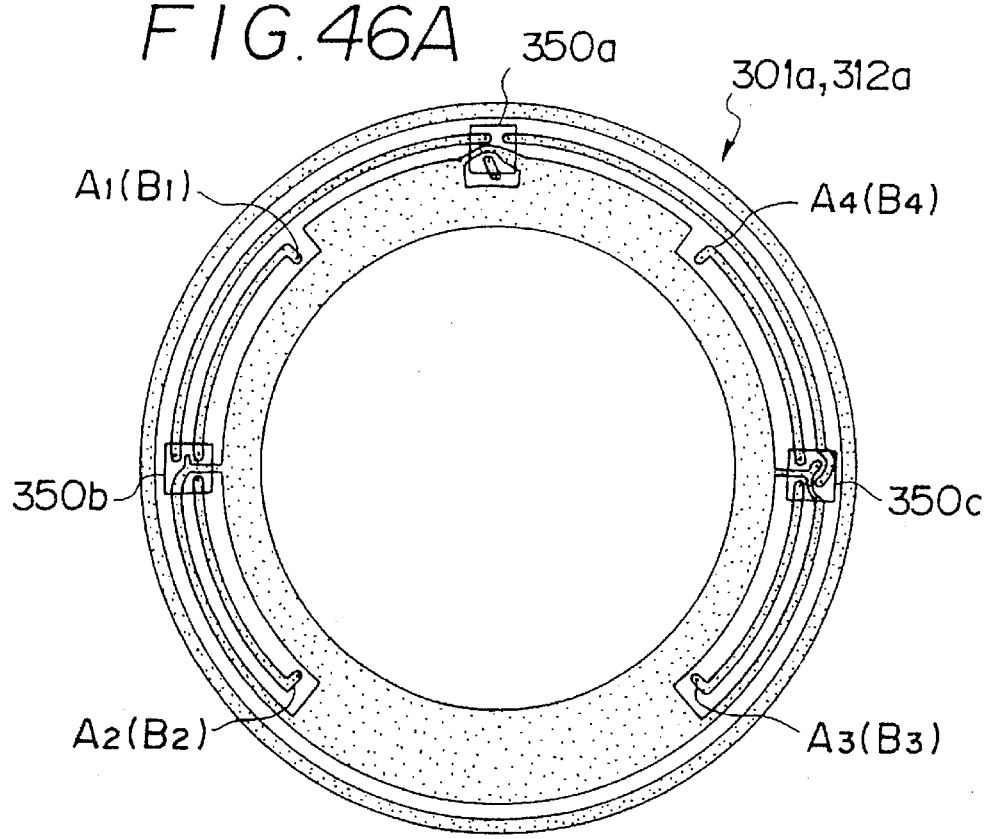
FIGS. 46A and 46B are plan views showing transmitting and receiving elements according to the third embodiment.
Figure 46B:
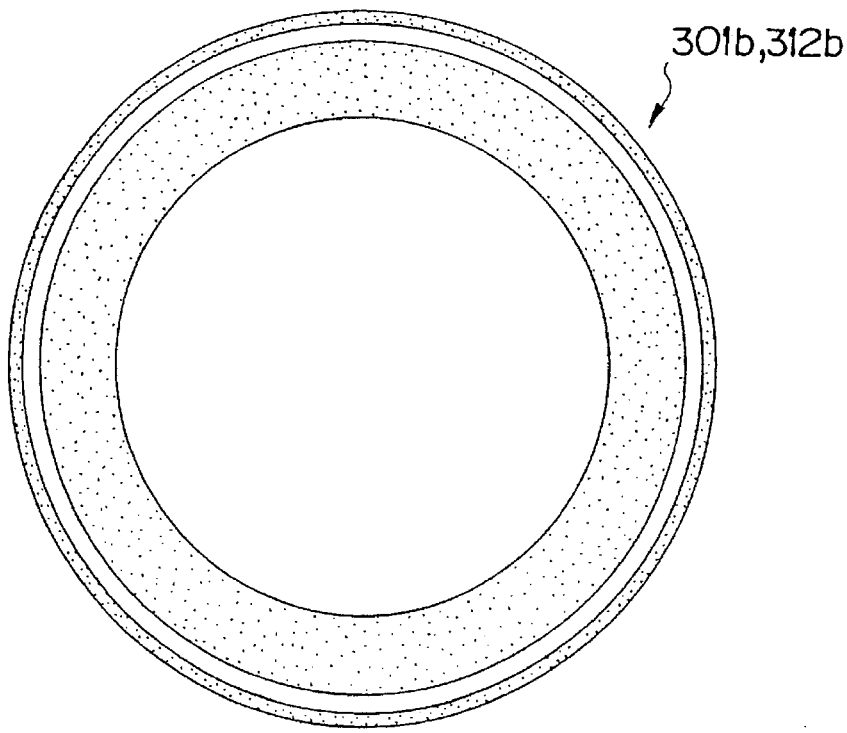

In the signal transmission device 45, the transmitting element 301 and the receiving element 312 are positioned confronting with each other. In an actual experiment, the two elements 301 and 312 are positioned with a spacing approximately 3 mm therebetween. If the spacing between the two elements is narrow, the transmission gain is increased. However, according to the revolution of one of the elements, relative positional relationship of the four signal input points and four signal output points varies, and the transmission gain varies time to time depending upon the relative positional relationship. The narrower the spacing of the elements is, the larger the variation of transmission gain becomes. In this view, it is required that the two elements are positioned with such an appropriate interval therebetween that intensity of signals radiated from the four signal input points are almost equally received by any signal output points of the receiving element. In the above described embodiment, the numbers of the signal input points on the transmitting element 301 and signal output points on the receiving element 312 are four. However, if the numbers are increased, unevenness of the signal transmission intensity is further equalized, and variation of transmission gain is further stabilized. In addition, in the above described embodiment, the number of the signal input points is equal to the number of the signal output points. However, if they are different, the transmission intensity may be further equalized. It is noted that the transmitting element 301 and the receiving element 312 may be formed in the manner shown in FIGS. 46A and 46B. In this case, the three baluns are provided at the positions 350a–350c, respectively. However, the four signal input points and the four signal output points are provided at every rotational angles 90 degrees in the same manner as shown in FIGS. 40A and 40B.

Figure 47:
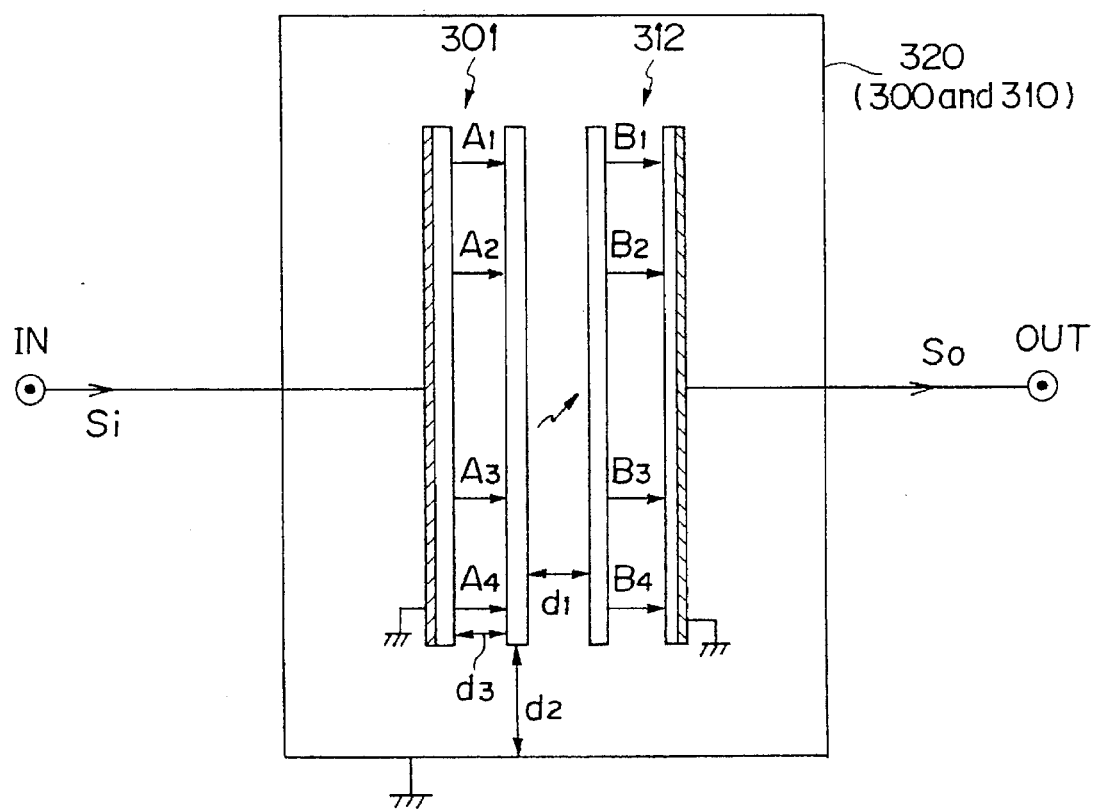
FIG. 47 is a diagram illustrating relationship between signal transmission elements and the body of the device.

Next, positions of the elements within the signal transmission device body will be examined. As shown in FIG. 47, in the above described signal transmission device, the transmitting element 301 and the receiving element 312 are magnetically shielded from the external by the transmitting unit 300 and the receiving unit 310 (hereinafter referred to "casing"). It is preferable that the distance $d_1$ between the transmitting element 301 and the receiving element 312 is larger than the distance $d_2$ to the casing 320 and the distance $d_3$ to the GND surface of the transmitting element 301. By doing so, the capacitance of the transmitting element 301 with respect to the receiving element 312 becomes larger than the capacitance of the transmitting element 301 with respect to the casing 320 and the GND surface. As a result, signal propagating to the receiving element becomes larger than the signal propagating to the casing, and efficient signal transmission can be performed.

Figure 48:
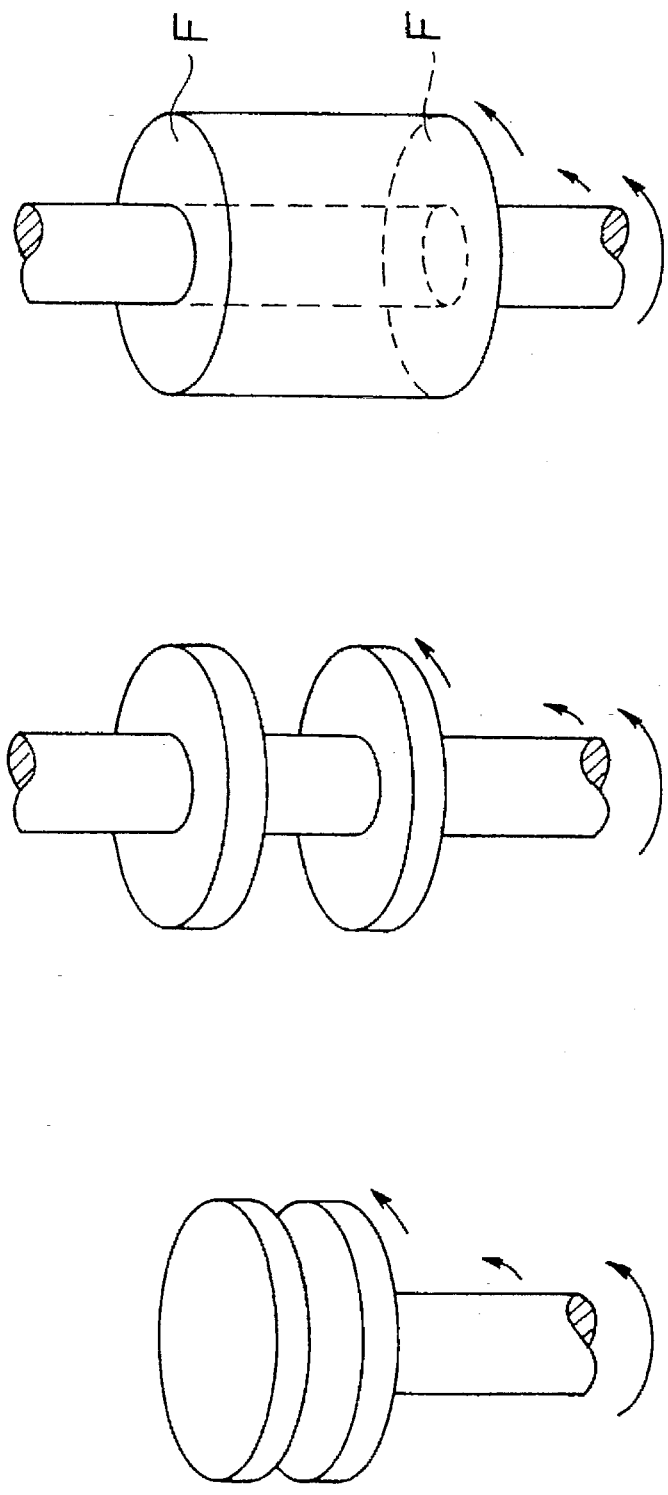
FIGS. 48A–48C are views showing examples of feature of the signal transmission device according to the third embodiment.

In the third embodiment, it is required that the transmitting element and the receiving element revolve relatively with each other. In this regard, the rotary shaft may pierces through only one of the elements as shown in FIG. 48B or pierces through only one of the elements as shown in FIG 48A. Alternatively, the elements may be provided on the upper or lower faces F of a cylindrical body, as shown in FIG. 48C. As described above, according to the third embodiment, signal to be transmitted is equally supplied to multiple signal input points on the transmitting element via baluns. Therefore, signal reflection is absorbed. Further, signal transmission intensity between the elements is averaged, and therefore signal is stably transmitted with less variation of transmission gain within the signal transmission band. Still further, signal deterioration due to disturbance from external or variation of physical shapes of the elements may be avoided.

Figure 49:
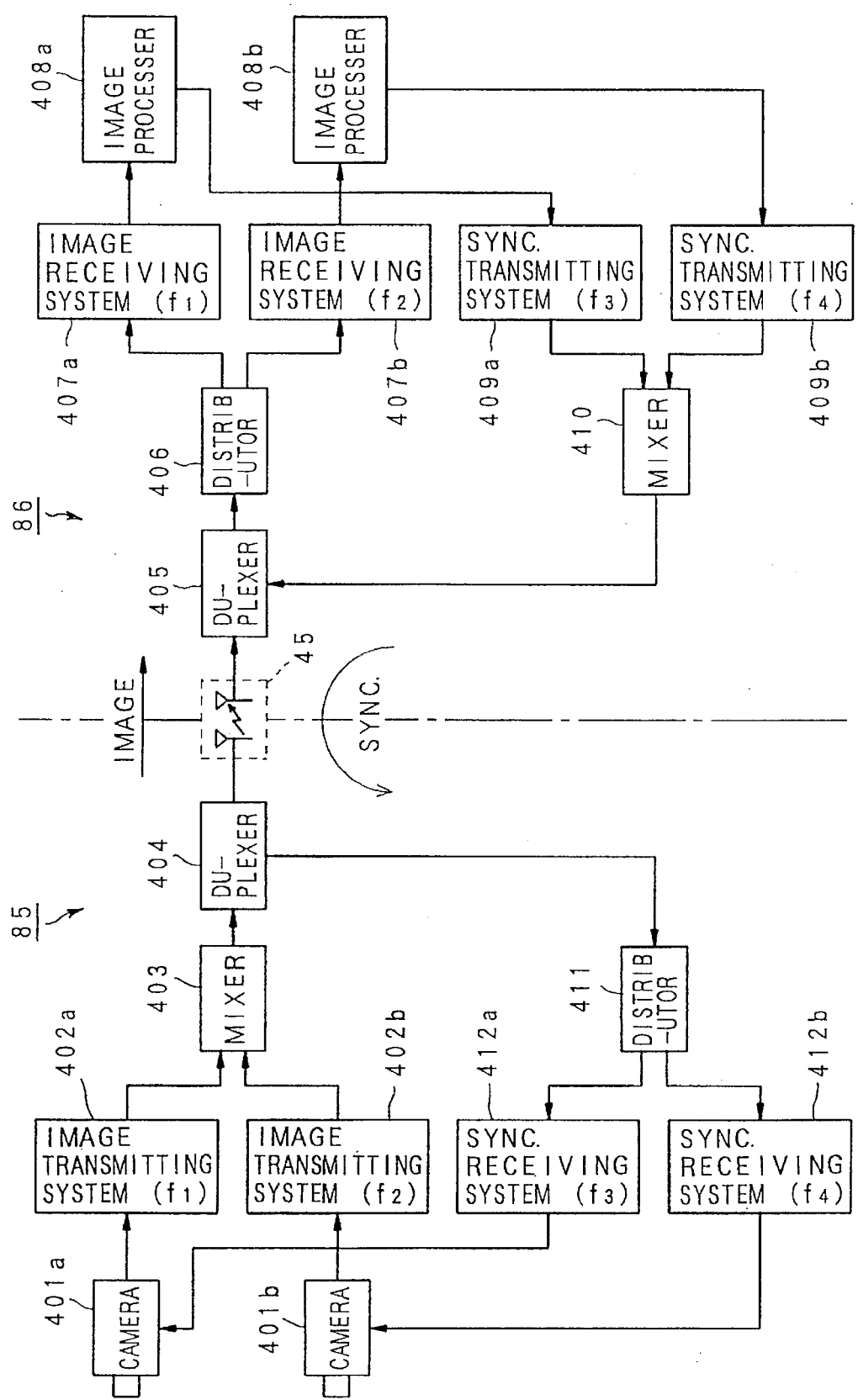
FIG. 49 is a block diagram illustrating construction of signal transmission device according to the fourth embodiment of the invention.

(4) 4th Embodiment:

Next, a signal transmission device according to the fourth embodiment will be described below. FIG. 49 is a block diagram illustrating a signal processing according to this embodiment. As shown in FIG. 49, two inspection image signal produced by the cameras 401a and 401b are transmitted to the stationary block 86 via the signal transmission device 45, and a synchronizing signal produced by the image signal processing units 408a and 408b are transmitted to the rotary block 85 via the signal transmission device 45. This will be described below in more detail. The inspection image signal picked up by the camera 401a is subjected to a frequency modulation in the image transmitting system 402a using a carrier frequency $f_1$, and then supplied to the mixer 403. The inspection image signal picked up by the camera 401b is also frequency-modulated in the image transmitting system 402b using a carrier frequency $f_2$, and then supplied to the mixer 403. The mixer 3 mixes the two frequency-modulated signals with each other, and supplies it to the duplexer 404. The duplexer 404 delivers the mixed image signal to the signal transmission device 45. The signal transmission device 45 transmits the image signal to the stationary block side 86 in a noncontacting manner. The inspection image signal thus transmitted is delivered to the distributor 406 via the duplexer 405. The distributor 406 distributes the inspection image signal into the inspection image signal modulated by the carrier $f_1$ and the inspection image signal modulated by the carrier $f_2$, and supplies them to the image receiving systems 407a and 407b, respectively. The image receiving systems 407a and 407b demodulate inspection image signals and supplies them to the image processors 408a and 408b, respectively. The image processors 408a and 408b carry out judgements relating to defects or dusts in the laminate tube based on the inspection image signals thus supplied. The image processors 408a and 408b produce synchronizing signals (composite synchronizing signals) for synchronous control of the cameras 401a and 401b. These synchronizing signals are supplied to the sync. transmitting systems 409a and 409b. The sync. transmitting systems 409a and 409b modulate the synchronizing signals by FM using the carrier frequencies $f_3$ and $f_4$, and supplies them to the mixer 410. The mixer 410 mixes the frequency-modulated synchronizing signals, and output it to the duplexer 405. The duplexer 405 delivers the mixed synchronizing signal to the signal transmission device 45. The signal transmission device 45 transmits the synchronizing signal to the rotary unit 85 in a non-contacting manner. The synchronizing signal thus transmitted is supplied to the distributor 411 via the duplexer 404, and is distributed into the synchronizing signal modulated by the carriers $f_3$ and $f_4$. The synchronizing signals are then input to the sync. receiving systems 412a and 412b, and demodulated to be the original composite synchronizing signals, respectively. The synchronizing signals are supplied to the cameras 401a and 401b to control pickup of inspection image.

The duplexer 404 passes the inspection image signal supplied from the mixer 403 according to the transmission characteristic $C_1$ shown in FIG. 50, and passes the synchronizing signals supplied from the signal transmission device 45 according to the transmission characteristic $C_2$ shown in FIG. 50. Therefore, the inspection image signal from the mixer 403 does not intermix into the synchronizing signal supplied to the distributor 411, and the synchronizing signal from the signal transmission device 45 does not input to the mixer 403. Similarly, the duplexer 405 passes the inspection image signal according to the transmission characteristic $C_1$, and passes only the synchronizing signal from the mixer 410 to the signal transmission device 45 according to the transmission characteristics $C_2$. According to the function of the duplexer, inspection image signal and synchronizing signal are transmitted bi-directionally. As the signal transmission device 45, various types of signal transmission devices may be employed. For example, spiral element type transmission device shown in FIG. 36A and ring-shaped element type transmission device shown in FIG. 36B may be used.

Figure 51:
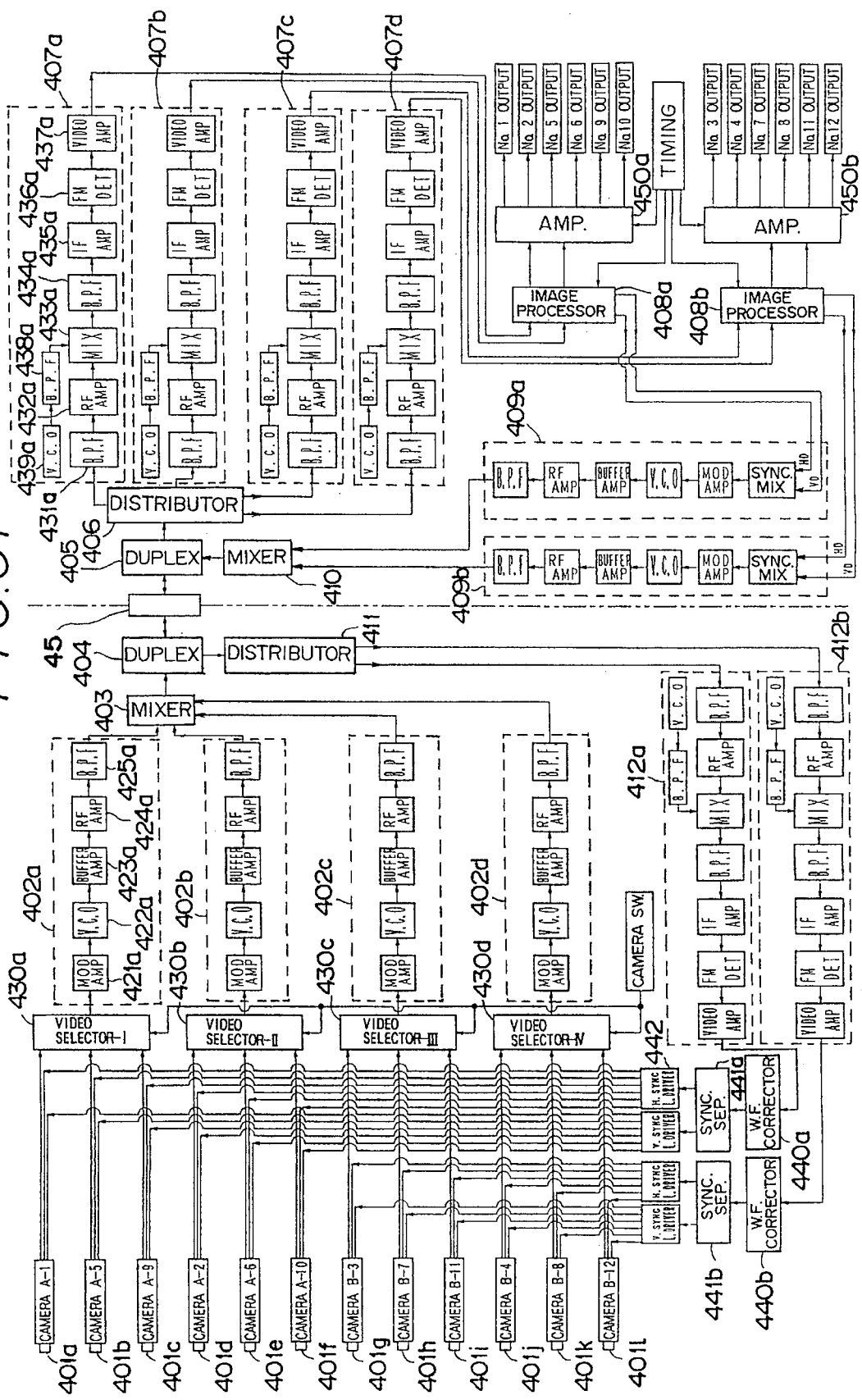
FIG. 51 is a block diagram illustrating detailed construction of the signal transmission device according to the fourth embodiment.

Next, details of the inspection block and the signal processing block will be described with reference to FIG. 51. Every three lines of the inspection image signals picked up by the CCD cameras 401a–401l are input to the four video-selectors 430a–430d. Each of the video-selectors outputs one inspection image out of three images to the image transmitting systems 402a–402d in a time-division manner. Each of the video-selectors has identical construction and performs identical operation, and therefore the following description will be only directed to the image transmitting system 402a, for the sake of simplicity. The inspection image output from the video-selector 402a is amplified by the amplifier 421a to be a given amplitude, and input to the VCO 422a. The amplified image signal is used as a control voltage of oscillating frequency. This means modulating the oscillation frequency of the VCO ($f_1$) by the inspection image signal, and the output signal of the VCO is a frequency-modulated inspection image signal using the carrier signal of frequency $f_1$. This frequency-modulated inspection image signal is amplified by the buffer amplifier 423a and the RF amplifier 424a, and then input to the BPF 425a. The BPF 425a extracts the FM inspection image signal around the carrier frequency $f_1$. Namely, the BPF 425a functions to eliminate higher harmonics of the FM inspection image signal. The output signal of the BPF 425a is supplied to the mixer 403. Similarly, the image transmitting systems 402b–402d modulate the inspection image signals using carrier frequencies $f_2$–$f_4$, eliminate higher harmonics and supply them to the mixer 403. Signal mixed by the mixer 403 is transmitted to the distributor 406 via the duplexer 404, the signal transmission device 45 and the duplexer 405. The distributor 406 distributes the FM inspection image signal mixed by the mixer 403 into four inspection image signals, and inputs them to the image receiving systems 407a–407d. Here, each of the image receiving systems 407a–407d has identical construction and perform identical operation, and therefore the following description will be only directed to the image receiving system 407a, for the sake of simplicity. The BPF 431a extracts component of the carrier frequency $f_1$ from the FM inspection image signal output from the distributor 406. The output signal from the BPF 431a is amplified by the RF amplifier 432, and supplied to the mixer 433a. On the other hand, output of the local oscillator 439a is supplied to the mixer 433a via the BPF 438a, and the signal frequencies are mixed therein. The output of the mixer 433a is transmitted to the FM detection circuit 436a via the BPF 434a and the IF amplifier 435a. The inspection image signal detected by the FM detection circuit 436a is amplified by the video amplifier 437a and supplied to the image processing device 408a so as to carry out image analysis. Similarly, each of the image receiving systems 407b–407d carries out identical operation, and supplies the inspection image signal to the image processing devices 408a and 408b. The image processing devices 408a and 408b detect defect or dust in the laminate tube, and output resultant signal via the amplifiers 450a and 450b. On the other hand, the image processing devices 408a and 408b generate synchronizing signals for controlling synchronization of the CCD cameras 401, and supply them to the sync. transmitting systems 409a and 409b. The sync. transmitting systems 409a and 409b have construction identical to the image transmitting systems 402a–402d, and modulate the synchronizing signals using the carrier frequencies (e.g., $f_5$ and $f_6$) by frequency-modulation and supply them to the mixer 410. The FM synchronizing signals are transmitted to the distributor 411 via the signal transmission device 45, and then supplied to the sync. receiving systems 412a and 412b. The sync. receiving systems 412a and 412b have construction identical to the image receiving systems 407a–407d, and demodulate synchronizing signals in the same manner. The demodulated synchronizing signals are subjected to the waveform correction, separated into the horizontal and vertical synchronizing signals by the sync. separators 441a and 441b, and then input to the CCD cameras via the drivers. In this way, the CCD cameras are controlled by the synchronizing signals produced by the image processing devices in the signal processing block.

Next, a modification of the fourth embodiment will be described. FIG. 52 is a block diagram illustrating a construction of a modification of the fourth embodiment in which concepts of the third embodiment and the fourth embodiment are combined. In this modification, a pair of duplexers $D_1$ and $D_2$ are provided in the signal transmission device 45 shown in FIG. 41 so as to achieve bi-directional transmission. In this modification, synchronizing signals are transmitted from the signal processing block to the inspection block via the antenna unit shown in FIG. 52. The CCD cameras pick up inspection images using the synchronizing signals thus transmitted, and transmits the inspection images to the signal processing block via the signal transmission device 45. By providing the duplexers in this manner, inspection image signal is transmitted from the inspection block to the signal processing block while synchronizing signal is transmitted from the processing block to the inspection block using a unique antenna unit.

In the above embodiment, signal transmitted by the antenna unit is image signal and synchronizing signal, however, the present invention is not limited to this feature. It is possible to provide cameras on both sides of the antenna unit, and image signals picked up in both sides may be transferred bi-directionally. Further, signal to be transmitted is not limited to image signal and various kinds of signal may be transmitted. For example, control signal to control some kind of hardware or data signals may be transmitted.

As described above, according to this embodiment, bi-directional transmission is realized in a rotary system in which a portion of the system revolves.

What is claimed is:

1. A signal transmission device comprising:
    a first body made of electromagnetic shielding material and fixed to a rotary shaft which passes through the first body, said first body revolving together with the rotary shaft around an axis of the rotary shaft;
    a second body made of electromagnetic shielding material and stationarily disposed around the rotary shaft;

a first conductive element spirally formed on a first substrate in a manner that peak magnitude points of traveling wave component of transmission signal generated on the element are positioned out of alignment with each other between at least neighboring turns of the spiral element in radial direction of the spirally formed element, said first element being disposed in one of the first body and the second body;

a second conductive element formed on a second substrate and having a first width long enough to cover the spirally formed first element in the radial direction and a second width in a direction perpendicular to the radial direction, said second element being disposed in the other one of the first body and the second body:

a third ring-shaped conductive element formed on a third substrate disposed in the first body: and a fourth ring-shaped conductive element formed on a fourth substrate disposed in the second body, the third element and the fourth element being opposite to each other when the first body and the second body are coupled to each other.

2. A signal transmission device according to claim 1, wherein one of the first body and the second body comprises at least one annular groove, the annular groove produces a ring-shaped hollow chamber when the first body and the second body are coupled to each other, and the first element and the second element are opposite to each other in the hollow chamber.

3. A signal transmission device according to claim 1, wherein said second element is spirally formed on the second substrate.

4. A signal transmission device according to claim 1, wherein one of the first body and the second body comprises at least two annular grooves, the annular grooves produce ring-shaped hollow chambers when the first body and the second body are coupled to each other, and the first element and the second element are opposite to each other in one of the hollow chambers and the third element and the fourth element are opposite to each other in the other one of the hollow chambers.

5. A signal transmission device according to claim 1, further comprising:

a first duplexer for passing signal within a first predetermined frequency band and supplying the passed signal to the first conductive element; and a second duplexer for receiving signal from the second element and passing signal within a second frequency band.

6. A signal transmission device according to claim 5, wherein one of the first body and the second body comprises at least one annular groove, the annular groove produces a ring-shaped hollow chamber when the first body and the second body are coupled to each other, and the first element and the second element are opposite to each other in the hollow chamber.

7. A signal transmission device according to claim 9, further comprising:

a first duplexer for passing signal within a first predetermined frequency band and supplying the passed signal to the first conductive element; and a second duplexer for receiving signal from the second element and passing signal within a second frequency band.

8. A signal transmission device according to claim 7, wherein one of the first body and the second body comprises at least one annular groove, the annular groove produces a ring-shaped hollow chamber when the first body and the second body are coupled to each other, and the first element and the second element are opposite to each other in the hollow chamber.

9. A signal transmission device comprising:

a first body made of electromagnetic shielding material and fixed to a rotary shaft which passes through the first body, said first body revolving together with the rotary shaft around an axis of the rotary shaft;

a second body made of electromagnetic shielding material and stationarily disposed around the rotary shaft;

first conductive elements each of which being substantially concentrically formed on a first substrate in a manner that peak magnitude points of traveling wave component of transmission signal generated on the elements are positioned out of alignment with each other between at least neighboring elements in radial direction of the concentrically formed elements, said first element being disposed in one of the first body and the second body;

second conductive elements each of which being formed on a second substrate and having a first width long enough to cover the concentrically formed first element in the radial direction and a second width in a direction perpendicular to the radial direction, said second element being disposed in the other one of the first body and the second body;

a third ring-shaped conductive element formed on a third substrate disposed in the first body: and a fourth ring-shaped conductive element formed on a fourth substrate disposed in the second body the third element and the fourth element being opposite to each other when the first body and the second body are coupled to each other.

10. A signal transmission device according to claim 9, wherein one of the first body and the second body comprises at least one annular groove, the annular groove produces a ring-shaped hollow chamber when the first body and the second body are coupled to each other, and the first element and the second element are opposite to each other in the hollow chamber.

11. A signal transmission device according to claim 9, wherein said second element is spirally formed on the second substrate.

12. A signal transmission device according to claim 9, wherein one of the first body and the second body comprises at least two annular grooves, the annular grooves produce ring-shaped hollow chambers when the first body and the second body are coupled to each other, and the first element and the second element are opposite to each other in one of the hollow chambers and the third element and the fourth element are opposite to each other in the other one of the hollow chambers.

13. A signal transmission device comprising:

a first body made of electromagnetic shielding material and fixed to a rotary shaft which passes through the first body, said first body revolving together with the rotary shaft around an axis of the rotary shaft;

a second body made of electromagnetic shielding material and stationarily disposed around the rotary shaft;

a first conductive element disposed in the first body;

a second conductive element disposed in the second body;

a first balun unit for converting impedance of a signal to be transmitted and supplying the converted signal to multiple signal-input points of one of the first conductive element and second conductive element; and a second balun unit for receiving signal from multiple signal-output points of the other one of the first element and the second element, converting impedance of the received signal to produce a signal.

14. A signal transmission device according to claim 13, wherein one of the first body and the second body comprises at least one annular groove, the annular groove produces a ring-shaped hollow chamber when the first body and the second body are coupled to each other, and the first element and the second element are opposite to each other in the hollow chamber.

15. A signal transmission device according to claim 13, further comprising:

a first duplexer for passing signal within a first predetermined frequency band and supplying the passed signal to the first conductive element; and a second duplexer for receiving signal from the second element and passing signal within a second frequency band.

16. A signal transmission device according to claim 15, wherein one of the first body and the second body comprises at least one annular groove, the annular groove produces a ring-shaped hollow chamber when the first body and the second body are coupled to each other, and the first element and the second element are opposite to each other in the hollow chamber.

* * * * *